(12) United States Patent
Tuteja et al.

(10) Patent No.: US 10,465,091 B2
(45) Date of Patent: Nov. 5, 2019

(54) DURABLE ICEPHOBIC SURFACES

(71) Applicant: THE REGENTS OF THE UNIVERSITY OF MICHIGAN, Ann Arbor, MI (US)

(72) Inventors: Anish Tuteja, Ann Arbor, MI (US); Kevin Golovin, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/569,710

(22) PCT Filed: Apr. 27, 2016

(86) PCT No.: PCT/US2016/029596
§ 371 (c)(1),
(2) Date: Oct. 26, 2017

(87) PCT Pub. No.: WO2016/176350
PCT Pub. Date: Nov. 3, 2016

(65) Prior Publication Data
US 2018/0127616 A1    May 10, 2018

Related U.S. Application Data

(60) Provisional application No. 62/153,141, filed on Apr. 27, 2015.

(51) Int. Cl.
*C09D 5/00* (2006.01)
*C08G 18/10* (2006.01)
(Continued)

(52) U.S. Cl.
CPC .......... *C09D 175/04* (2013.01); *C08G 18/10* (2013.01); *C08G 18/1808* (2013.01);
(Continued)

(58) Field of Classification Search
CPC ......... B32B 27/00; B32B 27/06; B32B 27/08; B32B 27/18; B32B 27/28; B32B 27/283;
(Continued)

(56) References Cited

U.S. PATENT DOCUMENTS 5,703,194 A * 12/1997 Malik ................ C08G 18/6677
528/70
6,153,304 A    11/2000 Smith et al.
(Continued)

FOREIGN PATENT DOCUMENTS

CN    102558410 A    7/2012
CN    103756550 A    4/2014
(Continued)

OTHER PUBLICATIONS

K. Golovin, A. Tuteja, A predictive framework for the design and fabrication of icephobic polymers. Sci. Adv. 3, e1701617 (2017). (Year: 2017).*

(Continued)

*Primary Examiner* — Maria V Ewald
*Assistant Examiner* — Ethan A. Utt
(74) *Attorney, Agent, or Firm* — Harness, Dickey & Pierce, P.L.C.

(57) ABSTRACT

Durable icephobic materials form anti-ice coatings on a variety of substrates, including for aircraft, powerlines, vehicles, marine structures, communications towers, outdoor equipment, and the like. The icephobic may comprise an elastomeric polymer with a low crosslink density (e.g., ≤1,300 mol/m3) and low initial ice adhesion strength (e.g., $\tau_{ice}$≤100 kPa prior to exposure to icing conditions). Further, the icephobic material maintains $\tau_{ice}$ after 10 icing/deicing cycles that is ≥50% of the initial $\tau_{ice}$ Introducing optional miscible liquids enhances interfacial slippage of chains in the elastomeric polymer. The low $\tau_{ice}$ levels minimize ice (Continued)

buildup and eliminate necessary work to remove any accumulated ice via passive removal during normal operation. Other icephobic materials include linear polymers with plasticizers distributed therein or PDMS-silane coatings, both of which are free of any layers of surface liquids. Methods of making such icephobic materials are also provided.

20 Claims, 20 Drawing Sheets

(51) Int. Cl.

| | | |
|---|---|---|
| C08G 18/61 | (2006.01) | |
| C08G 18/75 | (2006.01) | |
| C08G 18/76 | (2006.01) | |
| C08G 77/06 | (2006.01) | |
| C08L 75/04 | (2006.01) | |
| C08L 75/12 | (2006.01) | |
| C09D 175/04 | (2006.01) | |
| C09D 183/04 | (2006.01) | |
| C08J 3/24 | (2006.01) | |
| C08G 18/73 | (2006.01) | |
| C08G 18/83 | (2006.01) | |
| C08G 18/18 | (2006.01) | |
| C08G 77/38 | (2006.01) | |
| C09D 5/08 | (2006.01) | |

(52) U.S. Cl.
CPC ............ *C08G 18/61* (2013.01); *C08G 18/73* (2013.01); *C08G 18/758* (2013.01); *C08G 18/7621* (2013.01); *C08G 18/837* (2013.01); *C08G 77/06* (2013.01); *C08G 77/38* (2013.01); *C08J 3/24* (2013.01); *C08J 3/245* (2013.01); *C09D 5/00* (2013.01); *C09D 5/08* (2013.01); *C09D 183/04* (2013.01); *C08G 2150/50* (2013.01); *C08J 2375/04* (2013.01); *C08J 2383/04* (2013.01)

(58) Field of Classification Search
CPC . B32B 27/40; B32B 2383/00; B32B 2375/00; Y10T 428/31551; Y10T 428/31576; Y10T 428/3158; Y10T 428/31583–428/31609; Y10T 428/31663; Y10T 428/31667; C09D 5/00; C09D 5/16; C09D 5/1606; C09D 5/1637; C09D 5/1656; C09D 5/1662; C09D 5/1675; C09D 5/1681; C09D 5/1687; C09D 5/1693; C09D 183/00; C09D 183/04; C09D 183/06; C09D 183/08; C09D 183/10; C09D 175/00; C09D 175/04; C09D 175/06; C09D 175/08; C09D 175/10; C09D 175/12; C08G 18/00; C08G 18/06; C08G 18/32; C08G 18/3203; C08G 18/3237; C08G 18/324; C08G 18/42; C08G 18/4266; C08G 18/4283; C08G 18/4297; C08G 18/48; C08G 18/4825; C08G 18/4829; C08G 18/65; C08G 18/6505; C08G 18/6511; C08G 18/6517; C08G 18/6523; C08G 18/6535; C08G 18/6541; C08G 18/6547; C08G 18/6552; C08G 18/6558; C08G 18/6564; C08G 18/657; C08G 18/6576; C08G 18/6582; C08G 18/6588; C08G 18/6594; C08G 18/66; C08G 18/6603; C08G 18/6607; C08G 18/6611; C08G 18/6614; C08G 18/6618; C08G 18/6622; C08G 18/6625; C08G 18/6629; C08G 18/6637; C08G 18/664; C08G 18/6644; C08G 18/6648; C08G 18/6651; C08G 18/6655; C08G 18/6659; C08G 18/6662; C08G 18/6666; C08G 18/667; C08G 18/6674; C08G 18/6677; C08G 18/6681; C08G 18/6685; C08G 18/6688; C08G 18/6692; C08G 18/6696; C08G 18/70; C08G 18/75; C08G 18/758; C08G 18/76; C08G 18/7614; C08G 18/7621
USPC .......... 428/423.1–425.9, 446, 447, 450–453; 528/10, 31, 44, 59, 61, 64, 65, 67, 85; 244/134, 134 R, 134 E; 106/13, 2; 261/DIG. 86

See application file for complete search history.

(56) References Cited

U.S. PATENT DOCUMENTS

| | | | |
|---|---|---|---|
| 6,702,953 B2 | 3/2004 | Simendinger, III et al. | |
| 6,797,795 B2 | 9/2004 | Byrd | |
| 7,247,349 B2 | 7/2007 | Ozin et al. | |
| 7,520,933 B2 | 4/2009 | Park et al. | |
| 7,704,320 B2 | 4/2010 | Marr et al. | |
| 8,206,469 B2 | 6/2012 | Chiang et al. | |
| 8,371,131 B2 | 2/2013 | Zwieg | |
| 9,339,996 B2 * | 5/2016 | Hitschmann | B29C 43/021 |
| 9,670,304 B2 * | 6/2017 | Wang | C08G 18/06 |
| 9,879,153 B2 * | 1/2018 | Wang | C08G 18/4825 |
| 9,963,597 B2 * | 5/2018 | Aizenberg | C09D 5/1693 |
| 2002/0045030 A1 | 4/2002 | Ozin et al. | |
| 2003/0232941 A1 | 12/2003 | Byrd | |
| 2006/0257663 A1 | 11/2006 | Doll et al. | |
| 2006/0281861 A1 * | 12/2006 | Putnam | C09D 183/04 |
| | | | 106/13 |
| 2007/0134420 A1 | 6/2007 | Koberstein et al. | |
| 2007/0254170 A1 * | 11/2007 | Hoover | C09D 183/04 |
| | | | 428/447 |
| 2008/0175987 A1 | 7/2008 | Carter | |
| 2011/0123803 A1 | 5/2011 | Yamanaka et al. | |
| 2012/0135237 A1 | 5/2012 | Gracias et al. | |
| 2013/0101791 A1 * | 4/2013 | Hitschmann | B29C 43/021 |
| | | | 428/141 |
| 2014/0010965 A1 | 1/2014 | Li et al. | |
| 2014/0088219 A1 | 3/2014 | Chen et al. | |
| 2014/0113144 A1 | 4/2014 | Loth et al. | |
| 2014/0127516 A1 * | 5/2014 | Wang | C08G 18/06 |
| | | | 428/447 |
| 2014/0234579 A1 * | 8/2014 | Wang | C09D 5/1681 |
| | | | 428/141 |
| 2014/0290732 A1 | 10/2014 | Aizenberg et al. | |
| 2014/0328999 A1 | 11/2014 | Aizenberg et al. | |
| 2014/0342954 A1 | 11/2014 | Ingber et al. | |
| 2015/0152270 A1 * | 6/2015 | Aizenberg | C09D 5/1693 |
| | | | 427/340 |
| 2016/0009971 A1 * | 1/2016 | Wang | C08G 18/4825 |
| | | | 524/507 |

FOREIGN PATENT DOCUMENTS

| | | | |
|---|---|---|---|
| WO | WO-88-08018 A1 | 10/1988 | |
| WO | WO-9740385 A1 | 10/1997 | |
| WO | WO-0021905 A1 | 4/2000 | |
| WO | WO-02091028 A2 | 11/2002 | |
| WO | WO-2005047575 A1 | 5/2005 | |
| WO | WO-2005062091 A2 | 7/2005 | |
| WO | WO-2005066672 A1 | 7/2005 | |
| WO | WO-2005084369 A2 | 9/2005 | |
| WO | WO-2005089129 A2 | 9/2005 | |
| WO | WO-2012003004 A2 | 1/2012 | |
| WO | WO-2012170832 A1 | 12/2012 | |
| WO | WO-2014012080 A1 * | 1/2014 | ........... C09D 5/1693 |
| WO | WO-2014088598 A1 | 6/2014 | |
| WO | WO-2014116221 A1 | 7/2014 | |

(56) References Cited

FOREIGN PATENT DOCUMENTS

OTHER PUBLICATIONS

K. Golovin, S. P. R. Kobaku, D. H. Lee, E. T. DiLoreto, J. M. Mabry, A. Tuteja, Designing durable icephobic surfaces. Sci. Adv. 2, e1501496 (2016). (Year: 2016).*
Buschow, K.H. Jürgen Cahn, et al.. (2001). Encyclopedia of Materials—Science and Technology, vol. 3. (pp. 2474, 2482-2484). Elsevier. Retrieved from app.knovel.conn/hotlink/toc/id:kpEMSTV001/encyclopedia-materials/encyclopedia-materials (Year: 2001).*
International Search Report and Written Opinion of the International Searching Authority issued in PCT/US2016/029596, dated Aug. 22, 2016; ISA/KR.
Bharathidasan, T. et al., "Effect of wettability and surface roughness on ice-adhesion strength of hydrophilic, hydrophobic and super hydrophobic surfaces," *Applied Surface Science*, 314, pp. 241-250 (Published online: Jun. 21, 2014); DOI: 10.1016/j.apsusc.2014.06.101.
Davis, Alexander et al., "Superhydrophobic Nanocomposite Surface Topography and Ice Adhesion," *ACS Applied Materials Interfaces*, 6 (12), pp. 9272-9279 (Published May 29, 2014).
Dou, Renmei et al., "Anti-icing Coating with an Aqueous Lubricating Layer," *ACS Appl. Mater. Interfaces*, 6, pp. 6998-7003 (Published May 14, 2014); DOI: 10.1021/am501252u.
Farhadi, S. et al., "Anti-icing performance of superhydrophobic surfaces," *Applied Surface Science*, 257, pp. 6264-6269 (Published online Feb. 12, 2011) ; DOI: 10.1016/j.apsusc.2011.02.057.
Galliano, A. et al., "Adhesion and friction of PDMS networks: molecular weight effects," *Journal of Colloid and Interface Science*, (2003) 265, pp. 372-379 DOI: 10.1016/S0021-9797(03)00458-2.
Guo, Peng et al., "Icephobic/Anti-Icing Properties of Micro/Nanostructured Surfaces," *Adv. Mater.*, 24, pp. 2642-2648 (Published online: Apr. 10, 2012); DOI: 10.1002/adma.201104412.
He, Yang et al., "Reducing ice adhesion by hierarchical micro-nano-pillars," *Applied Surface Science* 305 (2014), pp. 589-595 (Published online Mar. 29, 2014); DOI: 10.1016/j.apsusc.2014.03.139.
Kim, Philseok et al., "Hierarchical or Not? effect of the Length Scale and Hierarchy of the Surface Roughness on Omniphobicity of Lubricant-Infused Substrates," *Nano Lett.* 2013, 13 (4), pp. 1793-1799 (Published online Mar. 6, 2013); DOI: 10.1021/nl4003969 (Abstract only).
Kim, Philseok et al., "Liquid-Infused Nanostructured Surfaces with Extreme Anti-Ice and Anti-Frost Performance," *ACS Nano*, 6 (8), pp. 6569-6577 (Published online Jun. 10, 2012); DOI: 10.1021/nn302310q.

López, Susana Hernández et al., "Acrylated-Epoxidized Soybean Oil-Based Polymers and Their Use in the Generation of Electrically Conductive Polymer Composites," Soybean, Hany A. El-Shemy, IntechOpen (Feb. 20, 2013) DOI: 10.5772/52992.
Lv, Jianyong et al., "Bio-inspired Strategies for Anti-Icing," *ACS Nano*, 8 (4) pp. 3152-3169 (Published online Mar. 4, 2014); DOI: 10.1021/nn406522n.
Meuler, Adam J. et al. "Relationships Between Water Wettability and Ice Adhesion," *ACS Applied Materials & Interfaces*, 2 (11), pp. 3100-3110 (Published online Oct. 15, 2010); DOI: 10.1021/am1006035.
Palchesko, Rachelle N. et al., "Development of Polydimethylsiloxane Substrates with tunable Elastic Modulus to Study Cell Mechanobiology in Muscle and Nerve," *PLoS One*, 7 (12), e51499; DOI: 10.1071/journal.pone.0051499.
Tarquini, Stefania et al., "Investigation of ice shedding properties of superhydrophobic coatings on helicopter blades," *Cold Regions Science and Technology*, 100 (2014), pp. 50-58; DOI: 10.1016/j.coldregions/2013.12.009.
Urata, Chihiro et al., "Self-lubricating organogels (SLUGs) with exceptional syneresis-induced anti-sticking properties against viscous emulsions and ices," *J. Mater. Chem. A*, 3, pp. 12626-12630 (Published May 27, 2015); DOI: 10.1039/c5ta02690c.
Wang, Yaling et al., "Organogel as durable anti-icing coatings," *Sci China Mater*, 58, pp. 559-565 (Published online Jul. 10, 2015); DOI: 10.1007/s40843-015-0069-7.
Wang, Yuanyi et al., "Verification of Icephobic/Anti-icing Properties of a Superhydrophobic Surface," *ACS Applied Materials & Interfaces* 2015, 5 pp. 3370-3381 (Published Mar. 28, 2013); DOI: 10.1021/am400429q.
Wong, Tak-Sing et al., "Bioinspired self-repairing slippery surfaces with pressure-stable omniphobicity," *Nature*, 477, pp. 443-447 (Published Sep. 22, 2011); DOI: 10.1038/nature10447.
Xu, Qian et al., "Energy-Effective Frost-free Coatings Based on Superhydrophobic Aligned Nanocones," *ACS Appl. Mater. Interfaces* (2014), 6, pp. 8976-8980 (Published Jun. 10, 2014).
Zhu, Lin et al., "Ice-phobic Coatings Based on Silicon-Oil-Infused Polydimethylsiloxane," *ACS Applied Materials Surfaces*, 5 (10), pp. 4053-4062 (Published Apr. 22, 2013).
ASTM D412-06a, Standard Test Methods for Vulcanized Rubber and Thermoplastic Elastomers-Tension (ASTM International, West Conshocken, PA, 2013).
Extended European Search Report issued in European Patent Application No. 16787084.9 dated Sep. 19, 2018, 8 pages.

\* cited by examiner

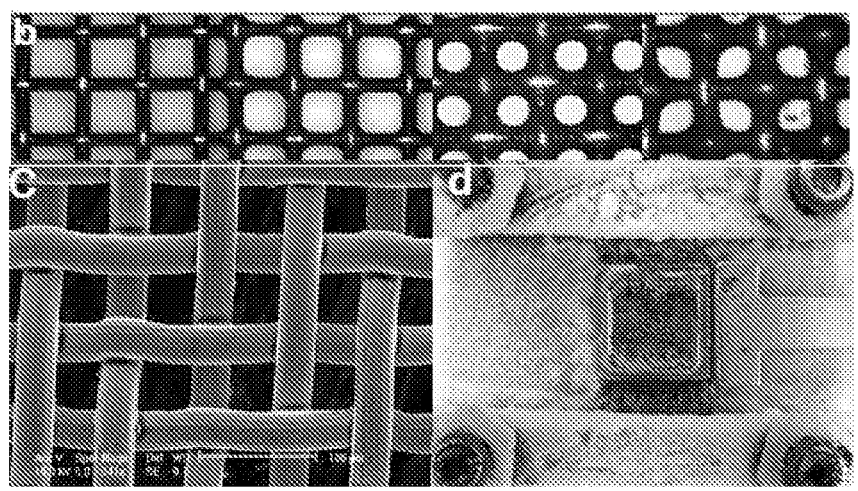
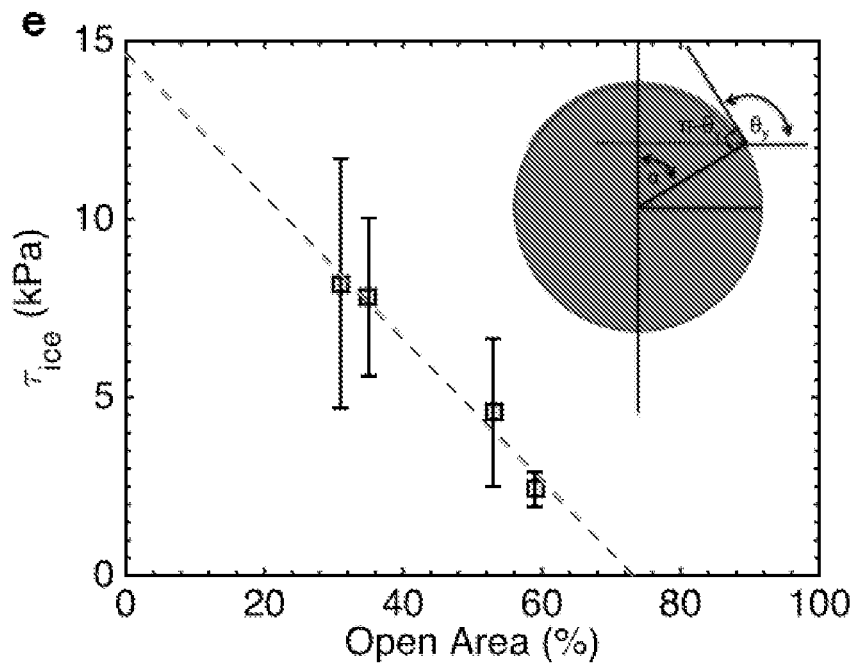
FIGS. 9A-9E

DURABLE ICEPHOBIC SURFACES

CROSS-REFERENCE TO RELATED APPLICATIONS

This application is a U.S. National Phase Application under 35 U.S.C. 371 of International Application No. PCT/US2016/029596 filed on Apr. 27, 2016 and published in English as WO 2016/176350 A1 on Nov. 3, 2016. This application claims the benefit of U.S. Provisional Application No. 62/153,141, filed on Apr. 27, 2015. The entire disclosures of the above applications are incorporated herein by reference.

FIELD

The present disclosure relates to durable, robust icephobic materials for use on surfaces of articles potentially exposed to ice formation conditions.

BACKGROUND

This section provides background information related to the present disclosure which is not necessarily prior art.

Ice may undesirably form or accrete on a variety of surfaces. Ice accretion severely hinders numerous technologies. Airplane wings, marine vessels, commercial and residential refrigerators and freezers, and various outdoor equipment, including wind turbines, power lines, and telecommunication towers, all can suffer from ice accretion in cold environments. Ice accretion and formation can inhibit functionality to the extent that safety is compromised. The strong adhesion between ice and most structural materials makes the removal of ice very costly, both energetically and economically. Mechanical, electro-mechanical, thermal and chemical methodologies are the current industrial standards for ice removal. Each of these methods involves either inputting enough force to break off any accreted ice, or inputting enough energy to melt the ice. There exists a need to develop surfaces where ice may be passively removed from a surface solely by the forces experienced during normal operation (i.e., removal with no external energy input).

While some conventional coatings have been developed that provide lower ice adhesion strength on a surface, such coatings have failed to be robust or durable enough to withstand outdoor elements. Further, such conventional coatings suffer from significant increases in ice adhesion strength after only a few icing and deicing cycles, making them impractical for long-term use as icephobic anti-icing surface coatings. Thus, a durable, robust icephobic material that is capable of being used on a variety of surfaces that substantially maintains an ice adhesion strength level during multiple icing and deicing cycles would be desirable. There exists a need to develop durable icephobic surfaces and methods for making them, where ice formation is minimized on the durable icephobic surface. Further, it would be desirable to form a durable icephobic surface where any accumulated ice does form that can be passively removed solely by the forces experienced during normal operation (e.g., with no external energy input).

SUMMARY

This section provides a general summary of the disclosure and is not a comprehensive disclosure of its full scope or all of its features.

The present disclosure provides durable icephobic materials. In certain variations, the durable icephobic material comprises an elastomeric polymer defining an exposed surface. The elastomeric polymer has a relatively low crosslink density of less than or equal to about 1,300 mol/m$^3$. Further, the exposed surface of the elastomeric polymer exhibits an initial ice adhesion strength of less than or equal to about 100 kPa prior to exposure to icing conditions and an ice adhesion strength after 10 cycles of icing and deicing conditions that increases less than or equal to about 50% above the initial ice adhesion strength.

In other variations, the present disclosure provides a durable icephobic article comprising an exposed surface of the article that has an elastomeric polymer having a crosslink density of less than or equal to about 1,300 mol/m$^3$. The elastomeric polymer on the exposed surface exhibits an initial ice adhesion strength of less than or equal to about 100 kPa prior to exposure to icing conditions. An ice adhesion strength after 10 cycles of icing and deicing conditions increases less than or equal to about 50% above the initial ice adhesion strength and the exposed surface is free of any layers of free liquid formed thereon.

In yet other variations, a durable icephobic material comprises an elastomeric urethane-based polymer defining an exposed surface and having a crosslink density of less than or equal to about 200 mol/m$^3$. The exposed surface of the elastomeric polymer exhibits an initial ice adhesion strength of less than or equal to about 50 kPa prior to exposure to icing conditions and an ice adhesion strength after 10 cycles of icing and deicing conditions that is less than or equal to about 50% above the initial ice adhesion strength. The exposed surface of the elastomeric urethane-based polymer is free of any layers of liquid. In certain other aspects, such a durable icephobic material further comprises a liquid miscible with and distributed within the urethane-based elastomeric polymer that enables interfacial slippage. The exposed surface of the urethane-based elastomeric polymer is free of any layers of the liquid formed thereon.

In certain other variations, a durable icephobic material comprises an elastomeric polymer comprising polydimethylsiloxane (PDMS) that defines an exposed surface and has a crosslink density of less than or equal to about 200 mol/m$^3$. The exposed surface of the elastomeric polymer exhibits an initial ice adhesion strength of less than or equal to about 50 kPa prior to exposure to icing conditions and an ice adhesion strength after 10 cycles of icing and deicing conditions that is less than or equal to about 50% above the initial ice adhesion strength. The exposed surface of the elastomeric polymer is free of any layers of liquid.

In other variations, a durable icephobic material comprises a polydimethylsiloxane (PDMS) coating exhibiting interfacial slippage that is formed by reacting a PDMS-silane with a substrate. An exposed surface of the PDMS coating is omniphobic and exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength.

In certain variations, a durable icephobic material is further provided that defines an exposed surface comprising a linear polymer and one or more plasticizers. The exposed surface of the linear polymer is free any layers of liquid and exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength.

In yet other variations, the present disclosure provides a method of making a durable icephobic article. Such a method comprises forming an elastomeric polymer on a substrate. In certain aspects, the method may comprise applying a precursor of an elastomeric polymer on a substrate. Then, the precursor is cured and/or crosslinked to form a durable elastomeric polymer having a crosslink density of less than or equal to about 1,300 mol/m$^3$. The elastomeric polymer exhibits an initial ice adhesion strength of less than or equal to about 100 kPa prior to exposure to icing conditions. An ice adhesion strength after 10 cycles of icing and deicing conditions increases less than or equal to about 50% above the initial ice adhesion strength. An exposed surface of the elastomeric polymer is free of any layers of free liquid formed thereon.

In yet other variations, the present disclosure also provides a method of making a durable icephobic article comprising applying a polydimethylsiloxane (PDMS)-silane precursor on a substrate and reacting the PDMS-silane precursor to form a durable icephobic coating comprising a polydimethylsiloxane (PDMS) having interfacial slippage and exhibiting an initial ice adhesion strength of less than or equal to about 100 kPa prior to exposure to icing conditions and an ice adhesion strength after 10 cycles of icing and deicing conditions that that is less than or equal to about 50% above the initial ice adhesion strength. An exposed surface of the durable icephobic coating is free of any layers of free liquid formed thereon.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows ice adhesion strength (z) versus receding water contact angle (θ) for various icephobic surfaces fabricated in accordance with the certain aspects of the present disclosure.

FIGS. 2A-2D show various mechanisms for ice adhesion, including lubrication surfaces and interfacial slippage. FIG. 2A shows a graph of polydimethylsiloxane (PDMS)-based coatings of low or high crosslink density ($\rho^{CL}$) with or without interfacial slippage present. FIG. 2B shows a graph with the relationship between $\rho^{CL}$ and ice adhesion strength ($\tau_{ice}$) for coatings without interfacial slippage, produced from PDMS, polyurethane (PU), fluorinated polyurethane (FPU) and perfluoropolyether (PFPE) elastomers. Error bars are one standard deviation and the best fit is found using the method proposed by York. The slope is 0.51±0.04. FIG. 2C shows a graph of the variation of $\tau_{ice}$ with $\rho^{CL}$ for coatings with interfacial slippage. The slope is 1.01±0.03. FIG. 2D shows a graph of the ice-reducing-potential (I*) measured for coatings with and without interfacial slippage but the same $\rho^{CL}$, within 5% error. Error bars are one standard deviation and $R^2$=0.89.

FIGS. 3A-3D show a comparison of distinct mechanisms for ice adhesion, namely lubrication versus interfacial slippage. FIG. 3A shows an ice adhesion strength versus 10 icing/de-icing cycles, where icephobic properties of surfaces based on interfacial slippage in accordance with certain aspects of the present disclosure are shown to be maintained in comparison to lubricated surfaces. A surface designated to be a lubricant surface has a spincast lubricant/oil rubbed onto the surface, but there is no distinct lubricant surface coating of oil in accordance with certain aspects of the present disclosure. A lubricated surface has a coating with a continuous layer of excess lubricant/oil formed on the surface. A surface designated to have interfacial slippage has a lubricant/oil dispersed in the polymer matrix, but no distinct layers of lubricant on the surface. FIG. 3B shows ice adhesion strength versus viscosity for three samples, including two coatings that are lubricated and one coating with interfacial slippage, showing that lubricated surfaces strongly depend on viscosity, whereas surfaces with interfacial slippage are markedly independent of viscosity. FIG. 3C shows AFM phase images and optical micrographs of a PU coating with 15 wt. % safflower oil prepared in accordance with certain aspects of the present disclosure with no lubricating layer present. FIG. 3D shows AFM phase images and optical micrographs of the PU coating with 10% silicone oil. The lubricating layer is clearly visible.

FIGS. 4A-4C show durability of icephobic elastomeric polyurethane (PU) prepared in accordance with certain aspects of the present disclosure during outdoor testing during the winters of 2013-2014. FIG. 4A shows 4 months of outdoor testing of a license plate sample having one half uncoated and one half coated with the icephobic PU coating. FIG. 4B shows a graph of durability testing for the PU coating showing ice adhesion strengths after different treatments. The inset shows a half-coated license plate during outdoor winter 2013 testing, with ice only accreted on the uncoated side. FIG. 4C shows the polyurethane coating shown remains icephobic even after 5000 Taber® abrasion cycles and can withstand extreme mechanical deformation (inset). This is also one of the first examples of a hydrophilic, yet icephobic surface.

FIGS. 5A-5C show degradation of a liquid surface layer. FIG. 5A shows an evaluation of a conventional slippery liquid-infused porous surface-based (SLIPS) icephobic coating over multiple icing/de-icing cycles. FIG. 5B shows the force versus time curve for an icephobic coating made according to certain aspects of the present disclosure comprising SYLGARD™184 PDMS elastomer with crosslinker at 1:1 ratio with 100 cP silicone oil, which has an initial ice adhesion strength of 0.15 kPa (designated Coating Q). The 'x' symbol demarcates when the ice is first un-adhered from the coating. FIG. 5C shows the effect of oil content in an inventive icephobic coating formed of polyurethane (PU) elastomer on ice adhesion strength ($\tau_{ice}$) after normalizing by $\rho^{CL}$. The miscibility limit of safflower oil is around 16 wt. %, where a transition from interfacial slippage to a lubricated system occurs.

FIGS. 6A-6B show tensile test data for an icephobic polyurethane elastomeric rubber (VYTAFLEX™ 40 with 15 wt. % safflower oil) prepared in accordance with certain aspects of the present disclosure. FIG. 6A shows graph of stress-strain results for this icephobic coating. FIG. 6B shows a graph re-plotting the data of FIG. 6A, using Mooney-Rivlin axes allows $\rho^{CL}$ to be discerned (intercept of the y-axis at infinite elongation).

FIGS. 7A-7C show additional data for interfacial slippage mechanisms for coatings prepared in accordance with certain principles of the present disclosure. FIG. 7A shows a graph comparison of ice adhesion strength for four samples sent to United States Army's Cold Regions Research and Engineering Laboratory (CRREL) independently evaluated in Mode-I type (peel test) adhesion testing. The CRREL data points (Mode-I) are the average of two different samples tested once, whereas the in-house data points (Mode-II) are the average of at least 10 subsequent measurements. FIG. 7B shows a graph of low temperature studies for a polyurethane elastomer filled with 15 wt. % vegetable, cod liver or safflower oil prepared in accordance with certain aspects of the present disclosure. The increase in ice adhesion indicates the loss of interfacial slippage, caused by the freezing of the fatty acid chains. The polyunsaturated fatty acid content increases from vegetable to cod liver to safflower oil. FIG. 7C shows an AFM phase image of the PU coating without oil.

FIG. 8 shows a graph of ice adhesion strength ($\tau_{ice}$) versus successive icing/deicing test numbers for superhydrophobic and icephobic surfaces. The lower left insert is an SEM image showing a silicon mold with a square array of holes (see inset on lower left) that allows the fabrication of icephobic ($\tau_{ice}$=26±3 kPa), PDMS-based micro-pillars pillars (having a scale bar of 75 μm). The insert on the lower right shows a photograph on a superhydrophobic and icephobic coated surface with droplets of water placed on such a surface display superhydrophobicity, with advancing water contact angle/receding water contact angle ($\theta_{water}^{adv}/\theta_{water}^{rec}$) of 165°/161° and a low roll-off angle of 3°. For 20 successive icing/de-icing cycles on such surfaces, the ice adhesion strength ($\tau_{ice}$) measures 26±3 kPa.

FIGS. 9A-9G show icephobicity of coated mesh substrates. FIG. 9A shows the parameter space of mesh properties evaluated. FIG. 9B shows the effect of dip coat solution concentration on % open area. FIG. 9C is an SEM micrograph of a PDMS coated, mesh 500. FIG. 9D shows frost all around the ice testing setup, including beneath the suspended mesh. FIG. 9E shows ice adhesion strength ($\tau_{ice}$) versus the % open area of meshes with D=140 μm (where D is a diameter). FIG. 9F shows $\tau_{ice}$ versus $D^2$ for meshes with an open area of 30%. FIG. 9G shows $\tau_{ice}$ for a coated mesh correlates very well with the predictor $D^2r$, where r is the Wenzel roughness and D is the wire diameter. The low interfacial area between ice and the substrate can significantly lower $\tau_{ice}$. A PDMS-coated ($\rho^{CL}$=219±13 mol/m$^3$, 25 wt. % 100 cP silicone oil) mesh with a wire diameter of 140 μm and an open area of 59% displayed $\tau_{ice}^{mesh}$=2.4±0.5 kPa, whereas $\tau_{ice}^{mesh}$=35±5 kPa. The inset shows the experimental setup for suspended metal mesh ice adhesion testing.

FIGS. 10A-10D show graphs of force (Newtons) versus time (seconds) analysis. More specifically, the graphs show force versus time curves for different icephobic coated surfaces. A surface designated to be a lubricant surface has a spincast oil rubbed onto the surface, but there is no distinct layer of lubricant on the surface in accordance with certain aspects of the present disclosure. A lubricated surface has a coating with excess oil formed as a layer thereon. Both lubricant and lubricated polydimethylsiloxane coated surfaces ($\rho^{CL}$=52±1 mol/m$^3$, 25 wt. % 100 cP silicone oil) and polyurethane ($\rho^{CL}$=33±1 mol/m$^3$, 15 wt. % safflower oil) coated surfaces are prepared and tested, each of which are also shown in FIG. 3A. The number next to each curve is the order in which they occurred.

FIGS. 11A-11B show elastomer solubility parameter determination. FIG. 11A shows a graph of equilibrium swell ratios for the PU as a function of the probe solvent's solubility parameter, $\delta_{solvent}$. The data is fitted to a Gaussian. FIG. 11B shows a graph of equilibrium swell ratios for the FPU as a function of $\delta_{solvent}$. The data is fitted to a bi-modal Gaussian, accounting for the swelling of the fluorinated and urethane components independently. The peak around 19 MPa$^{1/2}$ is characteristic or the urethane bond.

Figures 14A, 14B:
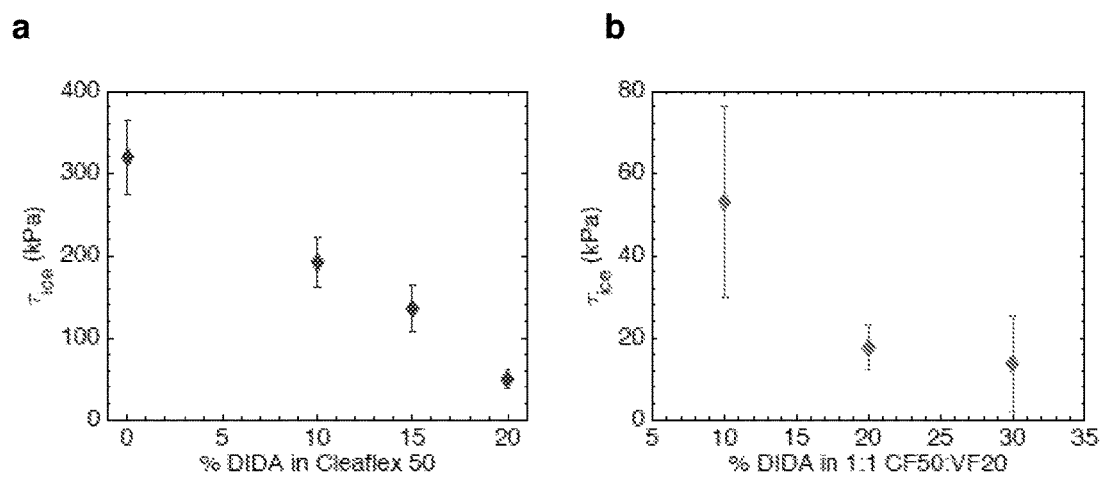

FIGS. 14A-14B show ice adhesion strength ($\tau_{ice}$) of icephobic urethane-based elastomeric materials according to certain variations of the present disclosure. FIG. 14A shows ice adhesion strength of an icephobic urethane-based CLEARFLEX 50™ elastomeric material versus a weight percentage of diisodecyl adipate (DIDA) plasticizer within the coating. FIG. 14B shows ice adhesion strength of a 1:1 mixture of CLEARFLEX 50™ and VYTAFLEX 20™ urethane elastomers filled with varying amounts of DIDA.

Figure 15:
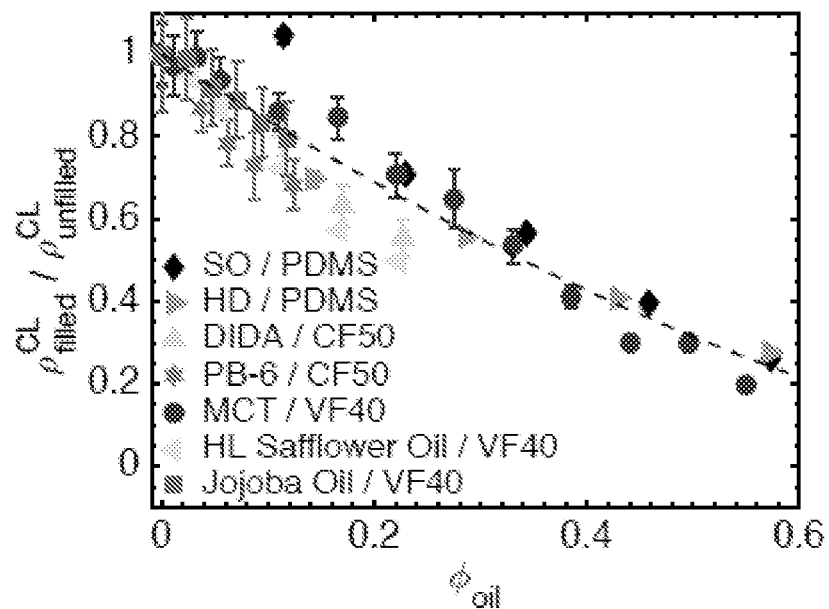

FIG. 15 shows a reduction in crosslink density of three different elastomers (CF50 urethane-based CLEARFLEX 50™ elastomeric material, VF40—icephobic urethane-based VYTAFLEX 40™ elastomeric material, and PDMS—polydimethylsiloxane) when filled with seven different oils (SO—silicone oil, HD—hexadecane, DIDA—diisodecyl adipate, PB-6—liquid polybutene lubricant, MCT—medium chain triglyceride, and HL—high linoleic) prepared according to certain aspects of the present disclosure.

Figure 16:
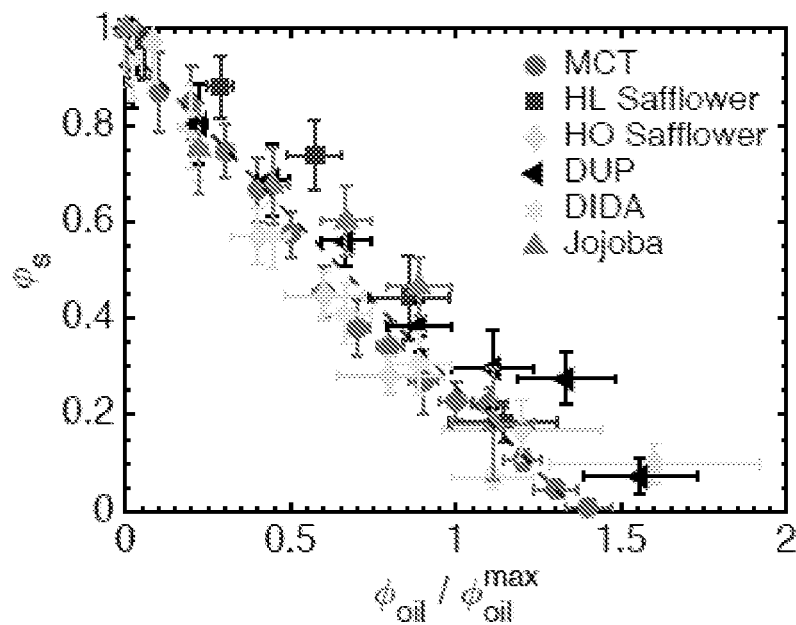

FIG. 16 shows a fraction of oil on an exposed surface of an icephobic urethane-based VYTAFLEX 40™ material embedded with 6 different oils versus an amount of oil within the coating. The oils include medium-chain triglyceride (MCT), high linoleic safflower oil (HL Safflower), high oleic safflower oil (HO Safflower), diundecyl phthalate (DUP), diisodecyl adipate (DIDA), and jojoba oil prepared according to certain aspects of the present disclosure.

Figure 17:
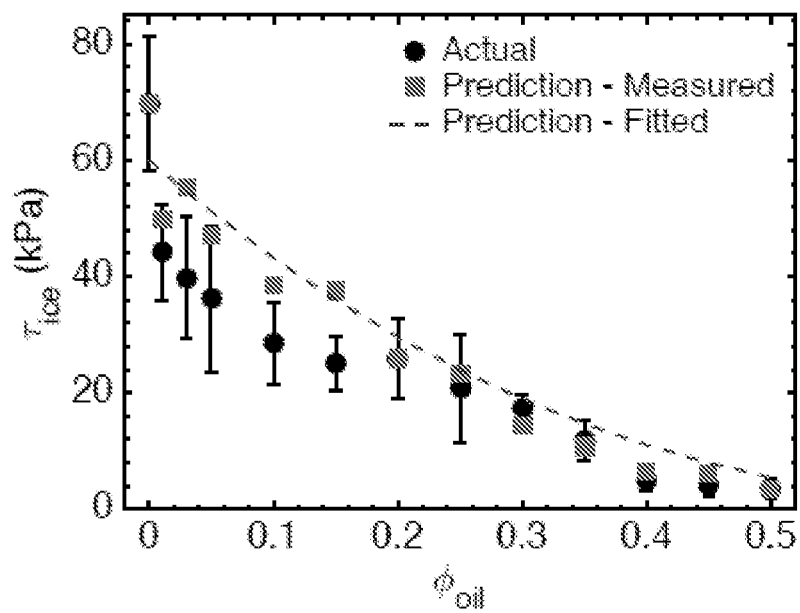

FIG. 17 shows predicted measured, predicted fitted, and actual ice adhesion strengths ($\tau_{ice}$) for icephobic urethane-based VYTAFLEX 40™ elastomeric material filled with medium-chain triglyceride (MCT) according to certain aspects of the present disclosure.

Figure 18:
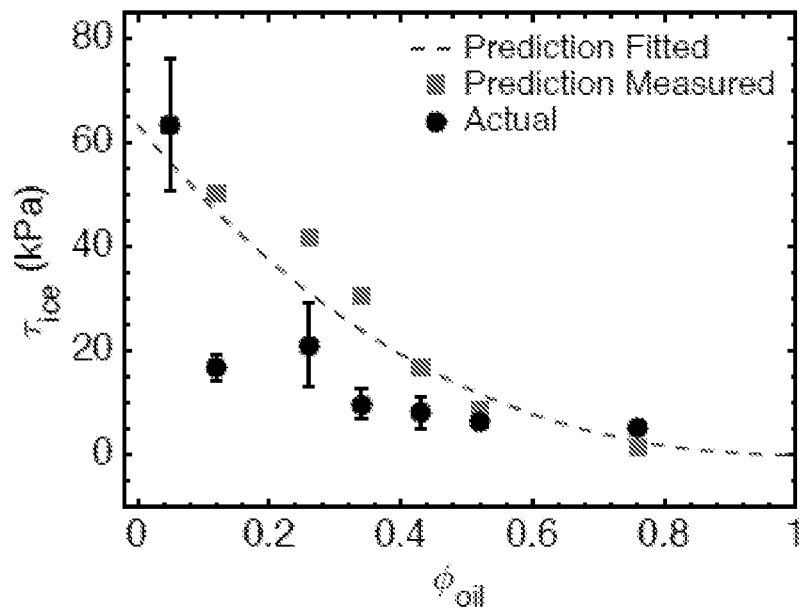

FIG. 18 shows predicted measured, predicted fitted, and actual ice adhesion strengths of an icephobic PDMS elastomer filled with silicone oil according to certain aspects of the present disclosure.

Figure 19:
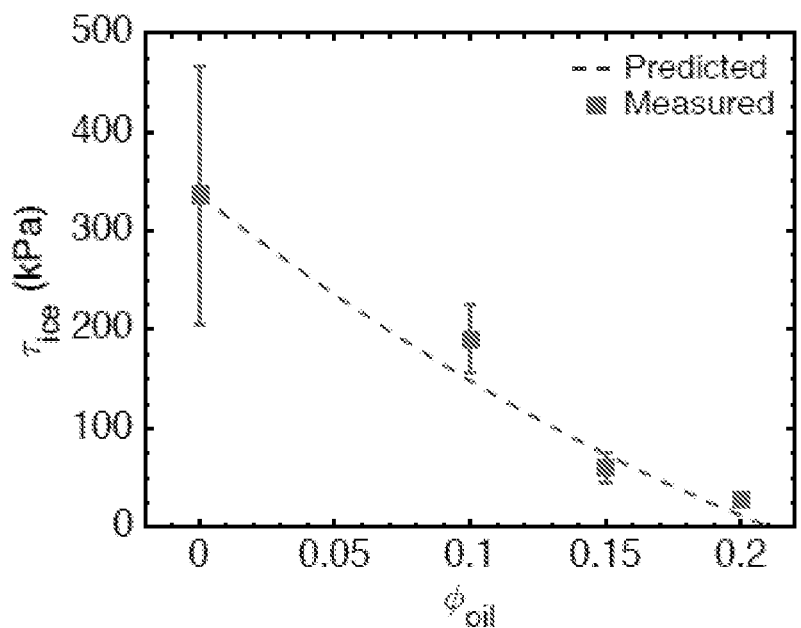

FIG. 19 shows predicted and actual ice adhesion strengths ($\tau_{ice}$) for a polystyrene linear polymer filled with diisodecyl adipate (DIDA) according to certain aspects of the present disclosure.

Figure 20:
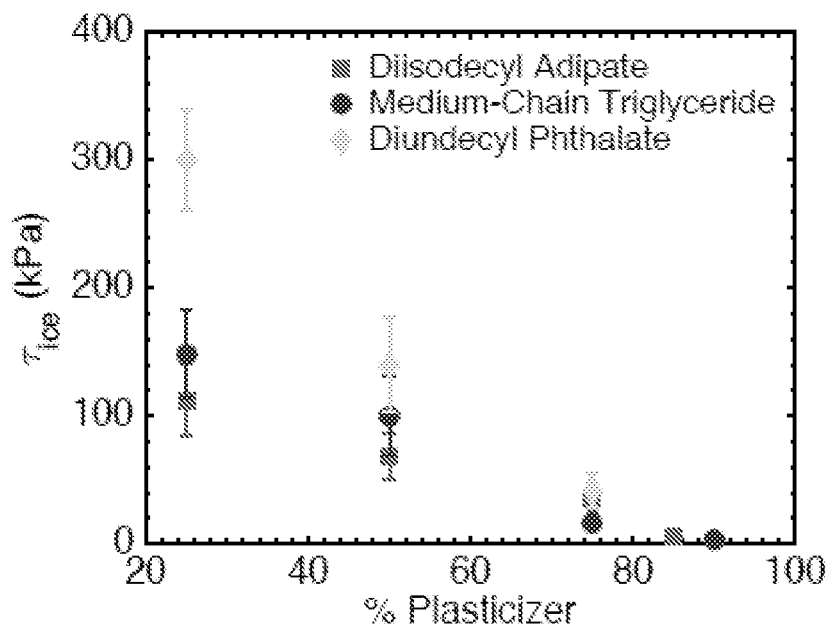

FIG. 20 shows ice adhesion strength of a linear poly(vinyl chloride) (PVC) polymer plasticized with three different plasticizers at varying concentrations (diisodecyl adipate (DIDA), medium-chain triglyceride (MCT) and diundecyl phthalate (DUP)) according to certain aspects of the present disclosure.

Figure 21:
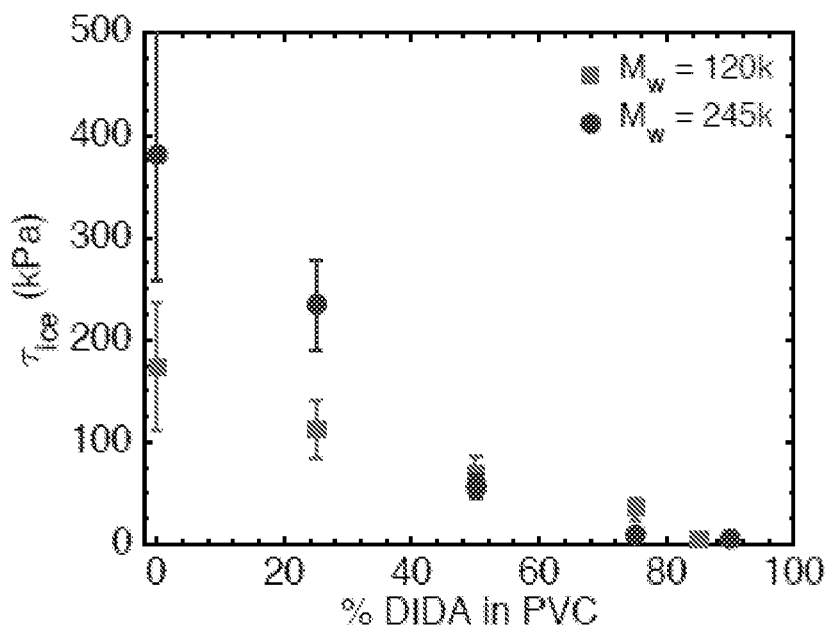

FIG. 21 shows ice adhesion strengths ($\tau_{ice}$) of poly(vinyl chloride) (PVC) polymer of two different molecular weights ($M_W$=120,000 or 245,000), plasticized with diisodecyl adipate (DIDA) at varying concentrations.

Figure 22:
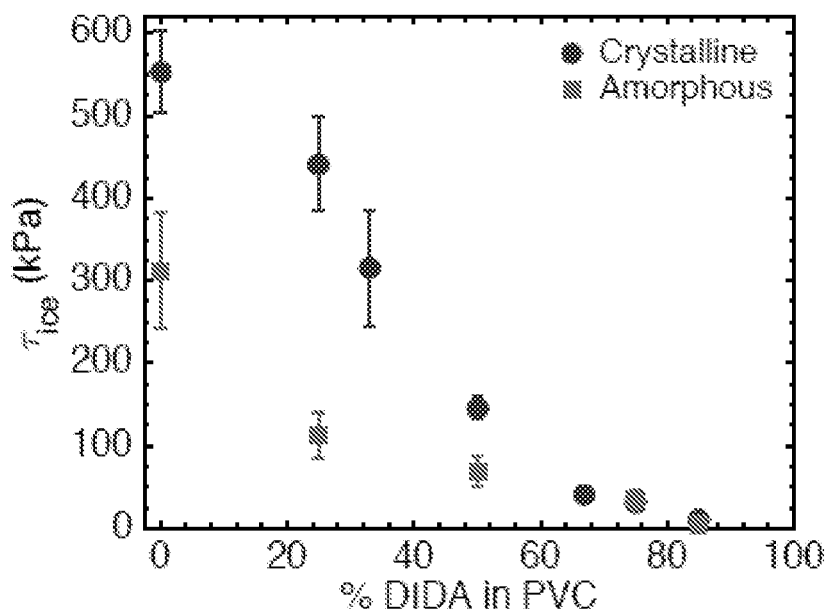

FIG. 22 shows an effect of curing diisodecyl adipate (DIDA)-plasticized poly(vinyl chloride) (PVC) by two different methods on its ice adhesion strength ($\tau_{ice}$) showing both a crystalline and amorphous PVC material.

Figure 23:
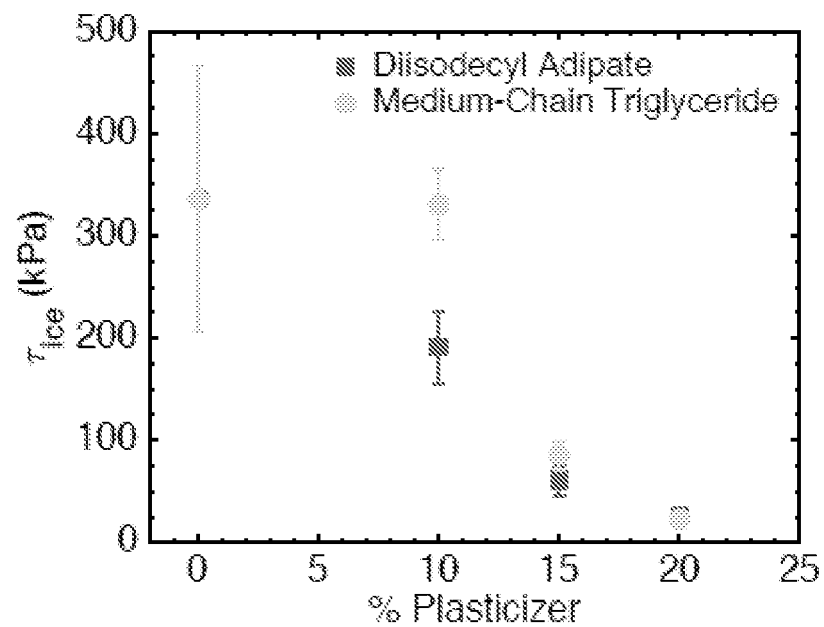

FIG. 23 shows the effect of plasticizing polystyrene (PS) with diisodecyl adipate (DIDA) or medium chain triglyceride (MCT) on ice adhesion strength, where the greater amount of plasticizer results in lower ice adhesion strengths.

Figure 24:
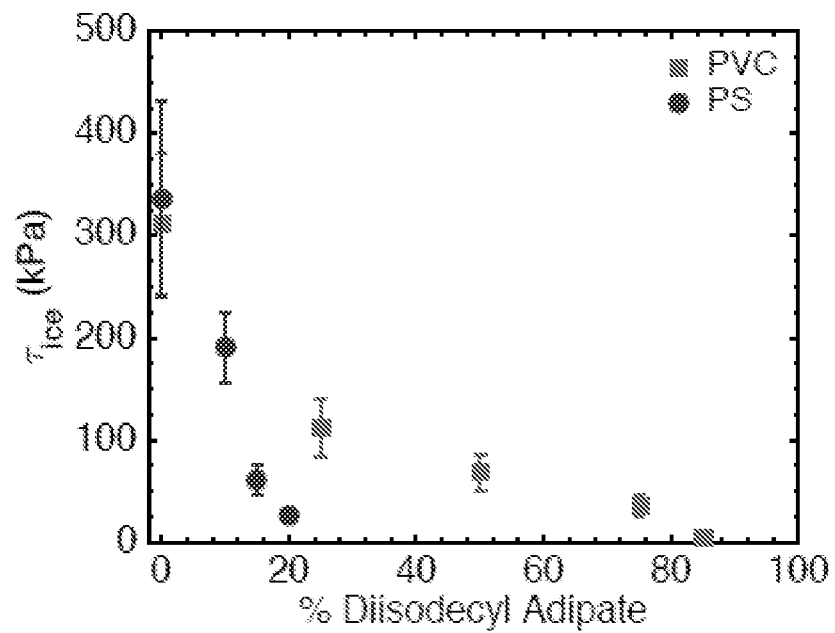

FIG. 24 shows ice adhesion strength reduction between polystyrene (PS) and poly(vinyl chloride) (PVC) as a function of diisodecyl adipate (DIDA) concentration.

Figure 25:
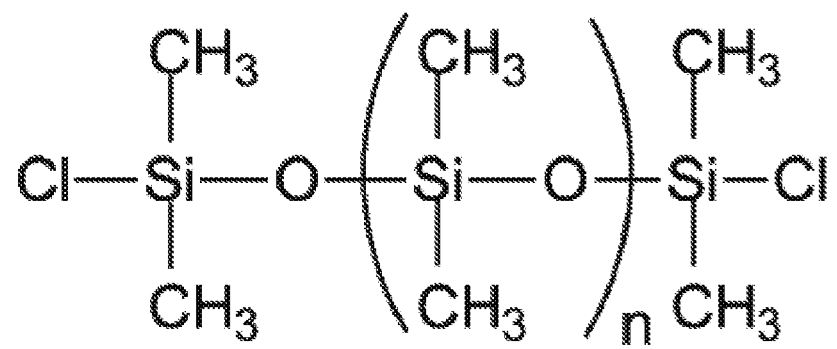

FIG. 25 shows a polydimethylsiloxane (PDMS)-silane structure used to form an icephobic polydimethylsiloxane (PDMS) coating exhibiting interfacial slippage, where the PDMS-silane has two terminal chlorine functional groups in accordance with certain aspects of the present disclosure.

Figure 26:
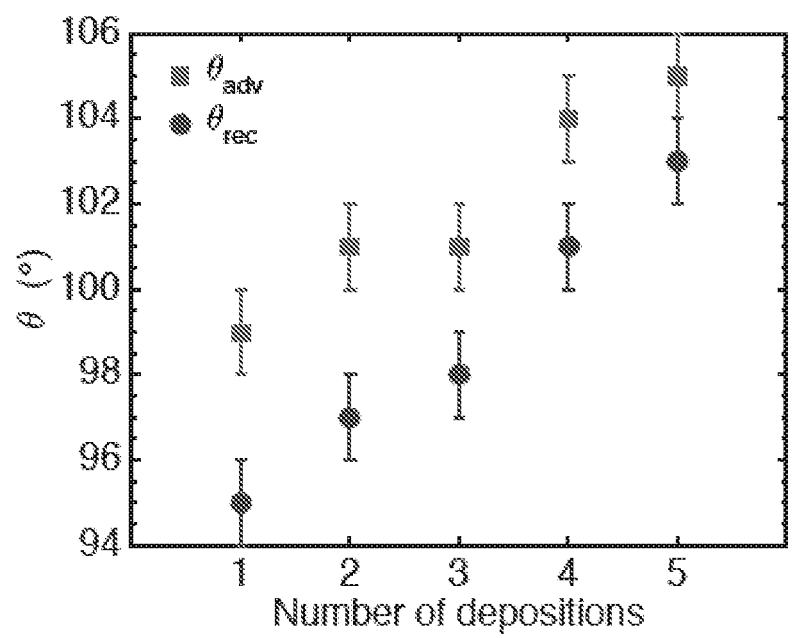

FIG. 26 shows water contact angles versus number of deposition cycles for a silicon wafer coated with an icephobic polydimethylsiloxane (PDMS) coating formed from a PDMS-silane (1,3 dichlorotetramethyldisiloxane (n=0)) according to certain aspects of the present disclosure.

Figure 27:
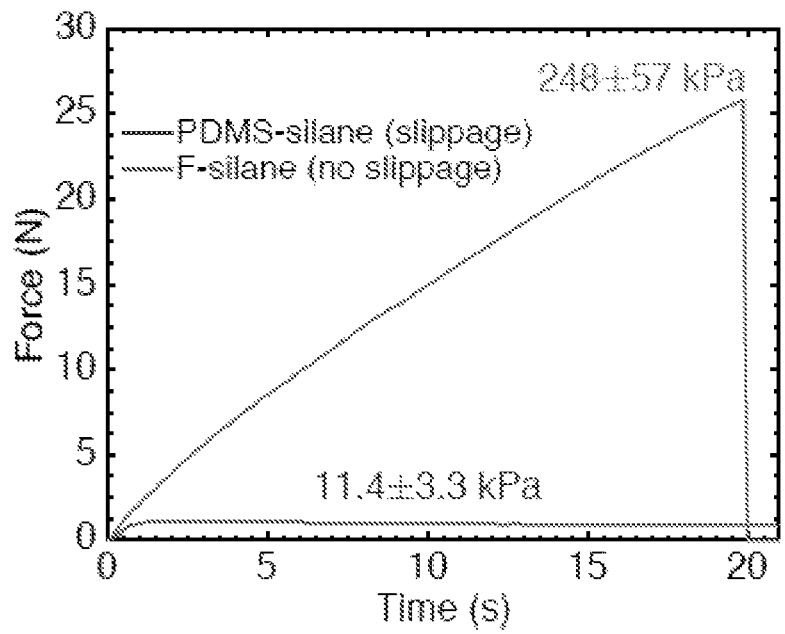

FIG. 27 shows force versus time curves for ice adhesion for two silicon wafers that have been silanized with a comparative fluoro-silane (which does not cause interfacial slippage) or a PDMS-silane (which does cause interfacial slippage) according to certain aspects of the present disclosure.

Figure 28:
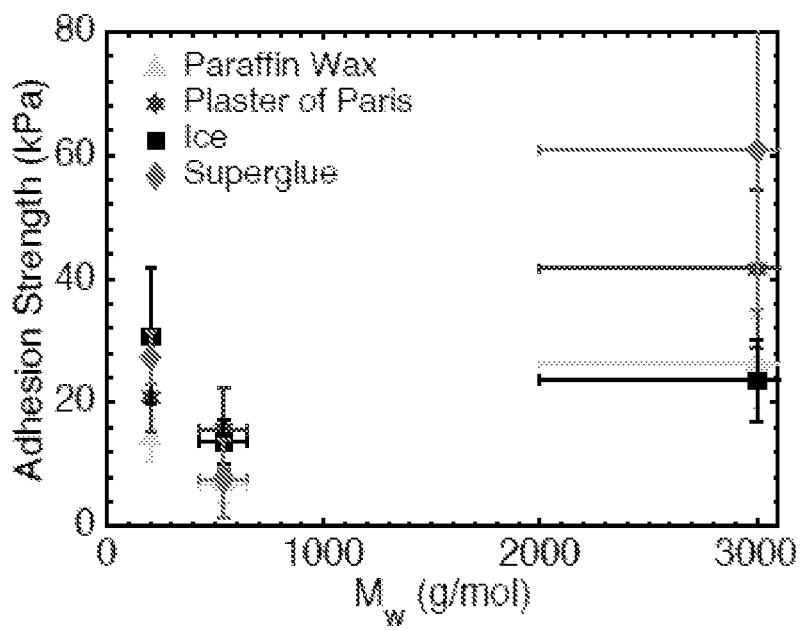

FIG. 28 shows adhesion strengths for four different solid materials versus molecular weight for a PDMS-silane precursor that forms an icephobic polydimethylsiloxane (PDMS) coating according to certain aspects of the present disclosure. The solids include paraffin wax, plaster of Paris, ice, and superglue (epoxy glue).

Figure 29:
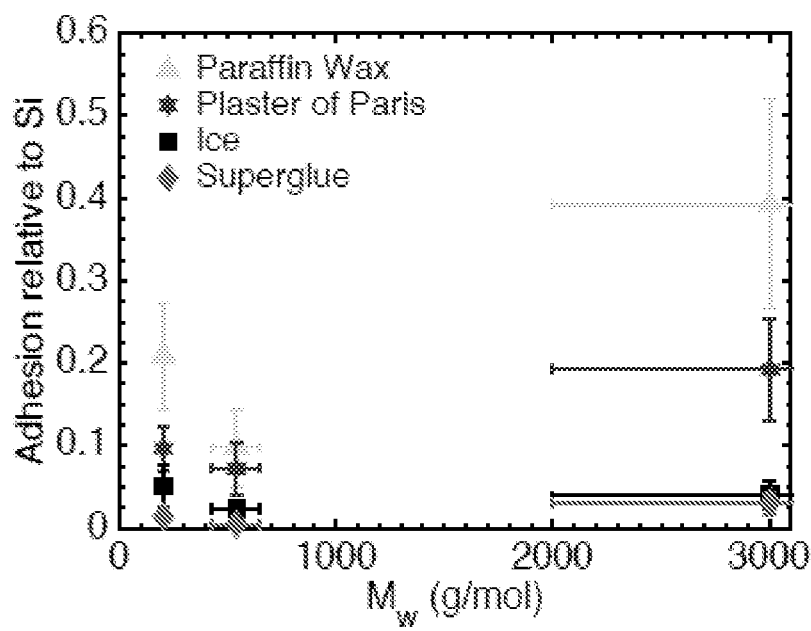

FIG. 29 shows adhesion strength relative to an untreated silicon wafer for four different solid materials versus molecular weight for a PDMS-silane precursor that forms an icephobic polydimethylsiloxane (PDMS) coating according to certain aspects of the present disclosure. The solids include paraffin wax, plaster of Paris, ice, and superglue (epoxy glue).

Figure 30:
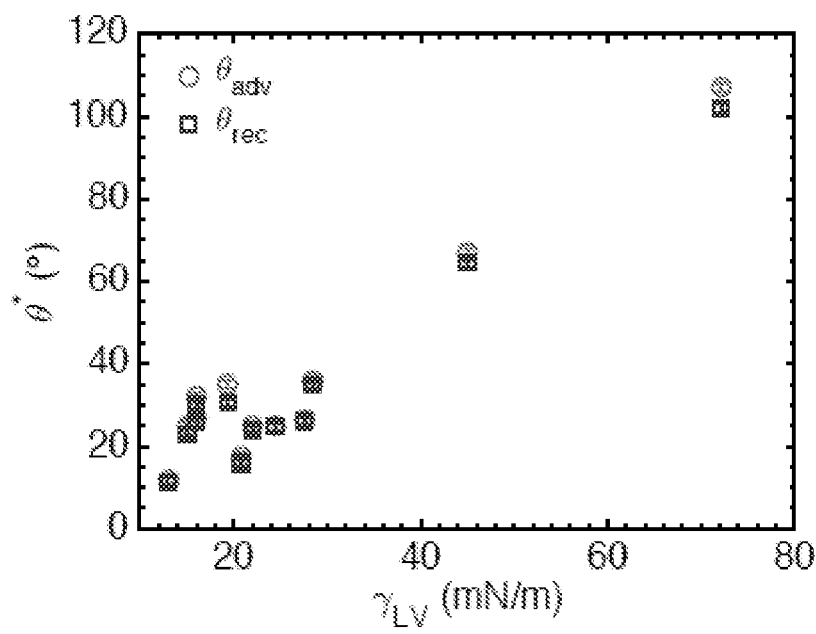

FIG. 30 shows advancing and receding contact angles on PDMS-silanized silicon wafers prepared in accordance with certain aspects of the present disclosure versus the surface tension of the probe liquid.

Figure 31:
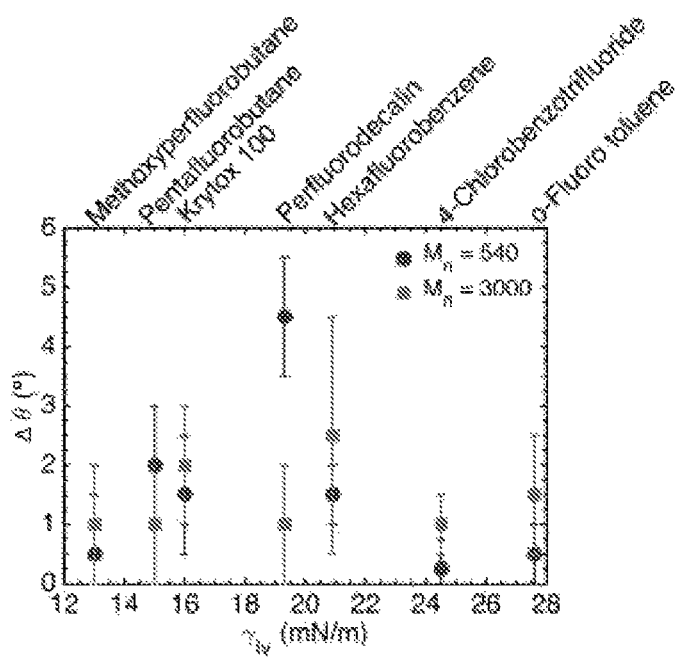

FIG. 31 shows contact angle hysteresis, Δθ, the difference between the advancing and receding contact angles, of seven fluoro-solvents for silicon wafers silanized with PDMS-silanes of two different chain lengths (molecular number $M_N$=540 or 3000) in accordance with certain aspects of the present disclosure.

Figure 32:
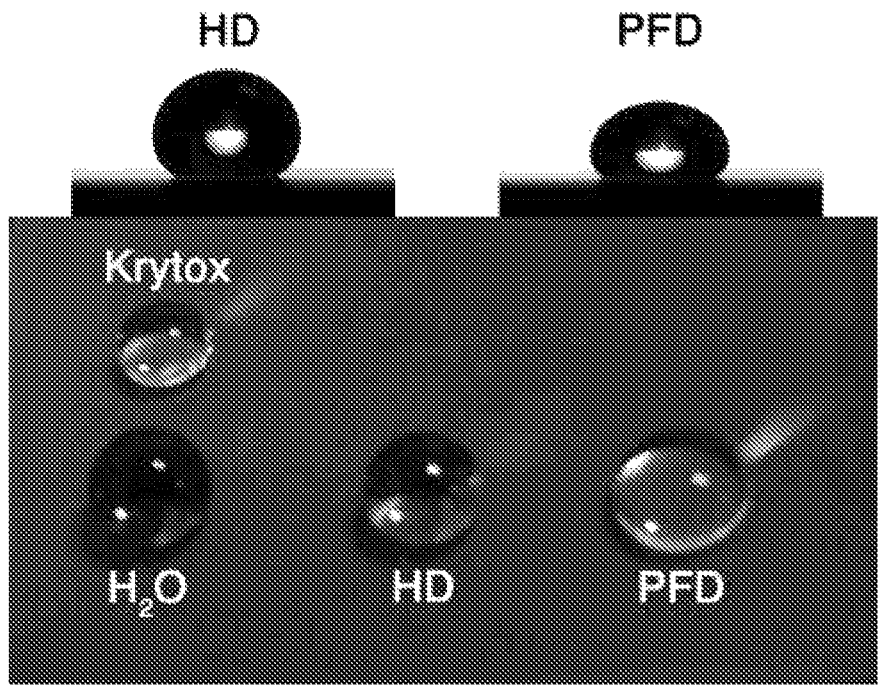

FIG. 32 shows micro-hoodoos treated with 1,3 dichloro-tetramethyldisiloxane (n=0 PDMS-silane) are rendered superomniphobic. Hexadecane (top left—HD) and perfluorodecalin (top right—PFD) both exhibit high contact angle and roll of the surface when tilted. KRYTOX 105™, a perfluoropolyether lubricant, is also repelled by such a surface (bottom).

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, elements, compositions, steps, integers, operations, components and/or groups thereof.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

Unless otherwise indicated, percentages and ratios are by mass/weight.

The disclosures and relevant content of all references cited or discussed in this disclosure are incorporated by reference herein, unless otherwise indicated.

Example embodiments will now be described more fully with reference to the accompanying drawings.

The adhesion between ice and many materials has been extensively studied. Certain conventional surface coatings have been developed to exhibit "icephobic" properties, including delaying water droplet freezing time, preventing or minimizing frost formation, and/or lowering ice adhesion strength ($\tau_{ice}$). Icephobic surfaces are generally defined as having an ice adhesion strengths ($\tau_{ice}$) of less than or equal to about 100 kPa. In comparison, structural materials like aluminum or steel have extremely high $\tau_{ice}$, around 1,600 and 1,400 kPa, respectively. Further, it is desirable to be able to remove ice passively from a surface without inputting significant amounts of external energy (whether mechanical, chemical, or thermal) to remove the ice. The passive removal of ice typically requires much lower values of $\Sigma_{ice}$ for applications such as airplane wings ($\tau_{ice} \leq 80$ kPa). For other applications that experience even lower shear stresses, like power lines or boat hulls, ice adhesion strength values ($\tau_{ice}$) of less than or equal to about 20 kPa are typically required to enable passive ice removal. However, coatings or other materials having such low ice adhesion strengths are rare. Further, no mechanically durable coatings have been capable of maintaining such low ice adhesion strengths over extended periods of use.

Previously, it was believed that increasing the hydrophobicity of a surface led to a practical lower limit of ice adhesion strength. Ice adhesion strength is provided by: $\tau_{ice} = B\gamma(1+\cos\theta_{rec})$, where B is an experimental constant, $\gamma$ is the surface tension of water and $\theta_{rec}$ is the receding water contact angle. For non-textured surfaces, this gives a theoretical lower limit for $\tau_{ice}$ of approximately 150 kPa (as the maximum $\theta_{rec}^{water} \approx 120°$). Superhydrophobic surfaces display $\theta_{rec}^{water}$ of greater than or equal to about 120°, and have been the focus of active studies for their icephobic properties. By trapping pockets of air within their porous textures, superhydrophobic surfaces are able to easily shed water droplets.

However, conventional superhydrophobic surfaces surprisingly suffer from significant drawbacks with regard to exhibiting icephobicity. At low temperatures, in a humid atmosphere, frost formation can readily occur within the pores of a superhydrophobic surface. Once this water has frozen, the high contact area between the ice and the superhydrophobic surface leads to extremely high ice adhesion strengths, even higher than flat aluminum in certain cases. Thus, condensation and frost formation can readily occur within the pores of a superhydrophobic surface at low temperatures leading to extremely high values of $\tau_{ice}$. As such, typically superhydrophobic surfaces can only delay ice formation, not prevent it. For example, it is believed that the longest a superhydrophobic surface has delayed icing is only about 2 hours under outdoor conditions and only about 25 hours in more favorable laboratory settings.

Figures 5A, 5B, 5C:
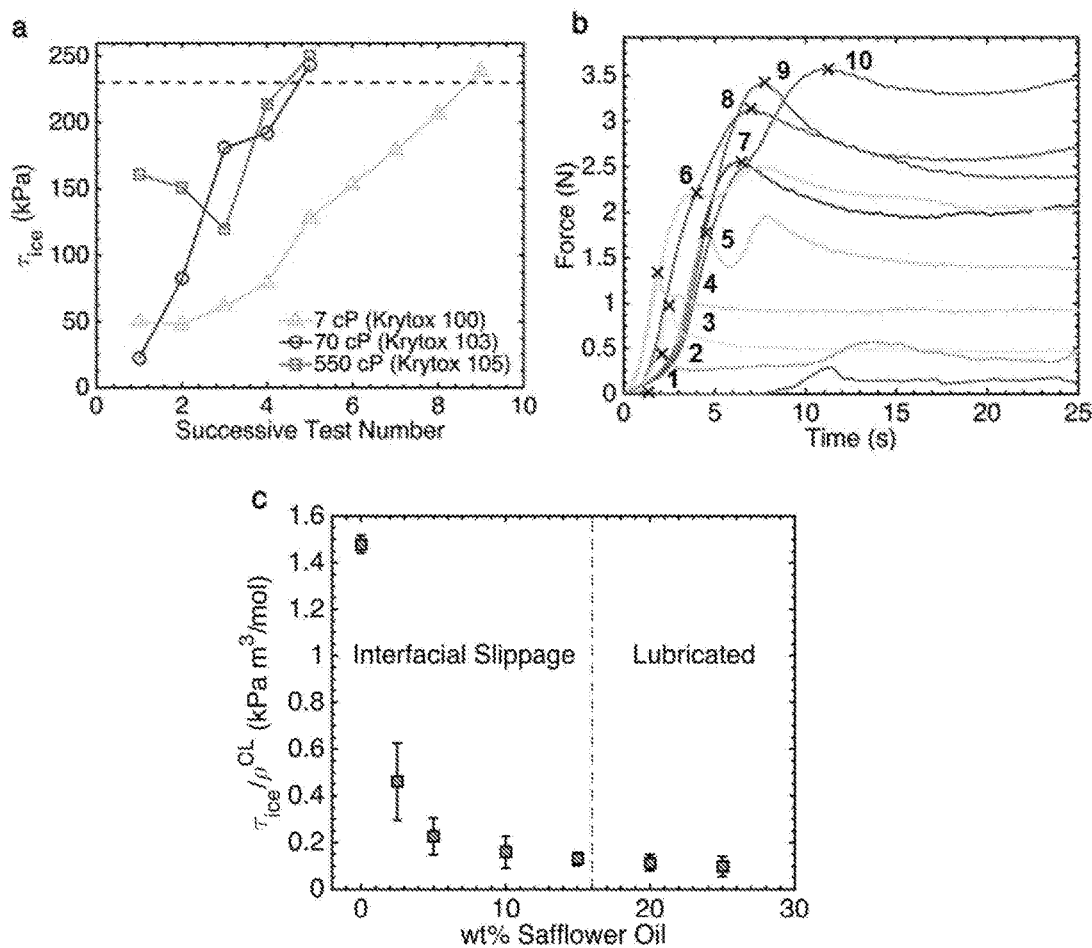

Avoidance of frost formation within the pores of superhydrophobic materials has been attempted by filling the pores with perfluorinated oils. The lowest $\tau_{ice}$ values published to date ($\tau_{ice}=16$ kPa) have been reported on such surfaces. However, the icephobicity for such surfaces is short-lived, as the oil in the pores may be easily displaced and removed by water droplets, frost or simply the act of shearing off the accreted ice (ice adhesion strength performance of a sample with such a surface is shown in FIG. 5A). Thus, such low $\tau_{ice}$ values are rare. Further, there are no known robust, durable icephobic surface coatings capable of maintaining low ice adhesion strengths (e.g., $\tau_{ice}<20$ kPa) over extended use and repeated icing/deicing cycles.

In accordance with certain aspects of the present disclosure, durable, robust icephobic materials having sustained low ice adhesion strengths are provided. In certain aspects, the durable icephobic materials are surface coatings on an article. Exemplary and non-limiting articles include parts or components having surfaces potentially exposed to ice and snow conditions, including aircraft, vehicles, marine vessels and marine equipment, outdoor equipment, structures, and buildings, snow or ice removal equipment, outdoor recreational equipment, sports equipment, wind turbines, telecommunications equipment, power lines, combinations and equivalents thereof. Such icephobic materials can provide long-term, durable icephobic properties on such surfaces, including maintaining low ice adhesion strength over time.

When the icephobic materials of the present disclosure are in the form of a coating on an article, they may be applied to a variety of different surfaces or substrates. The coating materials of the present disclosure are generally compatible with a wide range of substrate materials. Therefore, in certain exemplary embodiments, the substrate may be porous or non-porous and may formed of plastic or polymeric materials, metallic materials, inorganic materials, organic materials (such as materials derived from plants or animals), and combinations thereof. In certain aspects, the substrate is constructed from one or more materials selected from the group consisting of metal, such as sheet metal, cast metal, forged metal, and the like, composite materials comprising resin and reinforcing materials, plastic or polymeric materials, screens, mesh, paper, fibrous materials and cloth, foam, equivalents, and combinations thereof. The substrate may also comprise a plurality of three-dimensional structures, such as pillars, nubs, posts, ribs, and the like.

In certain variations, where the icephobic materials of the present disclosure are in the form of a polymeric or elastomeric coating on a surface or substrate, the coating may have a thickness of greater than or equal to about 0.5 µm, optionally greater than or equal to about 1 µm, optionally greater than or equal to about 5 µm, optionally greater than or equal to about 10 µm, optionally greater than or equal to about 25 µm, optionally greater than or equal to about 50 µm, optionally greater than or equal to about 75 µm, optionally greater than or equal to about 100 µm, optionally greater than or equal to about 200 µm, optionally greater than or equal to about 300 µm, optionally greater than or equal to about 400 µm, optionally greater than or equal to about 500 µm, optionally greater than or equal to about 600 µm, optionally greater than or equal to about 700 µm, optionally greater than or equal to about 800 µm, optionally greater than or equal to about 900 µm, optionally greater than or equal to about 1,000 µm (1 mm), optionally greater than or equal to about 2,000 µm (2 mm), optionally greater than or equal to about 3,000 µm (3 mm), optionally greater than or equal to about 4,000 µm (4 mm), and in certain variations, optionally greater than or equal to about 5,000 µm (5 mm). In certain aspects, the icephobic coating materials of the present disclosure may optionally have a thickness ranging from greater than or equal to about 1 µm to less than or equal to about 5 mm. In certain other variations, the icephobic coating materials of the present disclosure may optionally have a thickness ranging from greater than or equal to about 100 µm to less than or equal to about 1,000 µm.

In accordance with certain variations of the present teachings, the durable icephobic material comprises a crosslinked elastomeric polymer having a relatively low crosslink density. The lowering of crosslink density ($\rho^{CL}$) of certain elastomeric polymeric coatings achieves ultra-low ice adhesion strengths. In certain aspects, a crosslinked elastomeric polymer used in a durable icephobic material of the present disclosure may have a crosslink density of less than or equal to about 1,300 mol/m$^3$, optionally less than or equal to about 1,000 mol/m$^3$, as will be described further below. It should be noted that crosslink density may vary depending on the specific polymer system used. In certain variations, the elastomeric material may have a crosslink density that is greater than or equal to about 0.5 mol/m$^3$ to less than or equal to about 200 mol/m$^3$, optionally greater than or equal to about 5 mol/m$^3$ to less than or equal to about 200 mol/m$^3$, optionally greater than or equal to about 20 mol/m$^3$ to less than or equal to about 200 mol/m$^3$, and in certain aspects, optionally greater than or equal to about 20 mol/m$^3$ to less than or equal to about 50 mol/m$^3$.

The durable icephobic material in accordance with certain variations of the present disclosure having an elastomeric polymer may exhibit an initial ice adhesion strength ($\tau_{ice}$) of less than or equal to about 100 kPa before exposure to any icing conditions. In certain variations, suitable ice adhesion strengths ($\tau_{ice}$) exhibited by the durable icephobic materials of the present disclosure are optionally less than or equal to about 80 kPa, optionally less than or equal to about 70 kPa, optionally less than or equal to about 60 kPa, optionally less than or equal to about 50 kPa, optionally less than or equal to about 40 kPa, optionally less than or equal to about 30 kPa, optionally less than or equal to about 20 kPa, optionally less than or equal to about 15 kPa, optionally less than or equal to about 10 kPa, optionally less than or equal to about 9 kPa, optionally less than or equal to about 8 kPa, optionally less than or equal to about 7 kPa, optionally less than or equal to about 6 kPa, optionally less than or equal to about 5 kPa, optionally less than or equal to about 4 kPa, optionally less than or equal to about 3 kPa, optionally less than or equal to about 2 kPa, and in certain variations, optionally less than or equal to about 1 kPa. In certain aspects, the present disclosure provides a range of different elastomeric, icephobic coatings having an ice adhesion strength ($\tau_{ice}$) as low as 0.15 kPa. A surface enabling passive removal of ice typically requires very low values of ice adhesion strengths, which is an advantage provided by the durable icephobic materials of the present disclosure. For example, passive removal of ice occurs in different applications at different ice adhesion strengths, for example, $\tau_{ice}$<80 kPa for airplane wings or $\tau_{ice}$<20 kPa for power lines, by way of non-limiting example. The durable icephobic surfaces of certain variations of the present disclosure have ice adhesion strengths below these levels and thus facilitate passive removal of ice from such surfaces.

Further, the surfaces of the present disclosure provide durable or robust icephobic properties resulting in ice adhesion strength after 10 cycles of icing and deicing conditions that increases less than or equal to about 50% above the initial ice adhesion strength. For example, certain durable icephobic coatings prepared in accordance with the present disclosure have ice adhesion strength levels (e.g., $\tau_{ice}$<10 kPa) that can be maintained over many icing/de-icing cycles, after harsh mechanical abrasion, and even in wintery outdoor freezing conditions (in Michigan) over several months of exposure. Thus, after 10 cycles of icing and deicing, a durable icephobic coating having an initial ice adhesion strength ($\tau_{ice\text{-}initial}$) of less than or equal to about 10 kPa has a subsequent ice adhesion strength after 10 icing/ deicing cycles ($\tau_{ice\text{-}cycling}$) that remains less than or equal to about 15 kPa.

In one variation, the present disclosure provides a durable icephobic material, such as a coating, comprising an elastomeric polymer defining an exposed surface that exhibits an initial ice adhesion strength of less than or equal to about 100 kPa prior to exposure to icing conditions and an ice adhesion strength after 10 cycles of icing and deicing conditions that increases to less than or equal to about 50% more than the initial ice adhesion strength (less than or equal to about 150 kPa). In other variations, the durable or robust icephobic properties of the icephobic materials result in an ice adhesion strength after 20 cycles of icing and deicing conditions that is less than or equal to about 50% above the initial ice adhesion strength, optionally after 30 cycles, optionally after 40 cycles, optionally after 50 cycles, optionally after 60 cycles, optionally after 70 cycles, optionally after 80 cycles, optionally after 90 cycles, optionally after 100 cycles, optionally after 150 cycles, optionally after 200 cycles, and in certain variations, optionally after 300 cycles of icing and deicing conditions, the subsequent ice adhesion strength is less than or equal to about 50% more than the initial ice adhesion strength. In certain aspects, the subsequent ice adhesion strength is less than or equal to about 60% above the initial ice adhesion strength for the icephobic surface, is less than or equal to about 65% above the initial ice adhesion strength, optionally less than or equal to about 70% more than the initial ice adhesion strength, optionally less than or equal to about 75% above the initial ice adhesion strength, optionally less than or equal to about 80% more than the initial ice adhesion strength, optionally less than or equal to about 85% more than the initial ice adhesion strength, optionally less than or equal to about 90% more than the initial ice adhesion strength, and in certain variations, optionally less than or equal to about 95% above the initial ice adhesion strength after 10 cycles of icing and deicing conditions. The icephobic surface may retain such levels of ice adhesion strength (from initial ice adhesion strength to subsequent ice adhesion strength) for any of the additional icing/deicing cycle conditions listed above.

In certain aspects, the durable icephobic materials may be formed of a variety of elastomers capable of forming relatively low crosslink densities. In certain variations, the durable icephobic material has an elastomeric polymer comprising one or more polymers selected from the group consisting of: polyurethane (PU), polydimethylsiloxane (PDMS), fluoroelastomers, perfluoropolyether (PFPE), polymethylphenylsiloxane (PMPS), polymethylhydrosiloxane (PMHS), isocyanate functionalized polydimethylsiloxane (PDMS), fluorinated polyurethane (FPU), acrylates, methacrylates, soybean oil acrylate, polystyrene, natural rubber, vulcanized rubber, synthetic rubber, butyl rubber, latex, polychloroprene, acrylonitrile butadiene rubber, styrene butadiene rubber, elastomers made from ethylene propylene diene monomer (EPDM) rubber, epichlorohydrin, as well as organogels, hydrogels, copolymers and combinations thereof. In certain variations, the durable icephobic material comprises a urethane-based elastomeric coating. Thus, in certain variations, elastomeric materials comprising polyurethane and fluoropolyurethane are particularly suitable for use as the icephobic materials.

In certain aspects, the durable icephobic materials further include a liquid miscible with and distributed within the elastomeric polymer. The presence of such a liquid is optional, but assists with promoting interfacial slippage of chains within the elastomeric polymer network. Such a liquid may be an oil, which can optionally include non-crosslinked polymer chains (e.g., oligomers). The liquid can be an oil (either natural or synthetic), a reactive monomer that reacts with the elastomeric polymer, a non-reactive monomer, or a low molecular weight polymer. In certain variations, a liquid is selected that is miscible with the elastomeric polymer, which may have polymeric chains with a preselected range of molecular weights. Such miscible, polymeric chains present in the low-density elastomeric network thus enable interfacial slippage. A miscible liquid is thus capable of being distributed into and throughout the thickness of low crosslink density elastomeric material, but preferably avoids formation of any distinct surface layers. Other methods of assessing miscibility may include empirical observation (visually or by microscopy, such as in the AFM images in FIGS. 3C-3D), or through an increase in ice adhesion strength over multiple icing deicing cycles, as described in more detail below. In certain preferred aspects, the liquid has a melting point of less than or equal to about 32° F. (0° C.), optionally less than or equal to about 10° F. (−12° C.), optionally less than or equal to about −25° F. (−31° C.), as will be described in greater detail below. In other variations, such a liquid has a viscosity of greater than or equal to about 5 cP to greater than or equal to about 10,000 cP at 40° C.

In certain variations, the liquid may be polydimethylsiloxane (PDMS) oil, polymethylphenylsiloxane (PMPS) oil, polymethylhydrosiloxane (PMHS), polyalkylenes oils, such as polyisobutylene, perfluoroether oils, KRYTOX™ lubricant oil commercially available from DuPont, natural oils, such as soybean, vegetable oil, cod liver oil, safflower oil, *eucalyptus* oil, fish oils (e.g., salmon, tuna, krill, squid), rapeseed oil, fluorinated silicone oils, perfluorodecalin, FLUORINERT™ fluorocarbon oils, FOMBLIN™ inert PFPE, natural oils mixed with a freezing point depressant such as VISCOPLEX™, diisodecyl adipate, other pour point depressants in combination with higher freezing point oils like alkanes, castor oil, mineral oils, functionalized silicone oils, such as hydroxy, isocyanate, diol or other reactive silicone oils, functionalized perfluoropolyethers such as SARTOMER CN4002™ oil, and combinations thereof. A functionalized oil may act like a non-functionalized oil if the functionality is not used for curing, but rather to alter the miscibility between the elastomer and oil. In other aspects, the liquid may be a plasticizing agent, such as diisodecyl adipate (DIDA), medium-chain triglyceride (MCT), diundecyl phthalate (DUP) and combinations thereof, by way of example.

When present, an amount of liquid (e.g., oil) in the polymer may be greater than 0% to less than or equal to about 50% by weight of the overall icephobic material including the polymer. The amount of liquid added depends on the miscibility of the liquid with the polymer and may be 1% by weight, optionally 5% by weight, optionally 10% by weight, optionally 20% by weight, and in certain variations, optionally about 50% by weight. However, as described in greater detail below, in certain variations, a surface of the elastomeric polymer of the icephobic material is fully exposed to external conditions and thus is free of any films or layers of any free miscible liquid thereon (e.g., a continuous film or liquid phase formed over the elastomeric polymer is avoided). Thus, the amount of oil that is added is less than an amount where a continuous surface layer of oil is created on the exposed surface of the polymer.

Conventionally, certain material systems have relied on a surface layer of liquid as a continuous lubricating film disposed over and present on the surface of a non-porous or porous material or polymer. Thus, a thick or continuous lubricating layer is intentionally formed on the surface. However, the presence of such a liquid as a separate layer or continuous film on the exposed surface undesirably modifies the physical properties of the exposed surface of the elastomeric polymer and in certain aspects of the present teachings is avoided.

Conventional surfaces reliant on thick or continuous lubricating surface layers for icephobic properties do not maintain these icephobic properties during exposure to repeated icing conditions, especially when used in non-laboratory environments having harsh, extreme, or variable icing conditions. In other words, such continuous lubricating surface layers are not robust and not mechanically durable enough for practical industrial and commercial use and suffer from rapid fading of icephobic capability. In accordance with the present disclosure, if a miscible liquid is included in the durable elastomeric polymer, it is preferably distributed throughout the body of the elastomeric polymer to facilitate interfacial slippage of chains. While there may be some discrete regions or domains of miscible liquid along the exposed surface by virtue of being distributed through the elastomeric polymer, in certain preferred variations, the miscible liquid does not form a continuous film as a lubricating layer on the surface. Stated in another way, in certain aspects, the surface of the elastomeric polymer is free of a miscible liquid layer (e.g., a continuous layer or film over the surface of the elastomeric polymer). In alternative variations that may be less desirable and less durable for certain applications, icephobic coatings may have a surface layer of a miscible liquid that forms a lubricated coating if the elastomeric matrix has a sufficiently low cross-link density in accordance with certain aspects of the present teachings.

By tailoring the crosslink density of different elastomeric coatings, and by enabling interfacial slippage of chains within the elastomeric chains as provided by certain aspects of the principles of the present disclosure, it is possible to systematically design coatings with extremely low ice-adhesion strength ($\tau_{ice}$<0.2 kPa), even for hydrophilic materials. Further, it is possible to fabricate extremely durable coatings which maintain $\tau_{ice}$<15 kPa even after severe mechanical abrasion, acid/base exposure, 100 icing/de-icing cycles, thermal cycling, accelerated corrosion, and exposure to Michigan wintery conditions over several months.

By way of further background, the force required to shear a hard block, such as ice, from a soft film, such as an elastomeric coating, can be given by $\tau=A(W_a G/t)^{1/2}$, where A is an experimental constant, $W_a$ is the work of adhesion, G is the shear modulus of the soft film or coating and t is the thickness of the soft film or coating. This is a macroscopic relationship that expresses the force required to cleave two surfaces apart by shear, which has been shown to occur through interfacial cavitation. However, microscopically the pulling of molecular chains at the surface of elastomeric film can dominate the adhesion.

According to the Chernyak and Leonov model, the shear stress in such a case is given as $\tau=Gfa/kT$, where f is the force required to detach a single polymer chain, a is the size of the chain, k is Boltzmann's constant and T is the temperature. If the polymeric chains are mobile enough to slide past one another on a surface, this is understood to be interfacial slippage. On a surface with interfacial slippage it has been shown that the shear stress, $\tau=2GQ/3\eta\alpha\upsilon$, is also known to vary proportionally with G ($\tau\propto G$). Q is the energy dissipated per area of crack (detachment occurs in Mode-II shear failure), q is the viscosity of the fluid, v is the difference between the macroscopic velocity and the slip velocity at the interface, and $\alpha$ is a constant. Thus, the effects of G and interfacial slippage are particularly important in the design of icephobic surfaces according to certain aspects of the present teachings.

Figure 1:
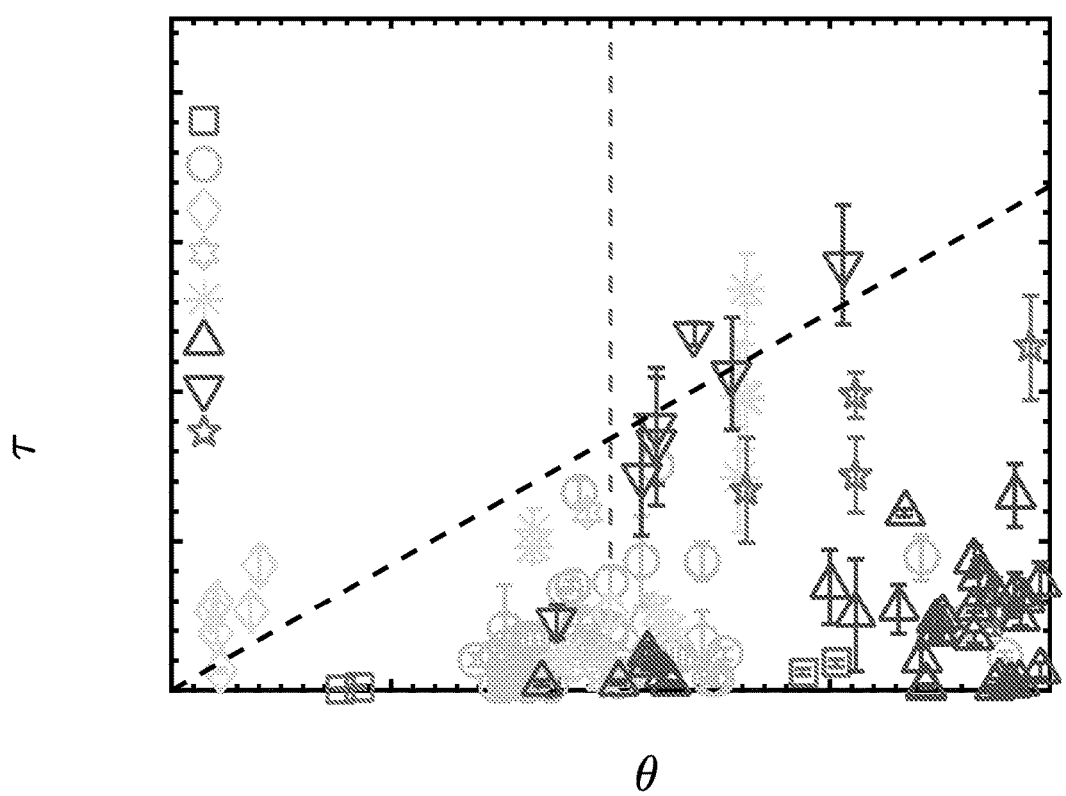

By tailoring the crosslink density $\rho^{CL}$ and thereby the modulus of different elastomeric coatings, $G=RT\rho^{CL}$ assuming isotropy, where R is the universal gas constant and T is the temperature, and by additionally embedding miscible, polymeric chains to enable interfacial slippage, it is possible to systematically design icephobic materials/coatings with extremely low ice adhesion (e.g., $\tau_{ice}$<0.2 kPa). FIG. 1 and Table 1 show a comprehensive library of over 100 representative icephobic surfaces prepared in accordance with the principles of present disclosure (set forth below in Table 1 that can be: rough, smooth, hydrophobic or even hydrophilic surfaces exhibiting icephobic properties by application of Coatings A-CJ).

In certain variations, the present disclosure provides a method of making a durable icephobic article comprising applying a precursor of an elastomeric polymer on a substrate. The precursor may be a monomer, oligomer, polymer, or copolymer to be cured and/or crosslinked. The precursor may form any of the elastomeric polymers discussed above. The method also comprises curing and/or crosslinking the precursor to form a durable elastomeric polymer having a crosslink density of less than or equal to about 1,300 mol/m$^3$, where the elastomeric polymer exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength. Curing or cross-linking depends upon the elastomer used, but may include chemical reaction to facilitate polymerization, exposure to thermal energy, actinic radiation or e-beam, and the like. These coatings can be applied by spinning, dipping, spraying, or painting onto essentially all substrates of any size. In certain aspects, the elastomers are thermosets and the method includes curing and crosslinking concurrently. For example, thermosets may be crosslinked by curing either at elevated temperature or at room temperature. The coating fabrication methodology and resulting ice adhesion strengths, crosslink densities and water contact angles, for various exemplary samples fabricated in accordance with the present disclosure are set forth in Table 1 and described further below.

In certain other aspects, the method may further include after the curing, introducing a liquid miscible with the elastomeric polymer to enable interfacial slippage of chains in the elastomeric polymer. In certain variations, an exposed surface of the elastomeric polymer is free of any layers of free liquid formed thereon, as discussed above. Coatings having no miscible oil or slippage are designated as "NS" for no slippage in Table 1. Coatings having interfacial slippage due to the presence of a miscible oil distributed within the elastomeric matrix, but having an exposed surface free of any liquid layers formed thereon are designated "IS" for interfacial slippage. Coatings having some liquid as a lubricating layer on the surface are designated "L" for a lubricated system. In certain aspects, preferred icephobic coatings according to the present disclosure are either those that have no miscible liquid (NS coatings) or have interfacial slippage by inclusion of a miscible liquid and thus are free any surface layer of miscible liquid (IS Coatings) and are not a lubricated coating system (L Coatings). However, in alternative aspects that may be less preferred for certain applications and uses, the icephobic coating may be a lubricated coating having a designation of "L" if it has an elastomer with a sufficiently low cross-link density, as discussed above. Such lubricated coating systems often fail to exhibit a desired level of robustness by maintaining icephobic properties, such as maintaining an initial ice adhesion strength so that after multiple icing/deicing cycles the subsequent ice adhesion strength is less than or equal to about 50% above the initial ice adhesion strength, as described above. In this regard, such lubricated coatings may be suitable for certain applications, but may be less desirable embodiments for applications where robustness and durability are important.

TABLE 1

| Coating | Polymer Base (base:crosslinker ratio) | Non-Reactive Oil | Wt. % | Reactive Oil | Wt. % | Cure °C./hr | $\rho^{CL}$ (mol/m³) | $t_{ice}$ Avg. (kPa) | $t_{ice}$ Min. (kPa) | $t_{ice}$ Max. (kPa) | Type† | $\theta_{adv}/\theta_{rec}$ (°) |
|---|---|---|---|---|---|---|---|---|---|---|---|---|
| A | PDMS SYLGARD™184 (10:1) | — | — | — | — | 150/24 | 307 ± 8 | 264 | 245 | 340 | NS | 120/94 |
| B | PDMS SYLGARD™184 (10:1) | — | — | — | — | 80/2 | 333 ± 45 | 47 | 36 | 57 | IS | 131/26 |
| C | PDMS SYLGARD™184 (20:1) | — | — | — | — | 80/2 | 112 ± 1 | 178 | 147 | 251 | NS | 129/45 |
| D | PDMS SYLGARD™184 (4:1) | — | — | — | — | 80/2 | 33 ± 45 | 89 | 42 | 165 | IS | 127/36 |
| E | PDMS SYLGARD™184 (3:1) | — | — | — | — | 80/2 | 268 ± 2 | 15 | 6 | 29 | L | 122/76 |
| F | PDMS SYLGARD™184 (2:1) | — | — | — | — | 80/2 | 222 ± 9 | 14 | 6 | 23 | L | 118/77 |
| G | PDMS SYLGARD™184 (5:2) | — | — | — | — | 80/2 | 267 ± 21 | 16 | 8 | 26 | L | 112/100 |
| H | PDMS SYLGARD™184 (1:1) | — | — | — | — | 80/2 | 162 ± 5 | 14 | 6 | 29 | L | 112/89 |
| I | PDMS SYLGARD™184 (10:1) | 100 cP Silicone | 25 | — | — | 80/2 | 219 ± 13 | 35 | 26 | 56 | IS | 123/89 |
| J | PDMS SYLGARD™184 (10:1) | 100 cP Silicone | 50 | — | — | 80/2 | 72 ± 11 | 87 | 40 | 120 | IS | 114/94 |
| K | PDMS SYLGARD™184 (10:1) | 100 cP Silicone | 75 | — | — | 80/2 | — | 55 | 30 | 71 | IS | 114/94 |
| L | PDMS SYLGARD™184 (10:1) | — | — | PMHS | 25 | 80/2 | 215 ± 10 | 10 | 1.0 | 31 | L | 105/103 |
| M | PDMS SYLGARD™184 (10:1) | — | — | PMHS | 50 | 80/2 | 75 ± 13 | 67 | 31 | 121 | L | 118/101 |
| N | PDMS SYLGARD™184 (10:1) | — | — | PMHS | 75 | 80/2 | — | 17 | 4.9 | 39 | L | 121/102 |
| O | PDMS SYLGARD™184 (1:1) | 100 cP Silicone | 25 | — | — | 80/2 | 32 ± 2 | 173 | 58 | 237 | IS | 124/86 |
| P | PDMS SYLGARD™184 (1:1) | 100 cP Silicone | 50 | — | — | 80/2 | 13 ± 2 | 46 | 17 | 74 | IS | 124/82 |
| Q | PDMS SYLGARD™184 (1:1) | 100 cP Silicone | 75 | — | — | 80/2 | — | 18 | 0.15 | 47 | IS | 104/103 |
| R | PDMS SYLGARD™184 (1:1) | — | — | PMHS | 25 | 80/2 | 102 ± 5 | 17 | 1.0 | 40 | L | 125/104 |
| S | PDMS SYLGARD™184 (1:1) | — | — | PMHS | 50 | 80/2 | 14 ± 4 | 6 | 0.7 | 30 | L | 106/105 |
| T | PDMS SYLGARD™184 (1:1) | — | — | PMHS | 75 | 80/2 | — | 9 | 0.35 | 31 | L | 105/103 |
| U | PDMS SYLGARD™184 (10:1) | 100 cP Silicone | 25 | PMHS | 25 | 150/24 | 536 ± 97 | 64 | 50 | 78 | IS | 119/95 |
| V | PDMS SYLGARD™1841 0:1 | 100 cP Silicone | 15 | PMHS | 15 | 80/2 | — | 31 | 1.0 | 137 | L | 108/104 |
| W | PDMS SYLGARD™184 (10:1) | 100 cP Silicone | 10 | PMHS | 10 | 150/24 | 459 ± 9 | 74 | 40 | 116 | IS | 123/90 |
| X | PDMS SYLGARD™184 (10:1) | — | — | PMHS | 10 | 80/2 | 283 ± 9 | 37 | 4.0 | 71 | IS | 114/100 |
| Y | PDMS SYLGARD™184 (10:1) | — | — | PMHS | 10 | 150/24 | 284 ± 41 | 173 | 122 | 234 | NS | 121/78 |

TABLE 1-continued

| Coating | Polymer Base (base:crosslinker ratio) | Non-Reactive Oil | Wt. % | Reactive Oil | Wt. % | Cure ° C./hr | $\rho^{CL}$ (mol/m³) | $t_{ice}$ Avg. (kPa) | $t_{ice}$ Min. (kPa) | $t_{ice}$ Max. (kPa) | Type† | $\theta_{adv}/\theta_{rec}$ (°) |
|---|---|---|---|---|---|---|---|---|---|---|---|---|
| Z | PDMS SYLGARD™184 (10:1) | — | — | PMHS | 20 | 80/2 | 197 ± 4 | 45 | 19 | 82 | IS | 109/105 |
| AA | PDMS SYLGARD™184 (10:1) | — | — | PMHS | 20 | 150/24 | 348 ± 28 | 64 | 34 | 92 | IS | 118/93 |
| BB | PDMS SYLGARD™184 (10:1) | — | — | PMHS | 25 | 150/24 | 452 ± 9 | 302 | 275 | 346 | NS | 103/84 |
| CC | PDMS SYLGARD™184 (10:1) | 100 cP Silicone | 25 | PMHS | 15 | 150/24 | 405 ± 27 | 58 | 41 | 73 | IS | 112/104 |
| DD | PDMS SYLGARD™184 (10:1) | 100 cP Silicone | 20 | PMHS | 20 | 80/2 | 107 ± 2 | 37 | 9.1 | 67 | IS | 109/100 |
| EE | PDMS SYLGARD™184 (10:1) | 100 cP Silicone | 25 | PMHS | 25 | 80/2 | 150 ± 8 | 35 | 5.1 | 77 | IS | 116/99 |
| FF | PDMS SYLGARD™184 (10:1) | 100 cP Silicone | 25 | PMHS | 10 | 150/24 | 290 ± 25 | 41 | 24 | 55 | IS | 112/108 |
| GG | PDMS SYLGARD™184 (10:1) | 5 cP Silicone | 25 | — | — | 80/2 | 181 ± 5 | 145 | 109 | 178 | IS | 121/90 |
| HH | PDMS SYLGARD™184 (10:1) | 1000 cP Silicone | 25 | — | — | 80/2 | 153 ± 7 | 45 | 33 | 53 | IS | 100/85 |
| II | PDMS SYLGARD™184 (10:1) | 10000 cP Silicone | 25 | — | — | 80/2 | 67 ± 2 | 81 | 13 | 226 | L | 120/104 |
| JJ | PDMS SYLGARD™ 184 (10:1) | Silicone Oil AP 1000- | 25 | — | — | 80/2 | 216 ± 3 | 66 | 12 | 171 | L | 113/78 |
| KK | PDMS SYLGARD™ 527 (1:1) | — | — | — | — | 150/24 | 0.68‡ | 14 | 7.6 | 25 | NS | 130/89 |
| LL | PDMS 1:9 SYLGARD™ (527:184) | 100 cP Silicone | 25 | — | — | 150/24 | 182 ± 11 | 14 | 7.3 | 18 | IS | 112/103 |
| MM | PDMS 1:3 SYLGARD™ (527:184) | 100 cP Silicone | 25 | — | — | 150/24 | 123 ± 2 | 10 | 5.5 | 17 | IS | 111/104 |
| NN | PDMS 1:1 SYLGARD™ (527:184) | 100 cP Silicone | 25 | — | — | 150/24 | 76 ± 1 | 9 | 5.5 | 12 | IS | 112/102 |
| OO | PDMS 3:1 SYLGARD™ (527:184) | 100 cP Silicone | 25 | — | — | 150/24 | 46 ± 2 | 6 | 3.7 | 8 | IS | 114/101 |
| PP | PDMS 3:1 SYLGARD™ (527:184) | — | — | — | — | 150/24 | 50 ± 2 | 10 | 4 | 49 | IS | 123/100 |
| QQ | PDMS 1:3 SYLGARD™ (527:184) | — | — | — | — | 150/24 | 104 ± 5 | 141 | 130 | 154 | NS | 122/95 |
| RR | PDMS 1:1 SYLGARD™ (527:184) | — | — | — | — | 150/24 | 110 ± 5 | 19 | 6.7 | 37 | IS | 117/88 |
| SS | PDMS 9:1 SYLGARD™ (527:184) | 100 cP Silicone | 25 | — | — | 150/24 | 8.0 ± 0.8 | 6 | 4.1 | 7 | IS | 121/98 |
| TT | PDMS 9:1 SYLGARD™ (527:184) | — | — | — | — | 150/24 | 9.1 ± 0.9 | 134 | 132 | 139 | NS | 121/96 |
| UU | PFPE | — | — | — | — | UVA 5 min | 160 ± 35 | 238 | 200 | 281 | NS | 115/93 |
| VV | PFPE | KRYTOX™ 100 | 25 | — | — | UVA 5 min | 96 ± 24 | 31 | 17 | 53 | IS | 115/95 |
| WW | PFPE | KRYTOX™ 105 | 25 | — | — | UVA 5 min | 124 ± 33 | 31 | 16 | 55 | IS | 104/98 |
| XX | PFPE | KRYTOX™ 103 | 25 | — | — | UVA 5 min | — | 12 | 10 | 13 | IS | 114/91 |
| YY | PFPE | — | — | CN4002 | 10 | UVA 5 min | — | 45 | 33 | 51 | L | 117/91 |
| ZZ | FPU | — | — | — | — | 80/72 | 1098 ± 98 | 538 | 257 | 627 | NS | 103/72 |
| AB̃ | FPU | — | — | — | — | 80/72 | 475 ± 14 | 394 | 334 | 479 | NS | 105/73 |
| AC̃ | FPU | — | — | — | — | 80/72 | 316 ± 17 | 284 | 204 | 399 | NS | 101/73 |

TABLE 1-continued

| Coating | Polymer Base (base:crosslinker ratio) | Non-Reactive Oil | Wt. % | Reactive Oil | Wt. % | Cure °C./hr | $\rho^{CL}$ (mol/m³) | $t_{ice}$ Avg. (kPa) | $t_{ice}$ Min. (kPa) | $t_{ice}$ Max. (kPa) | Type† | $\theta_{adv}/\theta_{rec}$ (°) |
|---|---|---|---|---|---|---|---|---|---|---|---|---|
| AD^ | FPU | KRYTOX™ 100 | 25 | — | — | 80/72 | 1142 ± 158 | 595 | 538 | 713 | IS | 101/72 |
| AE^ | FPU | KRYTOX™ 105 | 25 | — | — | 80/72 | 1112 ± 77 | 392 | 283 | 520 | IS | 105/72 |
| AF^ | FPU | — | — | NCO C50 | 75 | 150/24 | 1332 ± 48 | 246 | 194 | 320 | IS | 108/84 |
| AG^ | FPU | 100 cP Silicone | 5 | NCO C50 | 75 | 80/72 | | 82 | 61 | 100 | IS | 109/82 FPU |
| AH^ | FPU | 100 cP Silicone | 10 | NCO C50 | 75 | 80/72 | | 49 | 22 | 66 | IS | 106/96 FPU |
| AI | PS | 200 Mw PS | 25 | — | — | RT/24 | 450,000‡ | 424 | 271 | 569 | IS | 103/74 |
| AK | PS | 200 Mw PS | 50 | — | — | RT/24 | — | 570 | 378 | 642 | IS | 109/58 |
| AL | PS | 540 Mw PS | 25 | — | — | RT/24 | — | 477 | 454 | 510 | IS | 100/79 |
| AM | PS | Silicone Oil AP 1000 | 25 | — | — | RT/24 | — | 92 | 59 | 112 | L | 103/97 |
| AN | PS | PMPS | 10 | — | — | RT/24 | — | 354 | 218 | 491 | IS | 98/84 |
| AO | PS | PMPS | 5 | — | — | RT/24 | — | 333 | 217 | 498 | IS | 99/84 |
| AP | PIB | — | — | — | — | RT/24 | 8,000‡ | 395 | 335 | 453 | NS | 125/56 |
| AQ | PIB | Polybutene | 25 | — | — | RT/24 | — | 288 | 220 | 419 | IS | 128/56 |
| AR | PIB | Polybutene | 50 | — | — | RT/24 | — | 459 | 341 | 620 | IS | 130/17 |
| AS | PIB | Polybutene | 75 | — | — | RT/24 | — | 268 | 176 | 442 | IS | 128/72 |
| AT | PU VYTAFLEX™ 10 | — | — | — | — | RT/24 | 26 ± 7 | 144 | 84 | 254 | NS | 52/12 |
| AU | PU VYTAFLEX™ 40 | — | — | — | — | RT/24 | 95 ± 14 | 151 | 118 | 192 | NS | 80/26 |
| AV | PU VYTAFLEX™ 60 | — | — | — | — | RT/24 | 290 ± 17 | 261 | 157 | 360 | NS | 82/23 |
| AW | PU VYTAFLEX™ 40 | Vegetable | 20 | — | — | RT/24 | 53 ± 4 | 10.5 | 4.6 | 22 | L | 68/21 |
| AX* | PU VYTAFLEX™ 40 | Cod Liver | 15 | — | — | RT/24 | 29 ± 2 | 27 | 9 | 51 | IS | 75/12 |
| AY^ | PU VYTAFLEX™ 40 | 100 cP Silicone | 10 | — | — | RT/24 | — | 41 | 18 | 83 | L | 82/45 |
| AZ^ | PU VYTAFLEX™ 40 | — | — | NCO Di-50 | 1 | RT/24 | 47 ± 3 | 109 | 51 | 179 | IS | 96/49 |
| BA | PU VYTAFLEX™ 40 | — | — | NCO Di-50 | 5 | RT/24 | 52 ± 2 | 101 | 42 | 232 | IS | 110/56 |
| BB | PU VYTAFLEX™ 40 | — | — | NCO Di-50 | 10 | RT/24 | 34 ± 7 | 139 | 49 | 243 | IS | 113/60 |
| BC | PU VYTAFLEX™ 40 | 100 cP Silicone | 10 | NCO Di-100 | 50 | RT/24 | 21 ± 1 | 11 | 6 | 15 | IS | 97/89 |
| BD^ | PU VYTAFLEX™ 40 | — | — | NCO C50 | 50 | RT/24 | 42 ± 0.4 | 44 | 25 | 55 | IS | 106/81 |
| BE* | PU VYTAFLEX™ 40 | 100 cP Silicone | 10 | NCO C50 | 50 | 80RT/2472 | | 11 | 6 | 17 | IS | 95/86 |
| BF^ | PU VYTAFLEX™ 40 | — | — | NCO C50 | 75 | RT/24 | 171 ± 4 | 49 | 38 | 65 | IS | 102/85 |
| BG^ | PU VYTAFLEX™ 40 | 100 cP Silicone | 10 | NCO C50 | 75 | RT/24 | | 9 | 3 | 12 | IS | 91/82 |
| BH^ | PU VYTAFLEX™ 40 | 1000 cP Silicone | 10 | NCO C50 | 75 | RT/24 | | 10 | 5 | 14 | IS | 99/90 |
| BI^ | PU VYTAFLEX™ 40 | 5 cP Silicone | 10 | NCO C50 | 75 | RT/24 | | 18 | 12 | 24 | IS | 102/83 |
| BJ^ | PU VYTAFLEX™ 40 | 10,000 cP Silicone | 10 | NCO C50 | 75 | RT/24 | | 19 | 14 | 31 | IS | 102/92 |
| BK | PU VYTAFLEX™ 40 | 100 cP Silicone | 5 | — | — | RT/24 | — | 77 | 70 | 90 | L | 70/42 |
| BL | PU VYTAFLEX™ 40 | 100 cP Silicone | 10 | — | — | RT/24 | — | 80 | 58 | 91 | L | 68/42 |
| BM | PU VYTAFLEX™ 40 | 100 cP Silicone | 15 | — | — | RT/24 | — | 98 | 68 | 128 | L | 65/41 |
| BN | PU VYTAFLEX™ 40 | 100 cP Silicone | 20 | — | — | RT/24 | — | 93 | 76 | 107 | L | 67/42 |
| BO | PU VYTAFLEX™ 40 | Vegetable | 5 | — | — | RT/24 | 62 ± 2 | 128 | 77 | 200 | IS | 79/23 |
| BP | PU VYTAFLEX™ 40 | Vegetable | 10 | — | — | RT/24 | 62 ± 4 | 238 | 233 | 247 | IS | 89/48 |
| BQ | PU VYTAFLEX™ 40 | Vegetable | 15 | — | — | RT/24 | 49 ± 2 | 121 | 91 | 151 | IS | 32/20 |
| BR | PU VYTAFLEX™ 40 | Vegetable | 20 | — | — | RT/24 | 53 ± 4 | 173 | 141 | 227 | IS | 43/34 |
| BS | PU VYTAFLEX™ 40 | Cod Liver | 5 | — | — | RT/24 | — | 129 | 107 | 166 | IS | 67/29 |
| BT | PU VYTAFLEX™ 40 | Cod Liver | 10 | — | — | RT/24 | — | 70 | 56 | 85 | IS | 59/34 |

TABLE 1-continued

| Coating | Polymer Base (base:crosslinker ratio) | Non-Reactive Oil | Wt. % | Reactive Oil | Wt. % | Cure °C./hr | $\rho^{CL}$ (mol/m³) | $t_{ice}$ Avg. (kPa) | $t_{ice}$ Min. (kPa) | $t_{ice}$ Max. (kPa) | Type† | $\theta_{adv}/\theta_{rec}$ (°) |
|---|---|---|---|---|---|---|---|---|---|---|---|---|
| BU | PU VYTAFLEX™ 40 | Cod Liver | 15 | — | — | RT/24 | — | 110 | 100 | 120 | IS | 46/34 |
| BV | PU VYTAFLEX™ 40 | Cod Liver | 15 | — | — | RT/24 | 29 ± 2 | 4 | 2 | 9 | IS | 43/25 |
| BW* | PU VYTAFLEX™ 40 | Vegetable | 15 | — | — | RT/24 | 52 ± 1 | 11 | 3 | 15 | IS | 88/44 |
| BX^ | PU VYTAFLEX™ 40 | Safflower | 2.5 | — | — | RT/24 | 63 ± 0.5 | 30 | 20 | 43 | IS | 100/32 |
| BY* | PU VYTAFLEX™ 40 | Safflower | 5 | — | — | RT/24 | 50 ± 0.5 | 11 | 9 | 16 | IS | 82/28 |
| BZ^ | PU VYTAFLEX™ 40 | Safflower | 10 | — | — | RT/24 | 45 ± 5 | 6 | 4 | 12 | IS | 72/24 |
| CA^ | PU VYTAFLEX™ 40 | Safflower | 15 | — | — | RT/24 | 33 ± 1 | 4 | 3 | 7 | IS | 67/29 |
| CB* | PU VYTAFLEX™ 40 | Safflower | 20 | — | — | RT/24 | 32 ± 0.4 | 6 | 3 | 11 | L | 56/44 |
| CC* | PU VYTAFLEX™ 40 | Safflower | 25 | — | — | RT/24 | 45 ± 2 | 4 | 2 | 6 | L | 52/43 |
| CD* | PU VYTAFLEX™ 40 | Cod Liver | 20 | — | — | RT/24 | — | 97 | 76 | 114 | L | 34/21 |
| CE | PU VYTAFLEX™ 40 | MCT | 50 | — | — | RT/24 | 12 ± 0.4 | 3.7 | 1.4 | 5.3 | IS | — |
| CF | PU VYTAFLEX™ 40 | MCT | 25 | — | — | RT/24 | 43 ± 4 | 21 | 10 | 31 | IS | — |
| CG | PU VYTAFLEX™ 40 | — | — | Eucalyptus Oil | 50 | RT/24 | 11 ± 0.4 | 11 | 7 | 16 | NS | — |
| CH | PU CLEARFLEX™ 50 | DIDA | 20 | — | — | RT/24 | 152 ± 9 | 50 | 36 | 67 | IS | 78/32 |
| CI | PU CLEARFLEX™ 50 | — | — | Eucalyptus Oil | 10 | RT/24 | 275 ± 16 | 140 | 115 | 167 | | 92/31 |
| CJ | PU CLEARFLEX™ 50 & VYTAFLEX™ 20 (1:1) | DIDA | 30 | — | — | RT/24 | 123 ± 5 | 14 | 5 | 27 | IS | — |
| CE | PU VYTAFLEX™ 40 | MCT | 50 | — | — | RT/24 | 12 ± 0.4 | 3.7 | 1.4 | 5.3 | IS | — |
| CF | PU VYTAFLEX™ 40 | MCT | 25 | — | — | RT/24 | 43 ± 4 | 21 | 10 | 31 | IS | — |
| CG | PU VYTAFLEX™ 40 | — | — | Eucalyptus Oil | 50 | RT/24 | 11 ± 0.4 | 11 | 7 | 16 | NS | — |

*denotes films that are dip-coated.
^denotes films that are spray-coated (500 mg/ml).
All others are spincast at 1500 RPM for 60 seconds.
Dip/spin solution polymer concentration is 200 mg/ml.
†NS = no slippage. IS = interfacial slippage. L = lubricated.
‡approximated from the elastic modulus of the polymer.

VYTAFLEX™ polyurethane elastomer rubbers are commercially available from Smooth-On, Inc. and formed from different systems including a first precursor monomer/reactant comprising one or more isocyanate functional groups, a second precursor monomer/reactant comprising a polyol, and an optional third precursor monomer/reactant. In certain variations, a first precursor comprises toluene diisocyanate (TDI), a second precursor comprises a polyol, such as a hydroxypolyether like diethylene glycol polyether or a hydroxylpolyester, such as ethylene glycol-adipic acid polyester. The optional third precursor may be selected from the group consisting of: di(ethyl)toluenediamine, di(methylthio) toluene diamine, and combinations thereof. The VYTAFLEX™ series of polyurethane elastomers are categorized by hardness values achieved. Thus, VYTAFLEX 10™ forms a polyurethane rubber with a Shore 10A hardness, VYTAFLEX 20™ forms a polyurethane rubber with a Shore 20A hardness, VYTAFLEX 30™ forms a polyurethane rubber with a Shore 30A hardness, VYTAFLEX 40™ achieves a Shore 40A hardness, VYTAFLEX 50™ forms a polyurethane rubber with a Shore 50A hardness, and VYTAFLEX 60™ forms a polyurethane rubber with a Shore 60A hardness. The VYTAFLEX™ compositions are believed to typically include di(ethyl)toluenediamine as a co-reactive species, but the VYTAFLEX50™ and VYTAFLEX60™ are believed to further include di(methylthio)toluene diamine as a secondary or alternative reactive species.

Other suitable PU elastomers include CLEARFLEX™ 30, CLEARFLEX™ 50, or CLEARFLEX™ 95 available from Smooth-On, Inc. These PU elastomers are transparent and believed to be formed from a system including a first precursor monomer/reactant comprising one or more isocyanate functional groups, a second precursor monomer/reactant comprising a polyol, in the presence of a catalyst. In certain variations, a first precursor comprises dicyclohexylmethane-4,4'-diisocyanate, a second precursor comprises a polyol, such as a hydroxypolyether like diethylene glycol polyether or a hydroxylpolyester, such as ethylene glycol-adipic acid polyester. The third precursor or catalyst may comprise phenylmercury neodecanoate.

SYLGARD™ 184 is a two-part siloxane polymer believed to include a first part with about 1-5% by weight of tetra(trimethylsiloxy)silane, about 30-60% by weight dimethylvinylated and trimethylated silica, and 60% by weight or more of dimethylvinyl-terminated dimethylsiloxane. A second part or curing agent of the SYLGARD™ 184 includes 40-70% by weight dimethyl, methylhydrogen siloxane, 15-40% by weight of dimethylvinyl-terminated dimethylsiloxane, about 1-5% by weight of tetramethyl tetravinyl cyclotetrasiloxane, and about 1-5% by weight dimethylvinylated and trimethylated silica.

Certain extremely durable coatings in Table 1 show an approximate 300 fold reduction in $\tau_{ice}$ as compared to flat aluminum, and in certain variations, a 4-fold reduction over the lowest $\tau_{ice}$ values reported thus far. Moreover, because $\tau_{ice}$ is reduced through tailoring $\rho^{CL}$ and allowing for interfacial slippage (rather than through an increase in hydrophobicity), icephobicity is possible for coatings covering a wide range of surface energies. The variation in $\tau_{ice}$ for different icephobic coatings developed in accordance with the present teachings is not explained by variation in the parameter 1+cos $\theta_{rec}$. Most of the fabricated surfaces do not follow the theoretical $\tau_{ice} \propto 1+\cos \theta_{rec}$ trend. For example, for one particular coating, AY, $\tau_{ice}$=27±10 kPa although $\theta_{rec}$=12°. Thus, conventionally it was thought that a higher contact angle would lower the ice adhesion. Although this may still be true, as discovered in the context of the present teachings, crosslink density and interfacial slippage of an elastomeric material are believed to be more important than the surface energy in designing icephobic surfaces. Thus, icephobic surfaces can be designed in accordance with certain aspects of the present disclosure irrespective of material chemistry by controlling crosslink density and interfacial slippage.

Figures 2A, 2B, 2C, 2D:
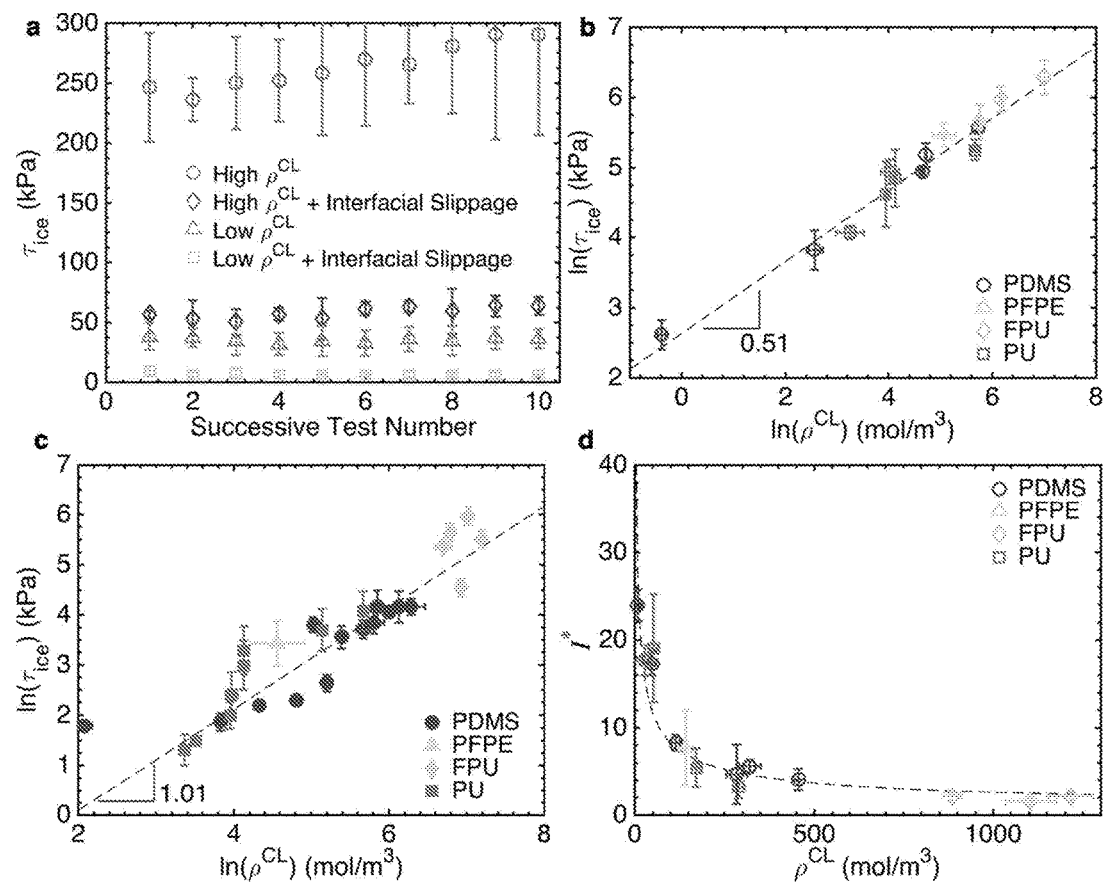

How crosslinking density $\rho^{CL}$ and interfacial slippage affect ice adhesion is further explored herein. The techniques according to the present disclosure may be extended to a variety of different material systems, providing icephobic durability in conjunction with sustained low ice adhesion. To understand the effects of interfacial slippage and crosslinking density ($\rho^{CL}$) on ice adhesion strengths ($\tau_{ice}$) using a shear based, Mode-II ice adhesion test, conducted at −10° C.; four representative polydimethylsiloxane (PDMS) samples, as shown in FIG. 2A: high $\rho^{CL}$ PDMS ($\rho^{CL}$=307±8 mol/m³), low $\rho^{CL}$ PDMS ($\rho^{CL}$=50±2 mol/m³), high $\rho^{CL}$ PDMS with oil ($\rho^{CL}$=290±25 mol/m³, 25 wt. % 100 cP silicone oil) and low $\rho^{CL}$ PDMS with oil ($\rho^{CL}$=46±2 mol/m³, 25 wt. % 100 cP silicone oil). For high $\rho^{CL}$ PDMS (unaltered SYLGARD™ 184), $\tau_{ice}$=264±19 kPa, which matches reported literature values of 200-300 kPa. To achieve a surface with interfacial slippage and the same $\rho^{CL}$ as SYLGARD™ 184, silicone oil is added, which lowers $\rho^{CL}$ and polymethylhydrosiloxane, which raises $\rho^{CL}$, until the equivalent $\rho^{CL}$ is achieved. Such a surface has $\tau_{ice}$=58±5 kPa, a five-fold reduction over unaltered SYLGARD™ 184, highlighting the effect of interfacial slippage enabled by the miscible chains.

By maximizing the miscibility between the elastomeric network and the chains causing interfacial slippage, the formation of a liquid layer on top of the substrate (i.e., along the exposed surface) is avoided. Reliance on the presence of liquid layers or films on an exposed surface is problematic, because such liquid layers are fragile and can be easily abraded, thus rapidly losing icephobic capabilities. Indeed, the icephobic coating materials according to certain aspects of the present disclosure do not achieve icephobicity through lubricating liquid layers on an exposed surface, which has been confirmed optically, by AFM phase imaging (FIGS. 3C-3D), by physically wiping the substrate and through a force versus time curve analysis (discussed below).

Even without the addition of miscible chains, coatings with values of $\tau_{ice} \leq 10$ kPa can be achieved solely by lowering $\rho^{CL}$ of the elastomeric material. For PDMS with low crosslinking density ($\rho^{CL}$) and devoid of any uncrosslinked chains, the resulting ice adhesion strength $\tau_{ice}$ is 33±2 kPa. This is five times lower than the theoretical maximum of $\tau_{ice}$=150 kPa, without the use of any lubricating layers, miscible chains, fluorination, or texture. Coatings with values of $\tau_{ice} \leq 10$ kPa can be fabricated solely by lowering $\rho^{CL}$, as can be seen in Table 1. For low $\rho^{CL}$ PDMS with interfacial slippage, an ice adhesion strength $\tau_{ice}$ of 6±1 kPa is measured. Overall, the combination of a 5 times reduction in $\tau_{ice}$ solely from interfacial slippage, and an 8 times reduction due to only lowering $\rho^{CL}$, yielded a 40 times reduction in the value of $\tau_{ice}$ for PDMS.

A series of different icephobic coatings are formed from PDMS, polyurethane rubbers (PU), fluorinated polyurethane polyols (FPU) and perfluoropolyethers (PFPE), with $\rho^{CL}$ varying from 0.68 mol/m³ to 1203 mol/m³, as measured by solvent swelling using Flory-Huggins theory and confirmed by a Mooney-Rivlin analysis of tensile test data. To provide interfacial slippage, liquids in the form of silicone oil, KRYTOX™ lubricant oil commercially available from DuPont, vegetable oil, cod liver oil or safflower oil are added to the coatings, as described in the examples below.

Examples

Polydimethyl siloxane (SYLGARD™ 184 or SYLGARD™ 527, available from Dow Corning), silicone oil (viscosity of 5 cP-10,000 cP, available from Sigma Aldrich) and polymethylhydrosiloxane (PMHS, from Sigma Aldrich) are used as received. SYLGARD™ 184 is crosslinked PDMS in a 10:1 base:crosslinker ratio, and SYLGARD™ 527 in a 1:1 ratio. The crosslinker for both of these products contains a copolymer of PDMS and PMHS, effectively controlling the crosslink density, $\rho^{CL}$. Mixing of these two formulations can alter $\rho^{CL}$ without deviating from stoichiometry, as described in Palchesko, R. et al., "Development of polydimethylsiloxane substrates with tunable elastic modulus to study cell mechanobiology in muscle and nerve." PLoS One 7, p. e51499, (2012), incorporated herein by reference. To increase crosslink density $\rho^{CL}$, PMHS can be added along with a high temperature (150° C.) cure.

Curing at 80° C. results in PMHS not effectively crosslinking within the PDMS elastomer, acting as a lubricant. To differentiate this effect, samples are either cured at 80° C. for a minimum of 2 hours, or 150° C. for 24 hours. To create PDMS filled with 25 wt. % silicone oil, while maintaining the same modulus as SYLGARD™ 184, 10 wt. % PMHS is used. To create a low $\rho^{CL}$ PDMS with every chain chemically crosslinked, solvent extraction with toluene over a two week period is used to fully remove any uncrosslinked chains. Excess toluene is changed out daily. Without this processing, PDMS contains about 4% uncrosslinked chains, which act as lubricants (FIGS. 7A-7C, 8, 9A-9G).

To spin-coat these surfaces, solutions at a polymer concentration of 200 mg/ml are formed in hexane. Silicon wafers are rinsed with acetone and are then spin coated with the different solutions at 1500 RPM for 60 seconds, followed by curing. For the dip-coated meshes, the substrates are submerged in the same 200 mg/ml solutions for 45 minutes and blown dry to avoid pore clogging, followed by the same curing recipe as above.

Perfluoropolyether (PFPE, available as SARTOMER™ 4002) is crosslinked using 354 nm ultraviolet light under nitrogen with 1% 2-hydroxy-2-methyl propiophenone (Sigma Aldrich) as the photo initiator. These various materials are thus used to form samples of icephobic low crosslink density elastomers in accordance with certain variations of the present disclosure.

Fluorinated polyurethane (FPU, commercially available from Fluonova) is crosslinked using either 8 wt. % 1,6-hexamethylene diisocyanate per manufacturer instructions. KRYTOX® 100, 103 and 105 are purchased from DuPont and up to 25 wt. % is added to the different polymers. The FPU is also crosslinked using an isocyanate functionalized PDMS (SILMER NCO Di-100™, Siltech) at a crosslinker ratio of 75/25 wt. %. To this is added 100 cP silicone oil. Solutions are mixed in ASAHIKLIN-225™ or chloroform at a concentration of 200 mg/ml.

VYTAFLEX™ polyurethane elastomeric rubbers are prepared by combining at least a first base component with a second cross-linker component. The PU samples with known modulus (Smooth-On Inc.) are mixed at a 1:1 base/cross-linker weight ratio as per manufacturer instructions. All VYTAFLEX™ urethanes are fabricated at an isocyanate:hydroxyl index of 1.1. The separate components can be mixed together, poured onto a substrate, such as a glass slide. For lubricated samples, the oil (vegetable oil, cod liver oil, 100-cP silicone oil, safflower oil, or isocyanate functionalized silicone oil (Silmer NCO Di-50), *eucalyptus* oil, or plasticizers like diisodecyl adipate (DIDA), medium-chain triglyceride (MCT) and diundecyl phthalate (DUP)) are added at levels of 1, 5, 10, 15, 20 or 50 wt. %. Thus, the amount of oil added into an elastomeric polymer system, such as an elastomeric polyurethane rubber, may be greater than or equal to about 1% by weight to less than or equal to about 50% by weight. In certain aspects, the vegetable oil, cod liver oil, 100-cP silicone oil, safflower oil, *eucalyptus* oil, isocyanate functionalized silicone oil (Silmer NCO Di-50), and/or MCT can be mixed into the VYTAFLEX™ system after mixing the base and cross-linker components. In certain variations, *eucalyptus* oil (Jedwards International) can be mixed with the base part A of the VYTAFLEX 40™ for 1 hour to react to change the final cross-link density before adding cross-linker part B. Thus, certain oils, like *eucalyptus* oil, can be mixed in with one part of a two part reactive polymer system prior to mixing the two parts together permitting a pre-reaction to occur, while in other variations, the oil is added after the two parts are mixed. When a reactive oil or liquid is added into one part of the two-part system, it may react for greater than 0 minutes to less than or equal to about 120 minutes (e.g., 0 minutes, 1 minute, 5 minutes, 10 minutes, 20 minutes, 60 minutes, or 120 minutes) before being mixed with the second part of the polymer system.

The rubber systems are then cured at room temperature overnight or in certain variations for 24 hours. The urethane-based rubber may be altered using a 50/50 wt. % ratio of the rubber cross-linker and an isocyanate-functionalized PDMS (SILMER NCO Di-100, Siltech) to improve silicone oil miscibility. The $\rho_{CL}$ of the urethanes can be altered by varying the type of isocyanate cross-linker or the urethane index, and/or through the addition of liquids/oil. Films are produced by either spin-coating or dip-coating glass slides in chloroform solutions at a solute concentration of 200 mg/ml, or spray-coating (500 mg/ml) or drop-casting without dilution.

Other elastomers prepared are CLEARFLEX50™ (Smooth-On Inc.) that includes mixing a first base component with a second cross-linker component at a 1:2 base/cross-linker weight ratio as per manufacturer instructions, similar to the VYTAFLEX™ reactions discussed above. Oils are added before curing at 80° C. overnight. In certain variations, CLEARFLEX50™ is mixed with VYTAFLEX 20™. VYTAFLEX 20™ is a transparent, amber-colored rubber that when mixed with CLEARFLEX 50™, forms a rubber with properties in between the two constituents, but is still greater than 90% transparent. Moreover, VYTAFLEX 20™ can be highly swollen with some oils, for example greater than about 60 wt. % with MCT. CLEARFLEX 50™ can only be swollen to approximately 10 wt. % with MCT, so mixing the two polyurethane rubbers allows more oil to be incorporated into the crosslinked matrix.

Thus, a 1:1 weight ratio of CLEARFLEX 50™ and VYTAFLEX 20™ produces highly transparent films, but also allows for the greatest addition of oil (e.g., MCT or DIDA). Because these oils are also transparent, it is advantageous for both the optical transparency and the ice adhesion strength to fill the coating with a large amount of oil. Parts A and B of the two rubbers, as well as the oil, are all mixed together before pouring onto glass slides and curing at room temperature overnight. Films are produced by either spin coating or dip coating glass slides in chloroform solutions at a solute concentration of 200 mg/ml, or spray-coating (500 mg/ml) or drop-casting without dilution, followed by curing.

Comparative examples of conventional icephobic surfaces, known as slippery liquid-infused porous surfaces (SLIPS) surfaces, are also created using methods described in Kim, P. et al., "Hierarchical or not? Effect of the length scale and hierarchy of the surface roughness on omniphobicity of lubricant-infused substrates," *Nano Lett* 13, pp. 1793-1799 (2013), the relevant portions of which are incorporated herein by reference. Aluminum (Al) sheets are etched in 2.5 HCl (Fisher Scientific) for 20 minutes, followed by copious rinsing in water. The etched Al is then boiled in water for 20 minutes, followed by immediate reaction with vapor phase Heptadecafluoro tetrahydrodecyl tricholorsilane (Gelest) at 120° C. in a closed container for 1 hour. KRYTOX™ oils (100, 103 or 105) are then poured onto the substrates, which are then left vertical overnight to allow any excess oil to drip from the coating.

Si wafers are rinsed with acetone and the solutions are spin cast at 1500 RPM for 60 seconds, followed by curing at 80° C. overnight (about 10 hours). The polyurethane rubber samples (Smooth-On Inc.) are mixed at a 1:1 base:crosslinker ratio per instructions.

For lubricated samples, the liquid (vegetable oil-Kroger, cod liver oil-Fisher, 100 cP silicone oil-Sigma Aldrich, safflower oil-Jewards International, *eucalyptus* oil, isocyanate-functionalized silicone oil-SILMER NCO Di-50™ or plasticizers like diisodecyl adipate (DIDA), medium-chain triglyceride (MCT) and diundecyl phthalate (DUP)) is added at levels of 1, 5, 10, 15, 20, or 50 wt. %. The rubber is cured overnight (about 10 hours). As noted above, in certain aspects, the rubber is altered using a 50/50 wt. % ratio of the rubber crosslinker and an isocyanate functionalized PDMS (SILMER NCO Di-50™, Siltech) in order to improve silicone oil miscibility.

Polystyrene (PS, $M_w$: 190,000, Scientific Polymer) is dissolved in toluene at a concentration of 200 mg/ml and to it is added silicone oil (AP 1000, Sigma Aldrich), polymethylphenyl siloxane (PMPS, Sigma Aldrich), or low molecular weight PS ($M_w$: 200 or 540 g/mol, Scientific Polymer). Polyisobutylene (PIB, $M_w$: 400,000 g/mol, Scientific Polymer) is dissolved in heptane at a concentration of 200 mg/ml and to it is added polybutene ($M_n \approx 920$ g/mol, Sigma Aldrich). Both PIB and PS samples are spincast using the same method as above, and then cured at room temperature for 24 hours. Table 1 above includes a complete list of fabrication methods/recipes and resulting surface properties for the icephobic surfaces prepared in accordance with the present disclosure.

Photolithography

A 3 µm thick layer of photoresist (SPR 220-3.0, Shipley) is spin-coated on a silicon wafer and baked for 90 seconds at 115° C. The lateral layouts of the micropattern are defined by 365 nm UV exposure (Karl Suss MA6 mask aligner) and developing in AZ300 MIF. Inductively coupled plasma reactive-ion etching (ICP-RIE, STS Pegasus) formed approximate 30 µm and 75 µm deep micropore arrays in the exposed regions, and the photoresist is stripped (Baker PRS 2000). To construct pillars of a precise thickness, two methods are adopted. For thick substrates, the uncured PDMS is poured onto the silicon mold, degassed, and cured. For thin substrates, the uncured PDMS is spincast on the Si mold at 5000 RPM for 60 seconds with a ramp rate of 5 seconds. Glass slides are then placed atop the spincast layer. The PDMS is degassed to remove air bubbles between the glass slide and mold, and finally the whole system is cured.

Ice Testing $\tau_{ice}$ is measured using a custom setup described in Meuler, A. J. et al. "Relationships between water wettability and ice adhesion," *ACS Applied Materials & Interfaces* 2, pp. 3100-3110 (2010), the relevant portions of which are incorporated herein by reference. Briefly, a force gauge is mounted to a movable stage. The gauge pushes the ice adhered to a substrate on top of a Peltier plate. The thickness of ice is about 5-8 mm, whereas the gauge contacts the surface less than 1 mm from the surface. Testing is done at –10° C. except for a temperature study done between –5° C. and –35° C. 0.5 ml of water is used for all testing. Surfaces are allowed sufficient time to fully freeze before testing. For smooth coatings, $\tau_{ice}$ is found to be independent of the time between the water completely freezing, and the ice being sheared off. $\tau_{ice}$ is the maximum force required to shear off a given area of ice. Force versus time curves are acquired for surfaces with $\tau_{ice}<250$ kPa by a Mark-10 force gauge which has a minimum resolution of 0.0005 N. With this gauge, an $\tau_{ice}$ as low as 1.0 kPa can be measured with an accuracy of ±0.05 kPa. An Imada force gauge is used for surfaces with $\tau_{ice}>250$ kPa, which has a resolution of 0.1 N.

CCREL Testing

Two PDMS-based and two PU-based coatings are sent to the United States Army's Cold Regions Research and Engineering Laboratory (CRREL) to be independently evaluated in Mode-I type (peel test) adhesion testing. CRREL tested samples according to certain variations of the present disclosure included a low $\rho^{CL}$ PDMS coating ($\rho^{CL}=110\pm5$ mol/m$^3$), a low $\rho^{CL}$ PDMS coating containing 25 wt. % silicone oil ($\rho^{CL}=76\pm1$ mol/m$^3$), polyurethane containing 15 wt. % vegetable oil ($\rho^{CL}=52\pm1$ mol/m$^3$), and PDMS-modified polyurethane containing 10 wt. % silicone oil ($\rho^{CL}=21\pm1$ mol/m$^3$). The CRREL ice adhesion setup involves aluminum tabs with an area of ice of about 10 cm$^2$. Ice is grown from starter crystals under precisely controlled environmental conditions. A starter crack is formed at the base of the specimen and then the ice is pulled in a direction normal to the surface plane. In this way, Mode-I type fracture is evaluated.

Degree of Crosslinking Determination

Swelling studies are performed using toluene and acetone as the probe solvents. Substrates are submerged in excess toluene until a constant mass is achieved. Fully swollen substrates are patted dry prior to measurement to minimize any errors due to evaporation. Large enough substrates are used so that the error associated with evaporated toluene vapor is <2%. Swollen samples are placed in an 80° C. oven under vacuum to remove the toluene until the mass remained constant. In this manner the extractable and permanent mass content can be discerned. Flory-Huggins interaction parameters for the FPU, PFPE and PU are estimated by determination of their solubility parameter by swelling in a large number of solvents, as explained in ASTM D412-06a (2013), Standard Test Methods for Vulcanized Rubber and Thermoplastic Elastomers—Tension (ASTM International, West Conshohocken, Pa., 2013), incorporated herein by reference (FIGS. 11A-11B).

Figures 11A, 11B:
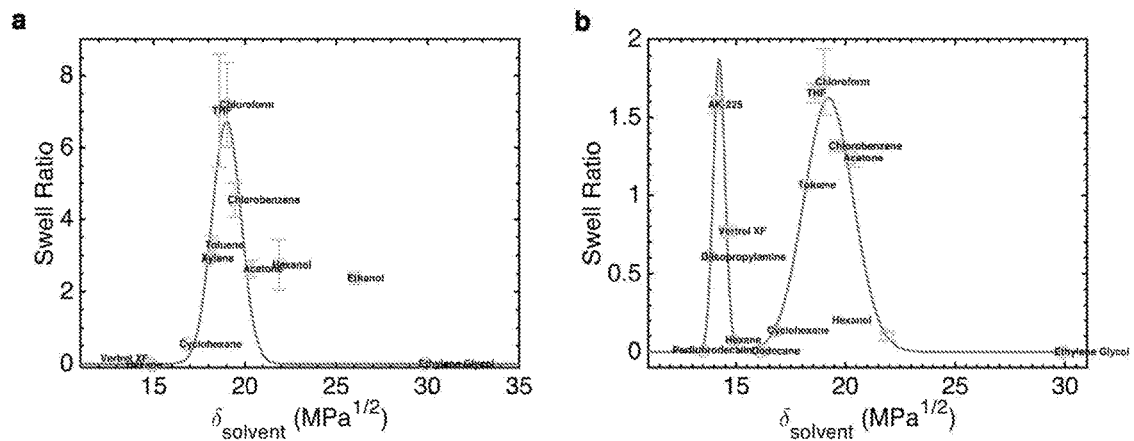

FIGS. 11A-11B show elastomer solubility parameter determination. FIG. 11A shows a graph of equilibrium swell ratios for the PU as a function of the probe solvent's solubility parameter, $\delta_{solvent}$. The data is fitted to a Gaussian. FIG. 11B shows a graph of equilibrium swell ratios for the FPU as a function of $\delta_{solvent}$. The data is fitted to a bi-modal Gaussian, accounting for the swelling of the fluorinated and urethane components independently. The peak around 19 MPa$^{1/2}$ is characteristic or the urethane bond.

Mechanical Characterization

To make dog-bone specimens, the uncured material (PDMS, FPU or PU) is poured on fluoro-silanized glass panels 1 ft×1 ft in area. For PDMS and PU, no solvent is added as the viscosity is low enough to produce smooth puddles of the liquid polymer. To the FPU 1 ml n-butyl acetate (Sigma Aldrich) is added per 5 g FPU polyol and crosslinker. Once cured, dog-bone samples with dimensions outlined in ASTM D412, Die D are stamped out. Tensile testing is done on a MTS Insight 10 using a 10 kN load cell and a 56 mm gauge length. The crosshead is controlled at 10 mm/min. Mechanical abrasion is performed using a LINEAR TABER® Abrasion machine with a CS-10 resilient abrader and a total weight of 1100 g. The abrader is refaced before each set of abrasion cycles using sand paper (from Taber®). Refacing is done at 25 cycles/min for 25 cycles. For abrasion, samples are clamped down and abraded for up to 5000 cycles at 60 cycles/min and a stroke length of 25.4 mm. For PDMS samples (SYLGARD™ 184) the coating is completely removed after less than 50 cycles. Abrasion samples are drop-cast onto glass slides without dilution, giving a final coating thickness of about 2 mm.

Additional Durability Testing

Thermal cycling is performed by leaving a coated glass slide on a 70° C. hotplate. After 24 hours, the ice adhesion at –10° C. is measured and this process is repeated 10 times. It should be noted that, for natural oils, a trade-off exists between thermal stability and melting point. For example, vegetable oil can survive up to 100° C. environments but will freeze around –10° C. Safflower oil degrades near 100° C., but will not freeze until –35° C. Probing the low temperature characteristics of the coatings is done by adjusting the Peltier plate from –5° C. down to –35° C.

Corrosion testing is done in accordance to ASTM B 117, Standard Practice for Operating Salt Spray (Fog) Apparatus (ASTM International, West Conshohocken, Pa., 2011). Briefly, steel tabs measuring 25 mm×75 mm are spray-coated at 500 mg/ml. The coated pieces are hung in a salt-spray fog chamber (Bemco Inc.) kept at 35° C. for 200 hours. A 25 mm scratch is made along the length of the coating so that the steel underneath is exposed. After the accelerated corrosion, the ice adhesion is measured.

Coating Adhesion

Standard peel tests in accordance with ASTM D3359—Standard Test Methods for Measuring Adhesion by Tape Test (ASTM International, West Conshohocken, Pa., 2009) are conducted to determine adhesion to the underlying substrate. A major concern for most hydrophobic polymers is their adhesion to substrates. A standard tape (ELCOMETER™ 99) is pressed on coated substrates using a rubber eraser. Substrates tested are steel, copper, aluminum and glass. An elongated 'x' pattern is cut into the coating before the tape is applied. After pulling the tape off quickly and at an angle of 180°, the coating is evaluated for removal from the substrate. On all substrates tested, the coatings prepared in accordance with the present disclosure showed no signs of removal. This process is repeated by 10 times, followed by ice adhesion measurement.

Chemical Stability

Chemical stability is evaluated by submerging glass slides dropcast without icephobic polyurethane (with silicone, safflower or vegetable oil) in 1.5M HCl and NaOH solutions. The coated pieces are submerged for 5 minutes and then rinsed with copious amounts of deionized water. After drying, the ice adhesion is measured.

Microscopy/Contact Angle

Optical images are taken using a VISTAVISION VWR™ optical microscope with a 5× objective. Tapping-mode atomic force microscopy (AFM) is conducted using a Veeco Innova instrument. Veeco TESPA tips and Hi Res C probes are used for imaging. Contact angles are measured using a Ramé-Hart 200-F1 goniometer. Measurements are made by advancing and receding a single droplet of liquid (about 10 µL) from a 2 mL micrometer syringe (Gilmont). Averages from at least three independent measurements are reported.

In the methods described above, to provide interfacial slippage, liquids are added to the low crosslink density elastomer material coatings. A series of different icephobic coatings which are fabricated from PDMS, polyurethane rubber (PU), fluorinated polyurethane polyols (FPU) and perfluoropolyethers (PFPE), with $\rho^{CL}$ varying from 0.68 mol/m$^3$ to 1203 mol/m$^3$, as measured by solvent swelling using Flory-Huggins theory and confirmed by a Mooney-Rivlin analysis of tensile strength data. Such liquids may be in the form of silicone oil, KRYTOX™ lubricant oil commercially available from DuPont, vegetable oil, cod liver oil or safflower oil. As indicated earlier, $G^{1/2}$ applies for surfaces without interfacial slippage.

Figures 6A, 6B:
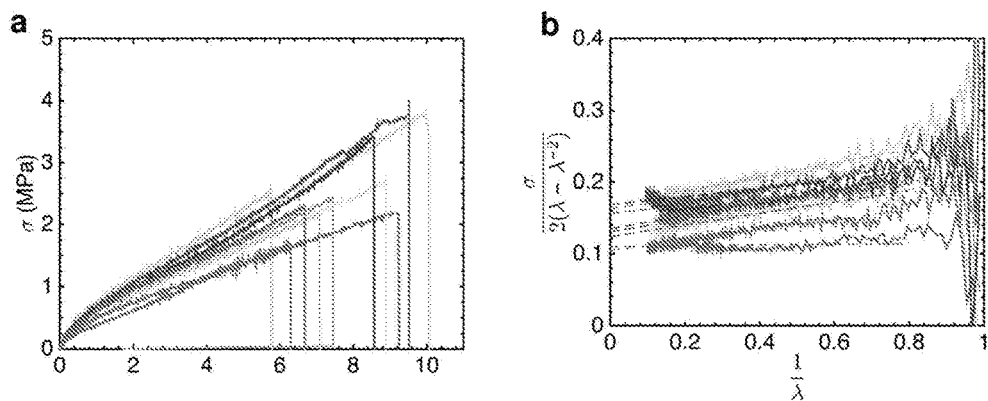

FIGS. 6A and 6B show tensile test data for one variation of an icephobic surface prepared in accordance with the principles of the present disclosure. FIG. 6A shows stress-strain results for one variation of an icephobic polyurethane rubber (VYTAFLEX 40™, 15 wt. % safflower oil). The elongations at break of the materials are in excess of 1000%. FIG. 6B shows a re-plotting of data using Mooney-Rivlin axes that allows $\rho^{CL}$ to be discerned (intercept of the y-axis at infinite elongation). Due to inaccuracies of the test machine at very small strains, linear regressions for the stress-strain data are fit when $1/\lambda \leq 0.8$, where $\lambda$ is the extension ratio. For all the materials tested, error between swelling studies and tensile test data is typically <5%. The error between measured samples is usually much larger than the test method discrepancy, i.e., the two test methods gave statistically equivalent crosslink densities, with an overall uncertainty of around 10%.

When $\tau_{ice}$ is measured for surfaces devoid of any uncrosslinked chains, this dependence is observed precisely (FIG. 2B). Interestingly, for elastomers, there is no significant impact of surface energy on $\tau_{ice}$ (see FIG. 1). The reduction in ice adhesion is dominated by lowering $\rho^{CL}$. The $G^{1/2}$ dependence appears to arise from the interfacial cavitation that occurs in the low modulus film. The ice detaches in Mode-I type fracture even though the loading would suggest Mode-II. As verification discussed further below, two PDMS-based and two PU-based coatings are sent to the United States Army's Cold Regions Research and Engineering Laboratory (CRREL) to be independently evaluated in Mode-I type (peel test) adhesion testing.

Figures 7A, 7B, 7C:
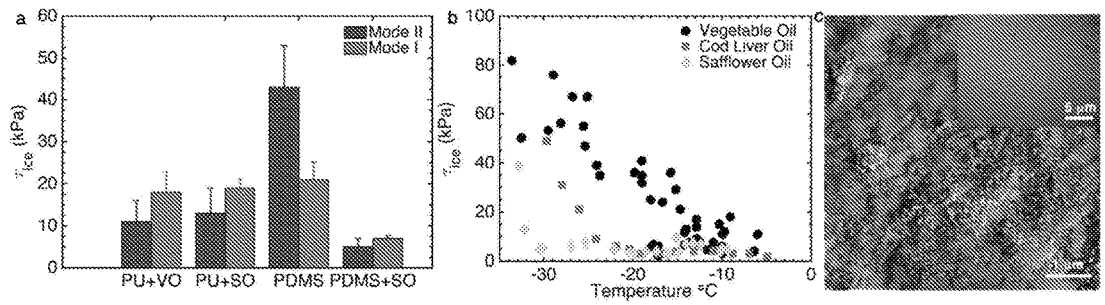

As expected, the ice adhesion strength $\tau_{ice}$ values at CRREL matched the $\tau_{ice}$ values previously measured, within error (FIGS. 7A-7C). FIGS. 7A-7C show additional data for interfacial slippage mechanisms for coatings prepared in accordance with certain principles of the present disclosure. FIG. 7A shows a graph comparison of four samples sent to United States Army's Cold Regions Research and Engineering Laboratory (CRREL) to be independently evaluated in Mode-I type (peel test) adhesion testing. The CRREL data points (Mode-I) are the average of two different samples tested once, whereas the in-house data points (Mode-II) are the average of at least 10 subsequent measurements. FIG. 7B shows a graph of low temperature studies for a polyurethane elastomer filled with 15 wt. % vegetable, cod liver or safflower oil prepared in accordance with certain aspects of the present disclosure. The increase in ice adhesion indicates the loss of interfacial slippage, caused by the freezing of the fatty acid chains. The polyunsaturated fatty acid content increases from vegetable to cod liver to safflower oil. FIG. 7C shows an AFM phase image of the PU coating without oil.

FIG. 2B shows a relationship between $\rho^{CL}$ and $\tau_{ice}$ for coatings without interfacial slippage, produced from PDMS, polyurethane (PU), fluoropolyurethane (FPU) and polyfluoropolyethylene (PFPE) elastomers. Error bars are one standard deviation and the best fit is found using the method proposed by York. The slope is 0.51±0.04. FIG. 2C shows the variation of $\tau_{ice}$ with $\rho^{CL}$ for coatings with interfacial slippage. The slope is 1.01±0.03. FIG. 2D shows ice-reducing-potential, I*, measured for coatings with and without interfacial slippage but the same $\rho^{CL}$, within 5% error. Error bars are one standard deviation and $R^2$=0.89.

To provide interfacial slippage, either silicone, KRYTOX™, vegetable, cod liver, or safflower oil are embedded in the low density elastomeric material. $\tau_{ice}$ is approximately equal to $G^{1/2}$ for elastomeric surfaces in the absence of slippage. When $\tau_{ice}$ is measured for surfaces devoid of any crosslink chains, this dependence is observed in FIG. 2B. For different elastomers tested, no significant impact of elastomer chemistry/surface energy on $\tau_{ice}$ is observed. The variation in ice adhesion strength is dominated by changes in $\rho^{CL}$.

In FIG. 2C, in a number of different icephobic systems according to the present disclosure, interface slippage is enabled through the addition of miscible, polymeric chains, $\tau \sim G$. When no hydrogen bonding is present between the ice surface, $\tau_{ice}$ is effectively independent of both Q and η. It is clear from FIG. 2C that the effects of $\rho^{CL}$ dominates ice adhesion.

In order to predict the adhesion strength reducing potential for different elastomers, the dimensionless parameter I* is used. I* is the ratio of $\tau_{ice}$ for an elastomer without interfacial slippage and $\tau_{ice}$ for an elastomer with interfacial slippage:

$$I^* = \frac{\tau_{ice}^{no-slip}}{\tau_{ice}^{slip}} = \frac{A}{\sqrt{\rho^{CL}}}. \quad (1)$$

In FIG. 2D, the two most important factors are that a low $\rho^{CL}$ is required to achieve extremely low values of $\tau_{ice}$ in such elastomeric systems and that interfacial slippage enhances the effects of low $\rho^{CL}$. For example, the addition of interfacial slippage for FPU ($\rho^{CL}$=1098 mol/m$^3$) only gives I*=1.6, whereas for soft PDMS ($\rho^{CL}$=8.5 mol/m$^3$), I*=24. Further, by fitting the data shown in FIG. 2D, A≈83. This has the physical interpretation that, for $\rho^{CL}$>7000 mol/m$^3$, there is no possible gain from interfacial slippage. For example, adding 25, 50 and 75 wt. % liquid polybutene to polybutene ($\rho^{CL}$~8,000 mol/m$^3$) resulted in statistically equivalent $\tau_{ice}$ values as polybutadiene with no polybutene embedded, e.g., I*=1.0. The same is found for polystyrene ($\rho^{CL}$~450,000 mol/m$^3$) embedded with liquid, low molecular weight polystyrene (Table 1).

When designing surfaces with interfacial slippage, a thick lubricating layer can form if the miscibility between the polymeric chains and the elastomer is not controlled. The easiest way to check for a lubricating layer is by physically touching the surface, either by hand, through controlled abrasion or by repeatedly measuring $\tau_{ice}$ over multiple icing/de-icing cycles. This liquid layer is also readily viewable in the AFM phase images as well under optical microscopy as show in FIGS. 3C and 3D respectively. Moreover, lubricated surfaces rely on an extremely low contact angle hysteresis (CAH) to achieve their properties. This makes lubricated systems mechanistically different from surfaces with interfacial slippage. For example, the friction on lubricated surfaces is independent of $\rho^{CL}$, but heavily reliant on the oil viscosity. In contrast, the icephobic surfaces prepared in accordance with the present disclosure can have high CAH (Table 1), can survive mechanical abrasion that would remove any lubricating surface layer like those seen in FIG. 4C and display $\tau_{ice}$ values that depend strongly on $\rho^{CL}$, as shown in FIGS. 2B-2D, which are independent of oil viscosity.

Figure 8:
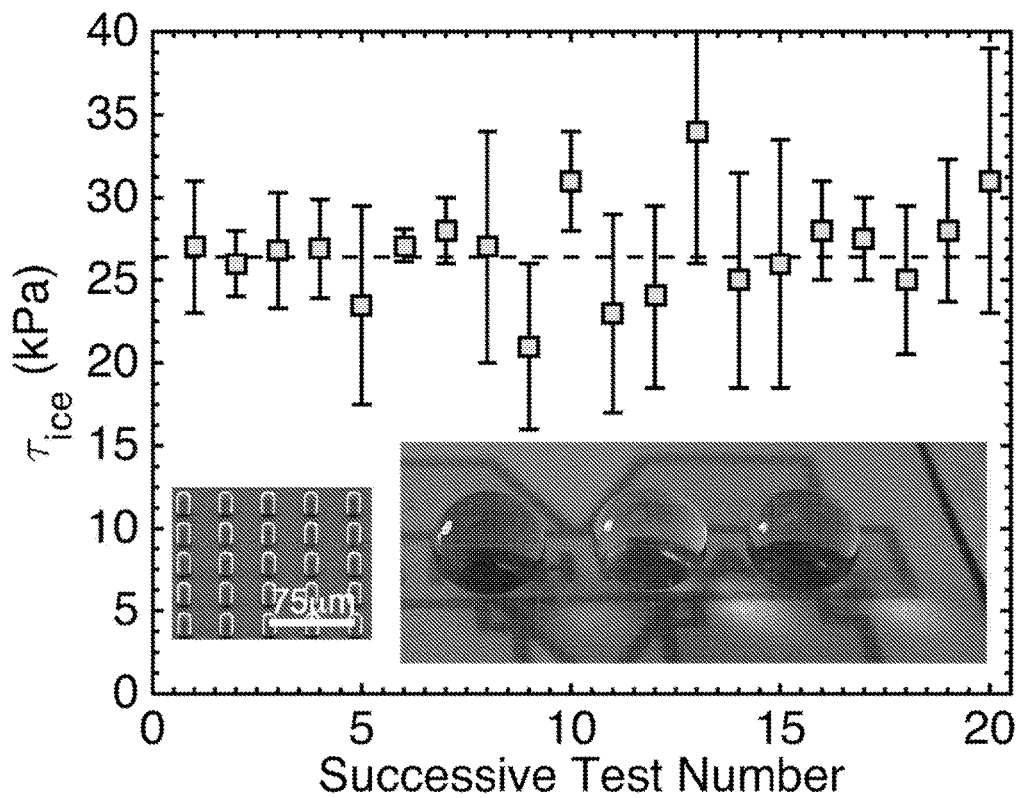

As shown in FIG. 8, using a silicon mold with a square array of holes (see inset on lower left) allows the fabrication of icephobic ($\tau_{ice}$=26±3 kPa), PDMS-based micro-pillars. Droplets of water placed on such a surface display superhydrophobicity, with $\theta_{water}^{adv}/\theta_{rec}^{water}$=165°/161°, and a low roll-off angle of 3° (inset on lower right). FIG. 8 shows the ice adhesion strength over 20 successive icing/de-icing cycles on such surfaces. A measured ice adhesion strength $\tau_{ice}$=26±3 kPa. Such surfaces effectively repel liquid water through minimizing the solid-liquid contact area, and solid ice through low $\rho^{CL}$ and interfacial slippage. The differing mechanisms allow the surface to remain icephobic even after the surface is fully frosted. Such surfaces are therefore able to prevent attachment of both water droplets and ice.

To evaluate the durability of the icephobic coatings according to certain aspects of the present disclosure, force versus time curves for surfaces over repeated icing/de-icing is studied. FIGS. 5A-5C shows comparative liquid-layer surface degradation. In FIG. 5A, conventional SLIPS-based icephobic surfaces having a liquid lubricating layer of KRYTOX™ 100, KRYTOX™ 103, or KRYTOX™ 105 on the exposed surface is tested over multiple icing/de-icing cycles. In FIG. 5B, force versus time curves are provided for coating Q (set forth in Table 1 having a SYLGARD™184 PDMS elastomer with crosslinker at 1:1 ratio with 100 cP silicone oil dispersed therein. Measuring the exact cross-link density proved to be difficult for Coating Q due to the softness of the coating; however, it is believed to be very low (e.g., less than about 1 mol/m$^3$). Coating Q has an initial ice adhesion strength of 0.15 kPa. The 'x' symbol in FIG. 5B demarcates when the ice is first un-adhered from the coating. Coating Q is so soft that the ice testing damages it, as discussed further below, which is believed to be why ice adhesion strength goes up in FIG. 5B.

FIG. 5C shows the effect of oil content in a PU based coating prepared in accordance with certain aspects of the present disclosure on $\tau_{ice}$ after normalizing by $\rho^{CL}$. The miscibility limit of safflower oil is around 16 wt. %. For a surface damaged during the icing/de-icing process as in FIG. 5A, the shape of the force versus time curve changes as the surface degrades, as shown in FIG. 5B.

Figures 3A, 3B, 3C, 3D:
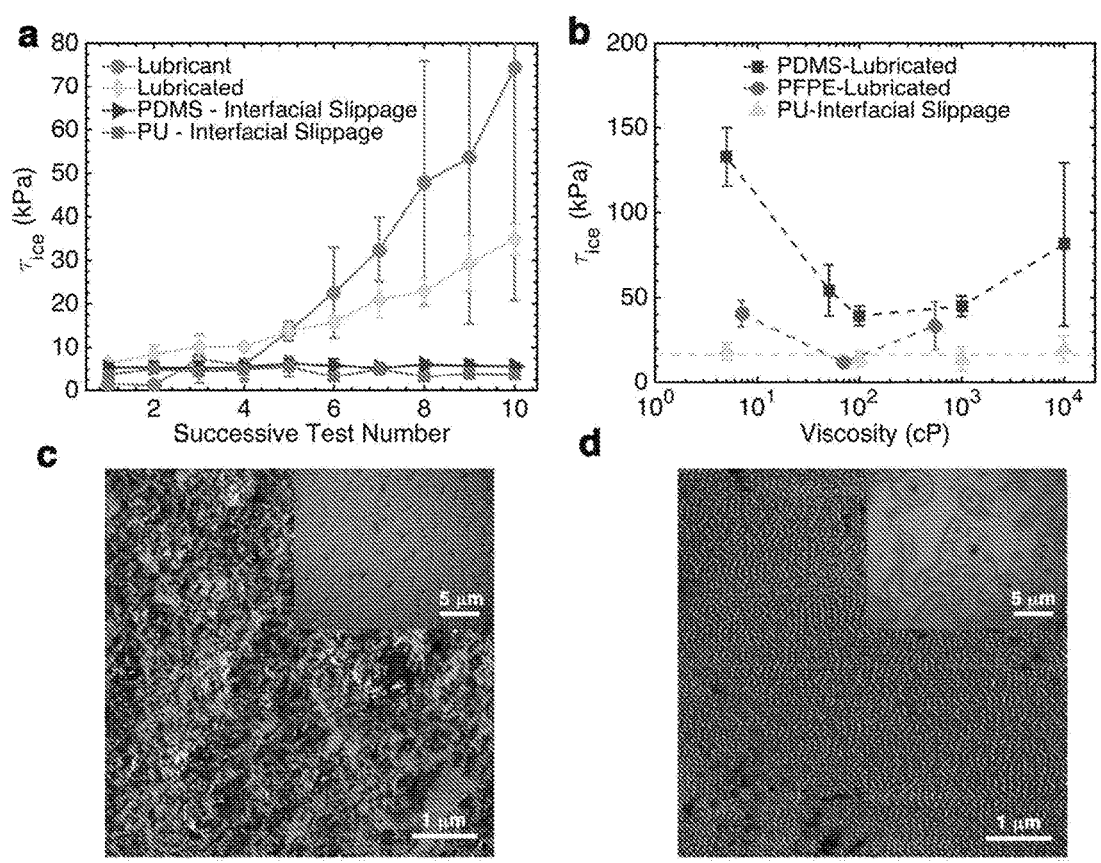

FIGS. 3A-3D show a comparison of different mechanisms, namely interfacial slippage in accordance with the present disclosure versus a conventional lubrication mechanism. In FIG. 3A, within 10 icing/de-icing cycles, the difference between lubricated surfaces (such as the conventional SLIPS surfaces having a lubricating surface layer) and surfaces with interfacial slippage in accordance with certain aspects of the present disclosure becomes apparent. For comparison, PMHS is spin-cast onto a Si wafer at 1500 RPM from a 200 mg/ml solution in toluene. This is denoted as lubricant. The lubricated surface is PDMS with excess silicone oil on the surface.

FIG. 3B shows that lubricated surfaces strongly depend on viscosity, whereas surfaces with interfacial slippage in accordance with the present disclosure are markedly independent of viscosity (Coatings BH, BI, BJ and BK in Table 1). For lubricated surfaces, the trend follows a typical Stribeck relationship. FIG. 3C shows AFM phase images and optical micrographs of the PU coating with 15 wt. % safflower oil, and no lubricating layer present in accordance with certain aspects of the present disclosure. The AFM scan looks equivalent to the PU coating without oil (see FIG. 7C, showing an AFM phase image of the PU coating without oil). FIG. 3D shows AFM phase images and optical micrographs of the PU coating with 10% silicone oil. The lubricating layer is clearly visible.

For certain surfaces, $\tau_{ice}$ increases significantly with increasing icing/de-icing cycles, as shown in FIG. 3A. Both lubricated surfaces, as well as surfaces too soft to prevent physical damage display such behavior within 10 icing/de-icing cycles, shown in FIGS. 3A, 4A-4C, 5A, and FIGS. 10A-10D. However, such soft surfaces often offer the most immeasurably low $\tau_{ice}$. The most icephobic surface (coating Q in Table 1) measured $\tau_{ice}$=0.15±0.05 kPa (FIG. 5B). This is two orders of magnitude lower than the lowest $\tau_{ice}$ values believed to have been reported thus far, and over five orders of magnitude below $\tau_{ice}$ for flat aluminum. Ice slides off of such surfaces solely under its weight. However, additional icing/de-icing cycle begin to degrade the surface, raising $\tau_{ice}$ and altering the force versus time curve, as shown in FIG. 5B. Surfaces prepared in accordance with certain aspects of the present disclosure maintain their low $\tau_{ice}$ values, as shown in FIG. 3A, show self-similar force versus time curves (FIGS. 10A-10D). In FIGS. 10A-10D the force versus time curves are provided for a lubricant lubricated PDMS ($\rho^{CL}$=52±1 mol/m$^3$, 25 wt. % 100 cP silicone oil), and PU ($\rho^{CL}$=33±1 mol/m$^3$, 15 wt. % safflower oil) surfaces from FIG. 3A. The number next to each curve is the order in which they occurred. Hence, force versus time curves offer one method of determining the durability of icephobic coatings.

Figures 4A, 4B, 4C:
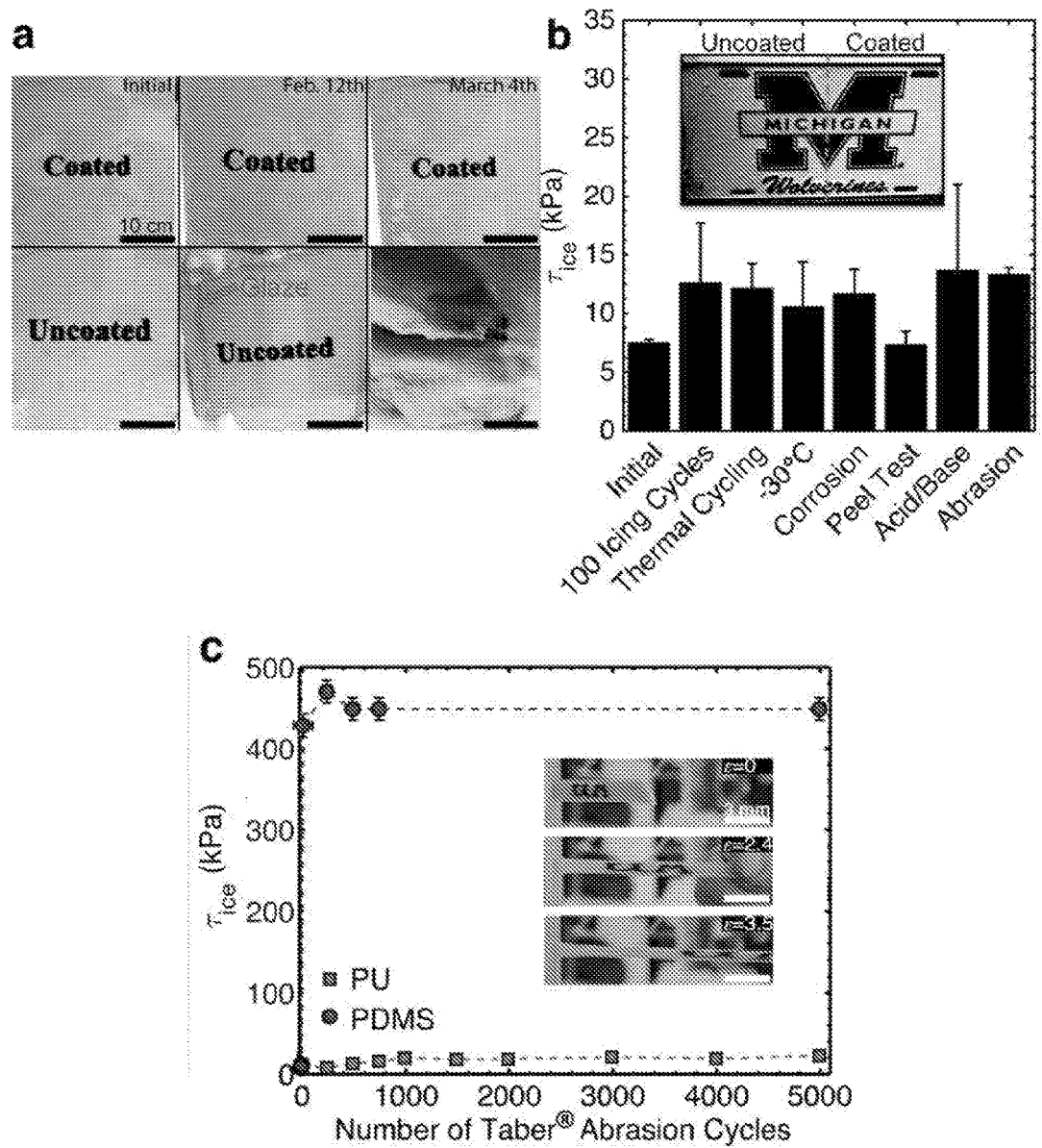

In another example, outdoor testing was conducted during the winter months (4 months) of 2013 and 2014 in Ann Arbor, Mich. In this example, the durability of icephobic polyurethane (PU) prepared in accordance with certain aspects of the present disclosure is tested. The right half of a license plate is coated with icephobic PDMS ($\rho^{CL}$=102±5 mol/m$^3$, 25 wt. % 50 cP PMHS). FIG. 4A shows both the uncoated license plate side as a control and the coated side having an icephobic PU coating. The license plate is placed outside during February 2013. Freezing rain occurred on the night of February 26, and the plate is imaged the following day, as shown in the inset of FIG. 4B. The uncoated side showed significant ice accretion, while all accreted ice on the coated side sheared off during the ice storm.

Between December and March 2014, two glass panels (surface area of 1 ft$^2$) were placed outdoors, one of them coated with the icephobic PDMS ($\rho^{CL}$=76±1 mol/m$^3$, 25 wt. % 100 cP silicone oil). On February 12, the uncoated panel is covered with about 7 mm layer of glaze, the type of ice with the strongest adhesion. FIG. 4A. No ice had accreted on the coated panel. On March 4, snow followed a night of freezing rain, which completely covered the uncoated panel. The coated panel only had a small amount of accreted ice remaining that had not yet sheared off. FIG. 4A, Over the four months of exposure, both snow and ice accreted on the uncoated glass panel. The coated panel often had snow settle on it, but all ice that formed is quickly sheared off from mild winds, as seen in FIG. 4A. After four months of exposure, the contact angles and the $\tau_{ice}$ for the coated surface are the same as before testing, highlighting the durability of the coating.

FIG. 4B shows durability testing for an inventive PU icephobic coating prepared in accordance with certain other aspects of the present disclosure. The use of hydrophobic elastomers as icephobic coatings provides extremely durable icephobic systems. This is also one of the first examples of a hydrophilic, yet icephobic surface. FIG. 4B shows the durability testing including ice adhesion strengths for the icephobic polyurethane ($\rho^{CL}$=33 mol/m$^3$, 15 wt. % safflower oil, CAH=380) during different test conditions, including an initial sample, and samples subjected to Taber® abrasion (ASTM D4060), acid/base exposure, accelerated corrosion (ASTM B 117), thermal cycling and peel testing (ASTM D3359). Longevity testing is extended to 100 icing/de-icing cycles, and coating evaluated in temperature range of −5° C. to −35° C. (See also, FIG. 7B). After 5000 abrasion cycles, causing over 600 μm of thickness loss, the coating remains icephobic because the icephobicity is an inherent property of the coating. PDMS based coatings, though equally icephobic, are completely abraded away, and/or delaminated, after 18±12 cycles, as can be seen in FIG. 4C. The use of high surface energy elastomers allows the creation of a coating that adheres very well to the underlying substrate. There is no observable increase in $\tau_{ice}$ even after 10 successive peel tests on steel, copper, aluminum, and glass, or after thermal cycling between −10° C. and 70° C. Additionally, the icephobic polyurethane is subjected to a tensile stress of 2.5 MPa, causing the elastomer to elongate by 350% without breaking or losing its icephobic properties, as seen in the inset of FIG. 4C. Additional tensile testing showed strains in excess of 1000% is shown in FIGS. 6A-6B.

Figures 9F, 9G:
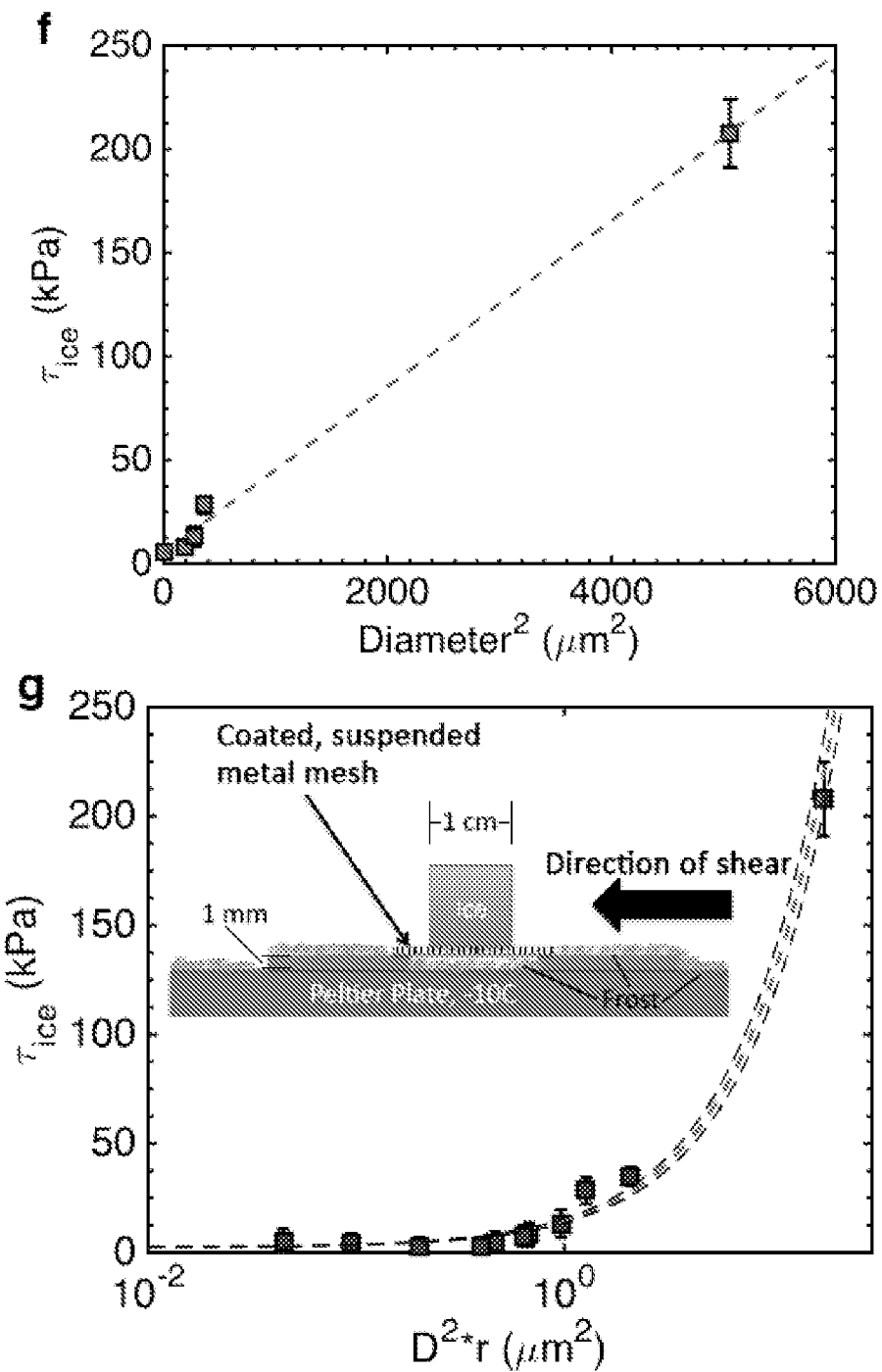
Figures 10A, 10B, 10C, 10D:
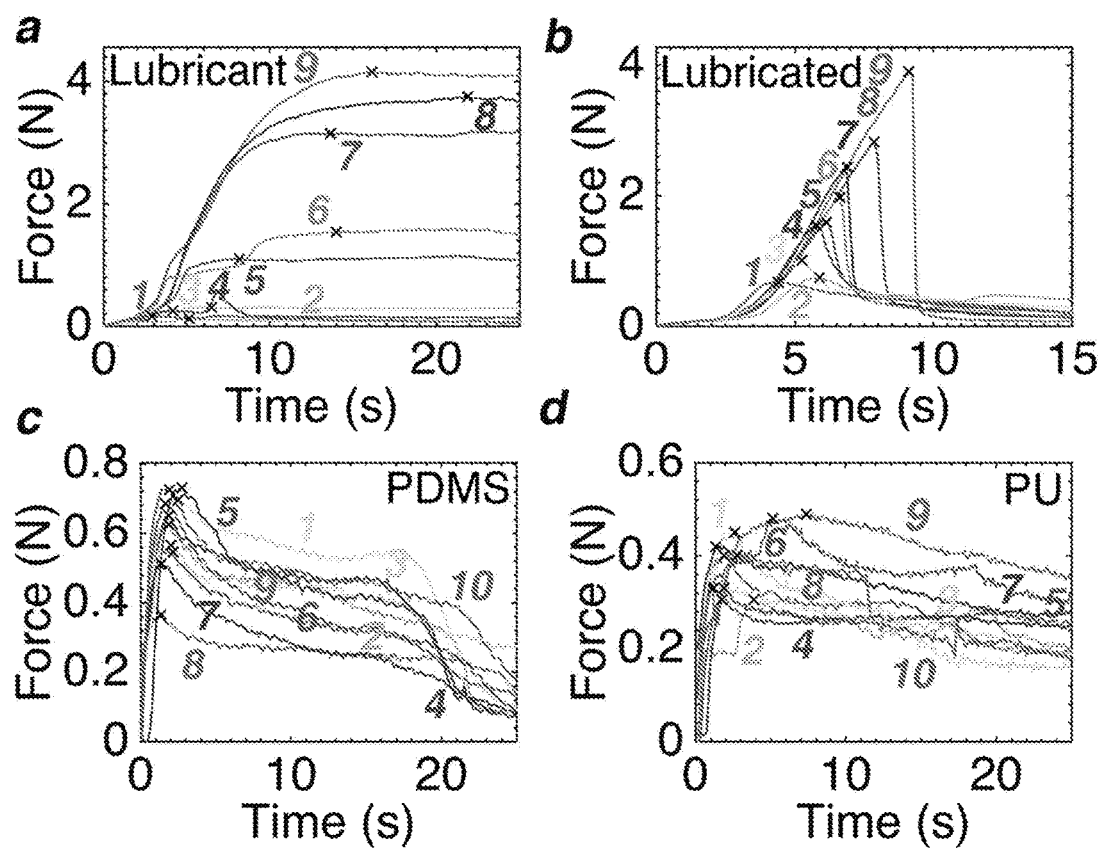

FIGS. 9A-9G show icephobicity of coated mesh substrates. FIG. 9A is a chart showing the parameter space of mesh properties evaluated, including minimum and maximum diameter (D), open area, holes/inch, and roughness. FIG. 9B shows the effect of dip coat solution concentration on % open area with progressive dipping from left to right. FIG. 9C is an SEM micrograph of a PDMS coated, mesh 500. FIG. 9D shows frost all around the ice testing setup, including beneath the suspended mesh. FIG. 9E shows ice adhesion strength ($\tau_{ice}$) versus the % open area of various meshes with D=140 μm. FIG. 9F shows $\tau_{ice}$ versus D$^2$ for meshes with an open area of 30%. FIG. 9G shows $\tau_{ice}$ for a coated mesh correlates very well with the predictor D$^2$r, where r is the Wenzel roughness and D is the wire diameter. The low interfacial area between ice and the substrate can significantly lower $\tau_{ice}$. A PDMS-coated ($\rho^{CL}$=219±13 mol/m$^3$ 25 wt. % 100 cP silicone oil) mesh with a wire diameter of 140 μm and an open area of 59% displayed $\tau_{ice}^{mesh}$=2.4±0.5 kPa, whereas $\tau_{ice}^{smooth}$=35±5 kPa. The inset shows the experimental setup for suspended metal mesh ice adhesion testing.

These durable coatings according to the present disclosure can be spun, dipped, painted, or sprayed on to essentially any underlying substrates of any size. Finally, the coatings prepared in accordance with the principles of the present disclosure can exhibit extremely low ice-adhesion, ice-strengths for multiple surfaces which are independently verified by Mode-I type adhesion testing at the U.S. Army's Cold Regions Research and Engineering Laboratory.

Crosslink density and interfacial slippage are two universal attributes that can be used to systematically tailor ice adhesion for elastomeric surfaces. It has been found that, irrespective of material chemistry/surface energy, interfacial slippage appears to make the biggest impact on the ice-adhesion strength of low crosslink density elastomers. Using this understanding, it is possible to fabricate a range of different, mechanically durable, long lasting icephobic surfaces from many material systems including hydrophilic materials. Such durable icephobic coatings have worldwide applications across various industrial sectors, academic disciplines, and engineering endeavors.

Figure 12:
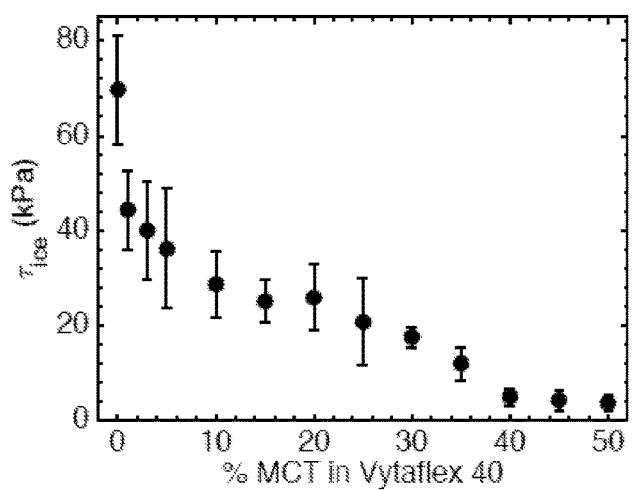
FIG. 12 shows ice adhesion strength ($\tau_{ice}$) of an icephobic urethane-based VYTAFLEX 40™ elastomeric material as a function of percent of medium-chain triglyceride (MCT) liquid added according to certain aspects of the present disclosure.
Figure 13:
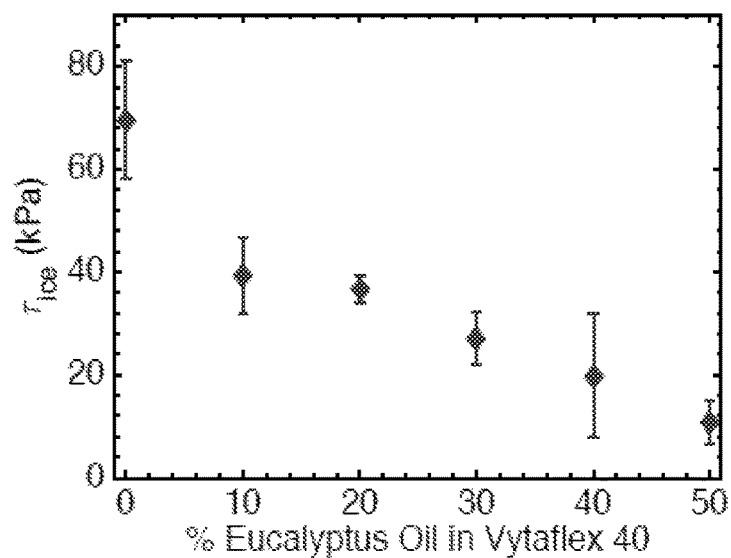
FIG. 13 shows ice adhesion strength of ice adhesion strength ($\tau_{ice}$) of an icephobic urethane-based VYTAFLEX 40™ elastomeric material as a function of the percentage of *eucalyptus* oil within the elastomer during curing according to certain aspects of the present disclosure.

FIGS. 12, 13, and 14A-14B show properties of other icephobic urethane-based material systems. FIG. 12 shows ice adhesion of VYTAFLEX 40™ as a function of percent of MCT liquid added, where a greater amount of MCT added reduces $\tau_{ice}$. FIG. 13 shows ice adhesion strength of VYTA-FLEX 40™ as a function of the percentage of *eucalyptus* oil within the elastomer during curing. As *eucalyptus* oil is volatile, no oil remains in the coating when tested for ice adhesion strength. Thus, the oil only reduces the ice adhesion by changing the crosslink density of the VYTAFLEX 40™. This is confirmed with solvent swelling. FIG. 14A shows ice adhesion strength of CLEARFLEX 50™ versus the percentage of DIDA plasticizer within the coating. The ice adhesion strength rice is reduced as % DIDA increases. In FIG. 14B, the ice adhesion of a 1:1 mixture of CLEAR-FLEX 50™ and VYTAFLEX 20™ is shown when filled with varying amounts of DIDA. The rice is reduced with greater amounts of DIDA added into the urethane-based elastomer.

How the addition of oil is believed to affect the modulus of the elastomer as well as how the miscibility is believed to play a role in the ice adhesion strength is further explored herein. More specifically, a predictive model is provided herein that can predict the expected icephobicity of any elastomer filled with any oil. The inputs of this model are the ice adhesion strength ($\tau_{ice}$) of the elastomer without oil, and the maximum solubility of the oil within the elastomer.

Filling an elastomer with a liquid, such as an oil, can accomplish two things. First, the oil adds interfacial slippage. Second, the oil can lower the crosslink density. Ice adhesion has been shown to decrease linearly for elastomers that display interfacial slippage. It is hypothesized that the interfacial slippage varies linearly with the percentage of oil within the coating, compared to the maximum solubility of the oil within the elastomer, as shown in the equation below:

$$\tau_{ice}^{oil} = \tau_{ice}^{no-oil} \frac{\rho_{oil}^{CL}}{\rho_{no-oil}^{CL}} \left(1 - \frac{\phi}{\phi_{max}}\right). \tag{2}$$

Here $\phi$ is the fraction of oil in the elastomer and $\phi_{max}$ is the maximum possible oil that can be embedded. A ratio of crosslink densities can be related to the amount of oil within the coating, so the only two unknowns are the initial ice adhesion strength and $\phi_{max}$.

A method of calculating how the crosslink density of the elastomer changes when filled with a certain percentage of oil is provided by solving a modified Flory-Rhener equation:

$$\frac{\rho_{filled}^{CL}}{\rho_{unfilled}^{CL}} = \frac{\left(\ln\left(\frac{v_2(1-\phi)}{(1-v_2\phi)}\right) + \chi\left(\frac{v_2(1-\phi)}{(1-v_2\phi)}\right)^2 + \frac{v_2(1-\phi)}{(1-v_2\phi)}\right)\left(v_2^{1/3} - \frac{v_2}{2}\right)}{(\ln(1-v_2) + v_2 + \chi v_2^2)\left(\left(\frac{v_2(1-\phi)}{(1-v_2\phi)}\right)^{1/3} - \frac{v_2(1-\phi)}{2(1-v_2\phi)}\right)}. \tag{3}$$

where the term on the left hand side is the ratio of crosslink densities of the elastomer unfilled and filled with a volume fraction of oil, $\phi$. All other terms match the original Flory-Rhener equation, i.e. $v_2$ is the volume fraction of polymer in the swollen state and $\chi$ is the Flory-Huggins interaction parameter. Note that, because a ratio of crosslink densities is computed, the solvent used to swell the elastomer is irrelevant. When $v_2$ is small, meaning the elastomer is highly swollen (which can be accomplished by choosing the appropriate solvent), the equation reduces to:

$$\frac{\rho_{filled}^{CL}}{\rho_{unfilled}^{CL}} = (1-\phi)^{5/3}. \tag{4}$$

Thus, for an elastomer filled with oil, the change in crosslink density that arises from the addition of the oil can be predicted. This is important because the ice adhesion decreases linearly with the crosslink density, or:

$$\frac{\tau_{ice}^{filled}}{\tau_{ice}^{unfilled}} \propto \frac{\rho_{filled}^{CL}}{\rho_{unfilled}^{CL}}. \tag{5}$$

Good agreement with the above theory is observed as shown in FIG. 15. FIG. 15 shows a reduction in crosslink density of three different elastomers (CF50—CLEARFLEX 50™, VF40—VYTAFLEX 40™) filled with seven different oils (SO—silicone oil, HD—hexadecane, DIDA—diisodecyl adipate, PB-6—liquid polybutene lubricant, MCT—medium chain triglyceride, HL—high linoleic). The dotted line in FIG. 15 is the relation from Equation (4).

The maximum oil solubility can be found by swelling a piece of the elastomer in the oil until it reaches a constant mass. For solvents and small molecules this happens within a few days, whereas for larger molecules like the oils, several weeks are required. How interfacial slippage depends on the fraction of oil is described further herein. It is assumed that the ice adhesion of a pure layer of oil is zero, and that the reduction in ice adhesion varies linearly with the amount of oil on the surface of the elastomer. This assumption would only be valid for surfaces without a lubricating layer, so the fraction of oil is divided by its maximal possible value:

$$\tau_{ice}^{oil} \propto \tau_{ice}^{no-oil}\left(1 - \frac{\phi}{\phi_{max}}\right). \tag{6}$$

According to the theory of hemi-wicking, the contact angle of a liquid on the surface of itself is 0°. Contrastingly, the contact angle of the liquid on an elastomer is given by some value θ. Hence, the contact angle of a surface with some fraction $\phi_s$ of oil on its surface can be found using:

$$\cos\theta^* = (1-\phi_s)\cos\theta + \phi_s \cos 0° \tag{7}.$$

Thus, the embedded oil within the elastomer is used as a probe liquid when measuring contact angles in order to find the fraction of oil on the surface. The fraction of oil on the surface of VYTAFLEX 40™, embedded with 6 different oils, versus amount of oil within the coating is shown in FIG. 16, normalized by its maximal value. The line represents an empirical best fit. The slope is −0.7114 and the y-intercept is set to 1.0.

Putting together the results from FIGS. 15 and 16, the functional form is:

$$\frac{\tau_{ice}^{slip}}{\tau_{ice}^{no-slip}} = (1 - \phi_{oil})^{5/3}(1 - \alpha\phi_{oil}/\phi_{oil}^{max}). \tag{8}$$

where α is the slope of the best fit line in FIG. 16. The results of this model are shown in FIGS. 17-19.

FIG. 17 shows predicted measured, predicted fitted, and actual ice adhesion strengths for VYTAFLEX 40™ filled with MCT. The values of crosslink density and $\phi_s$ can either be directly measured, or the fit from Equation (8) can be used.

FIG. 18 shows predicted measured, predicted fitted, and actual ice adhesion strengths of PDMS filled with silicone oil.

FIG. 19 shows predicted and actual ice adhesion strengths for a PS polymer filled with DIDA. Because the crosslink density cannot be easily measured, no actual values are known. The assumed maximum solubility of DIDA within PS is $\phi_s$=0.15.

This model can be extended to the linear polymers discussed herein, and thus knowledge of their crosslink density becomes unnecessary.

Linear Polymers

In other aspects, the present disclosure contemplates a durable icephobic material that comprises a linear polymeric material and one or more plasticizers that define an exposed surface that is free of any continuous surface layers of liquid (e.g., plasticizers) along the exposed surface. These durable icephobic materials may exhibit similar performance as previous embodiments described above, including exhibiting an initial ice adhesion strength of less than or equal to about 100 kPa or any of the other values described above prior to exposure to icing conditions and an ice adhesion strength after 10 cycles of icing and deicing conditions that increases less than or equal to about 50% above the initial ice adhesion strength or any of the previous values discussed.

Suitable linear polymers may include polyvinyl chloride (PVC), polystyrene (PS) polyethylene, polypropylene, polyvinyl butyral, polycarbonate, polymethylmethacrylate, polychloroethylene, polytetrafluoroethylene, polyacrylonitrile, polyvinylidene fluoride, polyvinyl acetate, polyisoprene, polychloroprene, derivatives and copolymers thereof.

A crosslink density $\rho^{CL}$ of a linear polymer comes from physical entanglement rather than from chemical bonds. Therefore, unlike the icephobic elastomeric materials described in other embodiments, a $\rho^{CL}$ of linear polymers can be highly tuned through the addition of plasticizers. For example, two common polymers, polyvinyl chloride (PVC) and polystyrene (PS) are explored with several different plasticizing agents. The exemplary plasticizers included diisodecyl adipate (DIDA), medium-chain triglyceride (MCT), and diundecyl phthalate (DUP). Although these plasticizers could be used as slippery agents in elastomer systems, their role here is believed to be to control the hardness of the polymers. So long as the miscibility of the linear polymer and plasticizer is favorable, no liquid lubricating surface layer is formed. For example, PS fully dissolves in MCT and DIDA.

PVC ($M_w \approx$ 120,000 or 245,000, Scientific Polymer) is dissolved in N-methyl pyrrolidone (NMP) at a concentration of 100 mg/mL. Different amounts of plasticizer (DIDA, Fisher Scientific, MCT, Jedwards International, or DUP, Sigma-Aldrich) are added to the PVC solution and then mixed until a homogeneous solution forms. The solution is then drop-cast onto glass slides and placed in a 120° C. oven overnight to remove the NMP. The final coating is transparent and less than about 500 µm thick (a function of the concentration of the solution). To achieve smooth, transparent films, this curing schedule is preferred. Rougher and less transparent films are fabricated by using THF instead of NMP, spray-coating the polymer solution, or curing at room temperature. The ice adhesion of these films is always greater than the same film cured using the optimized method described above.

PS ($M_w$=50,000, Scientific Polymer) is dissolved in toluene at a concentration of 500 mg/mL. To this solution, DIDA and MCT are added in varying concentrations. The films are then drop-cast onto glass slides, and the toluene is allowed to evaporate at 80° C. overnight. The final films are approximately 1 mm thick and transparent. Similar films can be made through spray-coating or dip coating, with a solution of 50 mg/mL, with the final thickness being less than about 500 µm.

The results of various studies relating to the ice adhesion of plasticized polymers are shown in FIGS. 20-21. FIG. 20 shows ice adhesion strength of a linear PVC plasticized with three different plasticizers at varying concentrations. FIG. 21 shows ice adhesion strengths of PVC of two different molecular weights ($M_W$=120,000 or 245,000), plasticized with DIDA at varying concentrations.

FIG. 22 shows the effect of curing DIDA-plasticized PVC on its ice adhesion strength. Using a solution of THF causes the PVC to crash out of solution during curing, creating crystalline domains and roughness. Using NMP allows for smooth films to form that are transparent, and therefore highly amorphous. Note that, after the concentration of plasticizer exceeds approximately 50%, the solvent effects are lessened and the ice adhesion strengths of the two curing methods become statistically equivalent.

FIG. 23 shows the effect of plasticizing PS with DIDA or MCT on ice adhesion strength, where the greater amount of plasticizer results in lower ice adhesion strengths. FIG. 24 shows a drastic different in ice adhesion strength reduction between PS and PVC as a function of DIDA concentration. At concentrations greater than 20% DIDA in PS, the polymer is no longer a solid. For PVC this only occurs at a concentration >90% DIDA.

PDMS Silane-Based Icephobic Materials

In yet other variations, the present disclosure contemplates a durable icephobic material that comprises a silanized polydimethylsiloxane (PDMS) material formed from a PDMS-silane that defines an exposed surface that is free of any continuous surface layers of liquid along the exposed surface. Like the other embodiments, such durable icephobic materials may exhibit similar performance previously indicated, including exhibiting an initial ice adhesion strength of less than or equal to about 100 kPa or any of the other values described above prior to exposure to icing conditions and an ice adhesion strength after 10 cycles of icing and deicing conditions that increases less than or equal to about 50% above the initial ice adhesion strength or any of the previous values discussed.

By treating a surface with a reactive PDMS species, interfacial slippage can be enabled in a material formed on a surface of a substrate, without the use of elastomers. Thus, low ice adhesion levels can be formed on extremely hard surfaces as well.

In certain variations, where the icephobic materials of the present disclosure are in the form of a polydimethylsiloxane (PDMS) coating formed from a PDMS-silane, the coating may have a thickness of greater than or equal to about 1 nm, optionally greater than or equal to about 2 nm, optionally greater than or equal to about 3 nm, optionally greater than or equal to about 4 nm, optionally greater than or equal to about 5 nm, optionally greater than or equal to about 7 nm, optionally greater than or equal to about 10 nm, and in certain variations, optionally greater than or equal to about 15 nm. In certain variations, the icephobic coating materials in the form of a polydimethylsiloxane (PDMS) coating formed from a PDMS-silane of the present disclosure may optionally have a thickness ranging from greater than or equal to about 1 nm to less than or equal to about 20 nm.

Si wafers are used as received. The 5 silanes investigated are dichloro-functional or have two terminal chlorine functional groups, with the structure shown in FIG. 25 where chain length represented by "n" may range from 0 to 51. In certain preferred variations, n is 0, 1, 2, 3-6, and 24-51. These correspond to molecular weights of 203, 277, 351, 425-650 and 2000-4000 g/mol. All 5 silanes are purchased from Gelest Inc. The n=0 structure is 1,3 dichlorotetramethyldisiloxane. The n=1 structure is called 1,5 dichlorohexamethyltrisiloxane. The n=2 structure is called 1,7-dichlorooctamethyltetrasiloxane. The n=3-6 structure is called chlorine terminated polydimethyl siloxane and goes by the product name DMS-K05. The n=24-51 structure is called chlorine terminated polydimethyl siloxane and goes by the product name DMS-K13. To deposit a monolayer, many techniques are employed that all worked with varying degrees of success. For the low molecular weight species, simply placing a wafer in a closed petri dish the 200 µL of the silane for less than about 5 minutes gave a partially reacted layer. Washing off any non-reacted silane, and repeating this step resulted in the best monolayers formed, as shown in FIG. 26. FIG. 26 shows resultant water contact angles of a Si wafer treated with 1,3 dichlorotetramethyldisiloxane (n=0 silane). Each deposition lasts 3 minutes and between each step the wafer is rinsed with toluene and isopropyl alcohol to remove and unreacted silanes. This allows fresh vapor to react with surface hydroxyls more easily.

Other successful methods of deposition included reaction in an 80° C. oven under low vacuum for 2 hours, 4 hours, or overnight.

To show that the interfacial slippage causes the low ice adhesion, and not the low surface energy or small contact angle hysteresis, ice adhesion force versus time curves are shown in FIG. 27. More specifically, FIG. 27 shows force versus time curves for ice adhesion on two silicon wafers that have been silanized with a fluoro-silane (which does not cause interfacial slippage) or a PDMS-silane (which does cause interfacial slippage). As can be seen, the force remains relatively steady at 11.4±3.3 kPa for the PDMS-silane with interfacial slippage over time, while the F-silane increases to a peak of 248±57 kPa around 20 seconds.

The low adhesion to these PDMS-silanized surfaces is not limited to ice. A drastic reduction in the adhesion of certain solids, namely paraffin wax, cyanoacrylate superglue and plaster of Paris (to represent mud), is also observed to the PDMS-silanized surfaces having interfacial slippage. FIGS. 28-29 show how the chain length of the PDMS-silane affects adhesion of solids. For example, in FIG. 28, the adhesion of these four different solids to Si wafers treated with PDMS silanes of three different molecular weights is shown. FIG. 29 shows the adhesion of the four different solids to PDMS silanized Si wafers, relative to the adhesion of an untreated Si wafer.

The PDMS-silanized surfaces also have other uses because they exhibit low contact angle hysteresis, $\Delta\theta$, the difference between the advancing and receding contact angles, with essentially all liquids, as shown in FIG. 30. The advancing and receding contact angles on PDMS-silanized Si wafers versus the surface tension of the probe liquid is shown in FIG. 30.

Surprisingly, this even includes fluorinated solvents, such as those seen in FIG. 31. FIG. 31 shows contact angle hysteresis of seven different fluoro-solvents for Si wafers silanized with PDMS-silanes of two different chain lengths (molecular number $M_N$=540 or 3000). This liquid repellency means that superomniphobic surfaces can be created without the use of fluorine, if this silane is instead incorporated.

Superomniphobic surfaces are those that exhibit superhydrophobicity and superoleophobicity. Surfaces that spontaneously approach a contact angle $\theta$ of 0° with water and oil are generally considered superhydrophilic and superoleophilic respectively and surfaces that approach contact angles $\theta$ greater than or equal to about 150° and low contact angle hysteresis (difference between the advancing and the receding contact angle) with water and oil are generally considered to be superhydrophobic and superoleophobic, respectively.

Surfaces that display a contact angle $\theta$ of less than or equal to about 90° with water or other polar liquids (e.g., alcohols, dimethyl formamide and the like) are considered to be "hydrophilic." As used herein, surfaces that display a contact angle $\theta$ of less than or equal to about 5° with water or other polar liquids (e.g., alcohols, dimethyl formamide and the like) are considered to be "superhydrophilic."

Surfaces that display a contact angle of greater than or equal to about 90° with water or other polar liquids are considered to be "hydrophobic." Superhydrophobic surfaces are those that display a contact angle of greater than or equal to about 150° along with low contact angle hysteresis (difference between the advancing $\theta_{adv}$ and the receding contact angle $\theta_{rec}$) with water or other preselected polar liquids. In certain variations, a "superhydrophobic" surface has a contact angle of greater than or equal to about 150° with water or another polar liquid.

Surfaces that display a contact angle $\theta$ of less than or equal to about 90° with oil (a preselected reference oil or other non-polar liquid) are considered to be "oleophilic." A "preselected oil" is intended to include any oil or combinations of oils of interest. As discussed herein, in certain non-limiting variations, an exemplary preselected oil used to demonstrate oleophobicity/oleophilicity is rapeseed oil (RSO). Likewise, surfaces that display a contact angle $\theta$ of less than or equal to about 5° with oil (a preselected reference oil or other non-polar liquid) are considered to be "superoleophilic."

Surfaces that display a contact angle of greater than or equal to about 90° with a preselected oil are considered to be "oleophobic." Superoleophobic surfaces are those that display a contact angle of greater than or equal to about 150° along with low contact angle hysteresis with preselected low surface tension liquids, such as a representative oil (for example, rapeseed oil (RSO)).

For example, structured surfaces with re-entrant texture having fluorinated liquids could exist in the Cassie-Baxter state, as shown in FIG. 32. In FIG. 32, micro-hoodoos treated with 1,3 dichlorotetramethyldisiloxane (n=0) are rendered superomniphobic, even without the use of fluorine. Hexadecane (top left—HD) and perfluorodecalin (top right—PFD) both exhibit high contact angle and roll of the surface when tilted. Even KRYTOX 105™, a perfluoropolyether lubricant, is repelled by such a surface (bottom).

Thus, the present disclosure contemplates a durable icephobic material that comprises a silanized polydimethylsiloxane (PDMS) material formed from a PDMS-silane that exhibits interfacial slippage. The durable icephobic material may be omniphobic to a variety of polar or non-polar liquids, including water and oils. In certain variations, the PDMS silane has a molecular weight ranging from greater than or equal to about 200 g/mol to less than or equal to about 5,000 g/mol, optionally greater than or equal to about 200 g/mol to less than or equal to about 4,000 g/mol.

All possible combinations discussed and enumerated above and herein as optional features of the inventive materials and inventive methods of the present disclosure are specifically disclosed as embodiments. In various aspects, the present disclosure contemplates a durable icephobic material defining an exposed surface, wherein the exposed surface of the elastomeric polymer exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength.

In certain embodiments, the present disclosure contemplates a durable icephobic material comprising an elastomeric polymer defining an exposed surface and having a crosslink density of less than or equal to about 1,300 mol/m³. The exposed surface of the elastomeric polymer exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength. Also specifically disclosed are combinations including this durable icephobic material optionally with any one or any combination of more than one of the enumerated features (1)-(8).

The durable icephobic material of the second embodiment optionally has any one or any combination of more than one of the following features: (1) a crosslink density greater than or equal to about 5 mol/m³ to less than or equal to about 200 mol/m³; (2) a crosslink density greater than or equal to about 20 mol/m³ to less than or equal to about 50 mol/m³; (3) an elastomeric polymer comprising polyurethane (PU), polydimethylsiloxane (PDMS), perfluoropolyether (PFPE), polymethylhydrosiloxane (PMHS), polymethylphenylsiloxane (PMPS), copolymers of isocyanate functionalized polydimethylsiloxane (PDMS) and fluorinated polyurethane (FPU), copolymers of isocyanate functionalized polydimethylsiloxane (PDMS) and polyurethane (PU), acrylates, methacrylates, soybean oil acrylate, polystyrene, natural rubber, vulcanized rubber, synthetic rubber, butyl rubber, latex rubber, polychloroprene, acrylonitrile butadiene rubber, styrene butadiene rubber, elastomers made from ethylene propylene diene monomer (EPDM), epichlorohydrin-based rubber, organogels, hydrogels, and combinations thereof; (4) the durable icephobic material further comprises a liquid miscible with and distributed within the elastomeric polymer to enable interfacial slippage, wherein the exposed surface of the elastomeric polymer is free of any layers of the liquid formed thereon; (5) the liquid has a melting point of less than or equal to about 32° F. (0° C.) and a viscosity of greater than or equal to about 5 cP to greater than or equal to about 10,000 cP at 40° C.; (6) the liquid is selected from the group consisting of: polydimethylsiloxane (PDMS) oil, polymethylphenylsiloxane (PMPS) oil, perfluoroether oils, natural oils, synthetic oils, and combinations thereof; (7) the initial ice adhesion strength is less than or equal to about 10 kPa; and/or (8) the ice adhesion strength after 10 cycles of icing and deicing is less than or equal to about 25 kPa.

In other aspects, the present disclosure contemplates a durable icephobic article comprising an exposed surface of the article. The exposed surface exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength. The exposed surface is free of any layers of free liquid formed thereon. In certain aspects, the exposed surface includes an elastomeric polymer with a crosslink density of less than or equal to about 1,300 mol/m³.

Also specifically disclosed are combinations including durable icephobic article optionally with any one or any combination of more than one of the enumerated features (9)-(15). The durable icephobic article of this embodiment has any one or any combination of more than one of the following features: (9) the durable icephobic article is a component in an aircraft, a vehicle, a marine vessel, outdoor equipment, snow or ice removal equipment, recreational equipment, a wind turbine, telecommunications equipment, power lines, and combinations thereof; (10) the exposed surface of the article comprising the elastomeric polymer is capable of preventing ice from forming thereon for at least 100 cycles of icing and deicing; (11); the elastomeric polymer comprises polyurethane (PU), polydimethylsiloxane (PDMS), perfluoropolyether (PFPE), polymethylhydrosiloxane (PMHS), polymethylphenylsiloxane (PMPS), copolymers of isocyanate functionalized polydimethylsiloxane (PDMS) and fluorinated polyurethane (FPU), copolymers of isocyanate functionalized polydimethylsiloxane (PDMS) and polyurethane (PU), acrylates, methacrylates, soybean oil acrylate, polystyrene, natural rubber, vulcanized rubber, synthetic rubber, butyl rubber, latex rubber, polychloroprene, acrylonitrile butadiene rubber, styrene butadiene rubber, elastomers made from ethylene propylene diene monomer (EPDM), epichlorohydrin-based rubber, organogels, hydrogels, and combinations thereof; (12) the durable icephobic article further comprises a liquid miscible with and distributed within the elastomeric polymer to enable interfacial slippage, where the exposed surface is free of any layers of the liquid formed thereon; (13) the liquid has a melting point of less than or equal to about 32° F. (0° C.) and a viscosity of greater than or equal to about 5 cP to greater than or equal to about 10,000 cP at 40° C.; (14) the durable icephobic article consists essentially of the elastomeric polymer; and/or (15) the ice adhesion strength after 10 cycles of icing and deicing is less than or equal to about 25 kPa.

In yet other embodiments, the present disclosure contemplates a durable icephobic material comprising an elastomeric urethane-based polymer defining an exposed surface and having a crosslink density of less than or equal to about 200 mol/m³. The exposed surface of the elastomeric polymer exhibits an initial ice adhesion strength of less than or equal to about 50 kPa prior to exposure to icing conditions and an ice adhesion strength after 10 cycles of icing and deicing conditions that is less than or equal to about 50% above the initial ice adhesion strength. The exposed surface of the elastomeric urethane-based polymer is free of any layers of liquid.

Also specifically disclosed are combinations including durable icephobic materials optionally with any one or any combination of more than one of the enumerated features (16)-(25). The durable icephobic material of this embodiment has any one or any combination of more than one of the following features: (16) the durable icephobic material further comprises a liquid miscible with and distributed within the urethane-based elastomeric polymer that enables interfacial slippage, wherein the exposed surface of the elastomeric polymer is free of any layers of the liquid formed thereon; (17) the liquid is selected from the group consisting of: polydimethylsiloxane (PDMS) oil, polymethylphenylsiloxane (PMPS) oil, perfluoroether oils, natural oils, synthetic oils, and combinations thereof; (18) the cross-link density is less than or equal to about 50 mol/m³; (19) the urethane-based elastomeric polymer is hydrophilic; (20) the urethane-based elastomeric polymer is formed from a first precursor selected from the group consisting of: toluene diisocyanate, dicyclohexylmethane-4,4'-diisocyanate, and combinations thereof, a second precursor comprising a polyol, and a third precursor selected from the group consisting of: di(ethyl)toluenediamine, di(methylthio)toluene diamine, and combinations thereof; (21) the initial ice adhesion strength of less than or equal to about 25 kPa; (22) after 5,000 abrasion testing cycles, the ice adhesion strength remains less than or equal to about 50 kPa; (23) after acid/base exposure, corrosion testing, and peel testing, the ice adhesion strength remains less than or equal to about 50 kPa; (24) has a thickness of greater than or equal to about 100 μm to less than or equal to about 1,000 μm; and/or (25) the elastomeric urethane-based polymer is transparent to electromagnetic radiation in a visible light spectrum.

In other aspects, the present disclosure contemplates a durable icephobic material comprising an elastomeric polymer comprising polydimethylsiloxane (PDMS) that defines an exposed surface and has a crosslink density of less than or equal to about 200 mol/m³. The exposed surface of the elastomeric polymer exhibits an initial ice adhesion strength of less than or equal to about 50 kPa prior to exposure to icing conditions and an ice adhesion strength after 10 cycles of icing and deicing conditions that is less than or equal to about 50% above the initial ice adhesion strength. The exposed surface of the elastomeric polymer is free of any layers of liquid.

Also specifically disclosed are combinations including durable icephobic materials optionally with any one or any combination of more than one of the enumerated features (26)-(31). The durable icephobic material of this embodiment has any one or any combination of more than one of the following features: (26) the durable icephobic material further comprises a liquid miscible with and distributed within the elastomeric polymer that enables interfacial slippage, wherein the exposed surface of the elastomeric polymer is free of any layers of the liquid formed thereon; (27) the liquid is selected from the group consisting of: polydimethylsiloxane (PDMS) oil, polymethylphenylsiloxane (PMPS) oil, perfluoroether oils, natural oils, synthetic oils, and combinations thereof; (28) the cross-link density is less than or equal to about 50 mol/m$^3$; (29) the initial ice adhesion strength of less than or equal to about 25 kPa; (30) has a thickness of greater than or equal to about 100 μm to less than or equal to about 1,000 μm; and/or (31) the elastomeric polymer is formed from a two-part PDMS siloxane precursor having a first part comprising tetra(trimethylsiloxy)silane, dimethylvinylated and trimethylated silica, and dimethylvinyl-terminated dimethylsiloxane and a second part comprising dimethyl, methylhydrogen siloxane, dimethylvinyl-terminated dimethylsiloxane, tetramethyl tetravinyl cyclotetrasiloxane, and dimethylvinylated and trimethylated silica.

In other embodiments, a durable icephobic material comprises a polydimethylsiloxane (PDMS) coating exhibiting interfacial slippage formed by reacting a PDMS-silane with a substrate. An exposed surface of the PDMS coating is omniphobic and exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength. The exposed surface of the PDMS coating is free of any layers of liquid.

Also specifically disclosed are combinations including the polydimethylsiloxane (PDMS) coating optionally with any one or any combination of more than one of the enumerated features (32)-(35). The durable icephobic material comprising the polydimethylsiloxane (PDMS) coating of this embodiment has any one or any combination of more than one of the following features: (32) the PDMS-silane has two terminal chlorine functional groups and is represented by a structure:

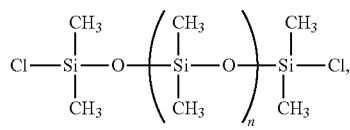

where n ranges from 0 to 51; (33) the PDMS-silane is selected from the group consisting of: 1,3 dichlorotetramethyldisiloxane, 1,5 dichlorohexamethyltrisiloxane, 1,7-dichlorooctamethyltetrasiloxane, chlorine-terminated polydimethyl siloxane where n=3-6, chlorine-terminated polydimethyl siloxane where n=24-51, and combinations thereof; (34) the ice adhesion strength after 10 cycles of icing and deicing is less than or equal to about 50 kPa; and/or (35) the ice adhesion strength after 10 cycles of icing and deicing is less than or equal to about 25 kPa.

In yet other aspects, a durable icephobic material is provided that defines an exposed surface comprising a linear polymer and one or more plasticizers. The exposed surface of the linear polymer is free any layers of liquid or plasticizers and exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength.

Also specifically disclosed are combinations including durable icephobic materials optionally with any one or any combination of more than one of the enumerated features (36)-(37). The durable icephobic material of this embodiment has any one or any combination of more than one of the following features: (36) the linear polymer is selected from the group consisting of: polystyrene, poly(vinyl) chloride, polyethylene, polypropylene, polyvinyl butyral, polycarbonate, polymethylmethacrylate, polychloroethylene, polytetrafluoroethylene, polyacrylonitrile, polyvinylidene fluoride, polyvinyl acetate, polyisoprene, polychloroprene, and combinations thereof; and/or (37) the one or more plasticizers are selected from the group consisting of: diisodecyl adipate (DIDA), medium-chain triglyceride (MCT), diundecyl phthalate (DUP), and combinations thereof.

In yet other aspects, the present disclosure provides a method of making a durable icephobic article comprising applying a precursor of an elastomeric polymer on a substrate. The method further includes curing and/or crosslinking the precursor to form a durable elastomeric polymer having a crosslink density of less than or equal to about 1,300 mol/m$^3$. The elastomeric polymer exhibits an initial ice adhesion strength of less than or equal to about 100 kPa prior to exposure to icing conditions and an ice adhesion strength after 10 cycles of icing and deicing conditions that that is less than or equal to about 50% above the initial ice adhesion strength. An exposed surface of the elastomeric polymer is free of any layers of free liquid formed thereon.

Also specifically disclosed are combinations including this method optionally with any one or any combination of more than one of the enumerated steps or features (38)-(42). The method for forming a durable icephobic material optionally has any one or any combination of more than one of the following steps or features: (38) introducing a liquid miscible with the elastomeric polymer after the curing to enable interfacial slippage of chains in the elastomeric polymer, wherein an exposed surface of the elastomeric polymer is free of any layers of free liquid formed thereon; (39) the ice adhesion strength after 10 cycles of icing and deicing is less than or equal to about 50 kPa; (40) the ice adhesion strength after 10 cycles of icing and deicing is less than or equal to about 25 kPa; (41) the elastomeric polymer comprises a PDMS elastomer and the precursor is a two-part PDMS siloxane precursor having a first part comprising tetra(trimethylsiloxy) silane, dimethylvinylated and trimethylated silica, and dimethylvinyl-terminated dimethylsiloxane and a second part comprising dimethyl, methylhydrogen siloxane, dimethylvinyl-terminated dimethylsiloxane, tetramethyl tetravinyl cyclotetrasiloxane, and dimethylvinylated and trimethylated silica; and/or (42) the elastomeric polymer comprises a urethane-based elastomeric polymer and the precursor further includes a first precursor selected from the group consisting of: toluene diisocyanate, dicyclohexylmethane-4,4'-diisocyanate, and combinations thereof, a second precursor comprising a polyol, and a third precursor selected from the group consisting of: di(ethyl)toluenediamine, di(methylthio)toluene diamine, and combinations thereof.

The present disclosure also provides in other aspects, a method of making a durable icephobic article comprising applying a polydimethylsiloxane (PDMS)-silane precursor on a substrate and reacting the PDMS-silane precursor to form a durable icephobic coating comprising a polydimethylsiloxane (PDMS) having interfacial slippage and exhibiting an initial ice adhesion strength of less than or equal to about 100 kPa prior to exposure to icing conditions and an ice adhesion strength after 10 cycles of icing and deicing conditions that that is less than or equal to about 50% above the initial ice adhesion strength. An exposed surface of the durable icephobic coating is free of any layers of free liquid formed thereon.

Also specifically disclosed are combinations including this method optionally with any one or any combination of more than one of the enumerated steps or features (43)-(47). The method for forming a durable icephobic material optionally has any one or any combination of more than one of the following steps or features: (43) the PDMS-silane precursor has two terminal chlorine functional groups and is represented by a structure:

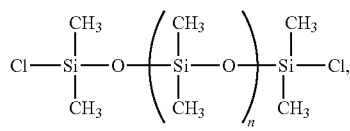

where n ranges from 0 to 51; (44) the PDMS-silane precursor is selected from the group consisting of: 1,3 dichlorotetramethyldisiloxane, 1,5 dichlorohexamethyltrisiloxane, 1,7-dichlorooctamethyltetrasiloxane, chlorine-terminated polydimethyl siloxane where n=3-6, chlorine-terminated polydimethyl siloxane where n=24-51, and combinations thereof; (45) the ice adhesion strength of the durable icephobic coating after 10 cycles of icing and deicing is less than or equal to about 50 kPa; (46) the ice adhesion strength of the durable icephobic coating after 10 cycles of icing and deicing is less than or equal to about 25 kPa; and/or (47) the durable icephobic coating has a thickness of greater than or equal to about 1 nm to less than or equal to about 20 nm.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A durable icephobic material comprising an elastomeric polymer defining an exposed surface and having a crosslink density of less than or equal to about 200 mol/m$^3$, wherein the elastomeric polymer comprises one or more polymers selected from the group consisting of: a urethane-based polymer, polydimethylsiloxane (PDMS), and combinations thereof, and an exposed surface of the elastomeric polymer exhibits an initial ice adhesion strength of less than or equal to about 50 kPa prior to exposure to icing conditions and an ice adhesion strength after 10 cycles of icing and deicing conditions that is less than or equal to about 50% above the initial ice adhesion strength and the exposed surface of the elastomeric polymer is free of any layers of liquid.

2. The durable icephobic material of claim 1, wherein the elastomeric polymer comprises the urethane-based polymer and is hydrophilic.

3. The durable icephobic material of claim 1, wherein the elastomeric polymer comprises the urethane-based polymer formed from a first precursor selected from the group consisting of: toluene diisocyanate, dicyclohexylmethane-4, 4'-diisocyanate, and combinations thereof, a second precursor comprising a polyol, and a third precursor selected from the group consisting of: di(ethyl)toluenediamine, di(methylthio)toluene diamine, and combinations thereof.

4. The durable icephobic material of claim 1, wherein after 5,000 abrasion testing cycles, the ice adhesion strength remains less than or equal to about 50 kPa.

5. The durable icephobic material of claim 1, wherein after acid/base exposure, corrosion testing, and peel testing, the ice adhesion strength remains less than or equal to about 50 kPa.

6. The durable icephobic material of claim 1, further comprising a liquid miscible with and distributed within the elastomeric polymer that enables interfacial slippage, wherein the exposed surface of the elastomeric polymer is free of any layers of the liquid formed thereon.

7. The durable icephobic material of claim 6, wherein the liquid is selected from the group consisting of: polydimethylsiloxane (PDMS) oil, polymethylphenylsiloxane (PMPS) oil, perfluoroether oils, natural oils, synthetic oils, and combinations thereof.

8. The durable icephobic material of claim 1, wherein the crosslink density is less than or equal to about 50 mol/m$^3$.

9. The durable icephobic material of claim 1, wherein the initial ice adhesion strength is less than or equal to about 25 kPa.

10. The durable icephobic material of claim 1 having a thickness of greater than or equal to about 100 μm to less than or equal to about 1,000 μm.

11. The durable icephobic material of claim 1, wherein the elastomeric polymer comprises the urethane-based polymer transparent to electromagnetic radiation in a visible light spectrum.

12. The durable icephobic material of claim 1, wherein the elastomeric polymer comprises polydimethylsiloxane (PDMS) formed from a two-part PDMS siloxane precursor having a first part comprising tetra(trimethylsiloxy)silane, dimethylvinylated and trimethylated silica, and dimethylvinyl-terminated dimethylsiloxane and a second part comprising dimethyl, methylhydrogen siloxane, dimethylvinyl-terminated dimethylsiloxane, tetramethyl tetravinyl cyclotetrasiloxane, and dimethylvinylated and trimethylated silica.

13. The durable icephobic material of claim 1, wherein the elastomeric polymer comprises polydimethylsiloxane (PDMS) formed from a PDMS-silane having two terminal chlorine functional groups and is represented by a structure:

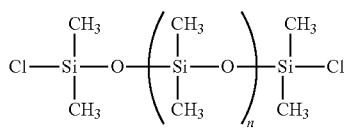

where n ranges from 0 to 51.

14. The durable icephobic material of claim 13, wherein the PDMS-silane is selected from the group consisting of: 1,3 dichlorotetramethyldisiloxane, 1,5 dichlorohexamethyltrisiloxane, 1,7-dichlorooctamethyltetrasiloxane, chlorine-terminated polydimethyl siloxane where n=3-6, chlorine-terminated polydimethyl siloxane where n=24-51, and combinations thereof.

15. A durable icephobic article comprising:
an exposed surface of the article comprising an elastomeric polymer having a crosslink density of less than or equal to about 1,300 mol/m$^3$, wherein the elastomeric polymer comprises one or more polymers selected from the group consisting of: a urethane-based polymer, polydimethylsiloxane (PDMS), and combinations thereof, and an exposed surface of the elastomeric polymer exhibits an initial ice adhesion strength of less than or equal to about 100 kPa prior to exposure to icing conditions and an ice adhesion strength after 10 cycles of icing and deicing conditions that is less than or equal to about 50% above the initial ice adhesion strength and the exposed surface is free of any layers of free liquid formed thereon.

16. The durable icephobic article of claim 15, wherein the durable icephobic article is a component in an aircraft, a vehicle, a marine vessel, outdoor equipment, snow or ice removal equipment, recreational equipment, a wind turbine, telecommunications equipment, power lines, and combinations thereof.

17. The durable icephobic article of claim 15, wherein the exposed surface of the durable icephobic article comprising the elastomeric polymer is capable of preventing ice from forming thereon for at least 100 cycles of icing and deicing.

18. The durable icephobic article of claim 15, further comprising a liquid miscible with and distributed within the elastomeric polymer to enable interfacial slippage, wherein the exposed surface is free of any layers of the liquid formed thereon.

19. The durable icephobic article of claim 18, wherein the liquid has a melting point of less than or equal to about 32° F. (0° C.) and a viscosity of greater than or equal to about 5 cP to greater than or equal to about 10,000 cP at 40° C.

20. The durable icephobic article of claim 15, wherein the ice adhesion strength after 10 cycles of icing and deicing is less than or equal to about 25 kPa.

\* \* \* \* \*